United States Patent
Kim et al.

(10) Patent No.: US 11,133,906 B2
(45) Date of Patent: Sep. 28, 2021

(54) METHOD FOR TRANSMITTING SYNCHRONIZATION SIGNAL AND SYNCHRONIZATION CHANNEL IN WIRELESS COMMUNICATION SYSTEM SUPPORTING DEVICE-TO-DEVICE COMMUNICATION AND APPARATUS FOR THE SAME

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/562,973

(22) Filed: Sep. 6, 2019

(65) Prior Publication Data

US 2019/0394003 A1 Dec. 26, 2019

Related U.S. Application Data

(63) Continuation of application No. 15/858,982, filed on Dec. 29, 2017, now Pat. No. 10,411,858, which is a
(Continued)

(51) Int. Cl.
*H04L 5/00* (2006.01)
*H04W 76/14* (2018.01)
(Continued)

(52) U.S. Cl.
CPC .......... *H04L 5/0048* (2013.01); *H04L 5/0044* (2013.01); *H04L 5/0053* (2013.01);
(Continued)

(58) Field of Classification Search
CPC ... H04L 5/0048; H04L 5/0044; H04L 5/0053; H04L 27/2657; H04L 27/2613;
(Continued)

(56) References Cited

U.S. PATENT DOCUMENTS 9,615,341 B2 4/2017 Sartori et al.
9,681,472 B2 6/2017 Sorrentino
(Continued)

FOREIGN PATENT DOCUMENTS

CN 102938754 A 2/2013
CN 103369585 A 10/2013
(Continued)

OTHER PUBLICATIONS

U.S. Appl. No. 15/858,982, filed Dec. 29, 2017.
(Continued)

*Primary Examiner* — Michael J Moore, Jr.
(74) *Attorney, Agent, or Firm* — Birch, Stewart, Kolasch & Birch LLP

(57) ABSTRACT

A method for transmitting synchronization information and synchronization related information in a wireless communication system, includes mapping the synchronization information to a physical resource; mapping the synchronization related information to the physical resource; and transmitting, to a user equipment (UE), the synchronization information and the synchronization related information, wherein the synchronization information is mapped to fewer subcarriers than the synchronization related information.

13 Claims, 44 Drawing Sheets

Related U.S. Application Data continuation of application No. 15/114,344, filed as application No. PCT/KR2015/000616 on Jan. 21, 2015, now Pat. No. 9,893,855.

(60) Provisional application No. 61/931,686, filed on Jan. 26, 2014, provisional application No. 61/939,685, filed on Feb. 13, 2014.

(51) Int. Cl.
*H04W 56/00* (2009.01)
*H04L 27/26* (2006.01)

(52) U.S. Cl.
CPC ......... *H04L 27/2657* (2013.01); *H04W 56/00* (2013.01); *H04W 56/002* (2013.01); *H04W 76/14* (2018.02); *H04L 27/2613* (2013.01); *H04L 27/2692* (2013.01)

(58) Field of Classification Search
CPC .. H04L 27/2692; H04W 76/14; H04W 56/00; H04W 56/002
See application file for complete search history.

(56) References Cited

U.S. PATENT DOCUMENTS

| | | | |
|---|---|---|---|
| 9,893,855 B2 | 2/2018 | Kim et al. | |
| 10,159,054 B2* | 12/2018 | Li | H04W 76/14 |
| 10,334,548 B2* | 6/2019 | Popovic | H04B 1/7073 |
| 10,411,858 B2* | 9/2019 | Kim | H04W 56/002 |
| 2011/0268101 A1 | 11/2011 | Wang et al. | |
| 2011/0312328 A1* | 12/2011 | Choi | H04W 72/02 |
| | | | 455/450 |
| 2013/0286928 A1 | 10/2013 | Xu et al. | |
| 2014/0242995 A1 | 8/2014 | Lee et al. | |
| 2015/0117295 A1 | 4/2015 | Yeh et al. | |
| 2015/0208371 A1 | 7/2015 | Yie et al. | |
| 2015/0289216 A1 | 10/2015 | Xing et al. | |
| 2015/0305075 A1* | 10/2015 | Fodor | H04W 8/005 |
| | | | 370/329 |
| 2016/0073370 A1* | 3/2016 | Axmon | H04L 5/0048 |
| | | | 370/350 |
| 2016/0205644 A1 | 7/2016 | Seo et al. | |
| 2016/0212724 A1 | 7/2016 | Seo et al. | |
| 2016/0227495 A1 | 8/2016 | Lee et al. | |
| 2016/0227496 A1 | 8/2016 | Panteleev et al. | |
| 2016/0286506 A1 | 9/2016 | Chae et al. | |
| 2016/0316442 A1 | 10/2016 | Seo et al. | |
| 2016/0316487 A1* | 10/2016 | Kalhan | H04W 24/08 |
| 2017/0230922 A1 | 8/2017 | Zhao et al. | |
| 2018/0279396 A1* | 9/2018 | Sorrentino | H04W 56/0025 |

FOREIGN PATENT DOCUMENTS

| | | |
|---|---|---|
| JP | 2017-509211 A | 3/2017 |
| WO | WO 2013/055173 A2 | 4/2013 |
| WO | WO 2013/072222 A1 | 5/2013 |
| WO | WO 2013/075340 A1 | 5/2013 |
| WO | WO 2013/100831 A1 | 7/2013 |

OTHER PUBLICATIONS

U.S. Appl. No. 15/114,344, filed Jul. 26, 2016.
Ericsson, "Synchronization Procedures for D2D Discovery and Communication", 3GPP TSG RAN WG1 Meeting #75, R1-135803, San Francisco, USA, Nov. 11-15, 2013, pp. 1-6.
Ericsson, "Synchronization Signals and Channel Design for D2D Discovery and Communication", 3GPP TSG RAN WG1 Meeting #75, R1-135903, San Francisco, USA, Feb. 11-15, 2013, pp. 1-10.
Huawei et al., "Design Considerations for D2DSS", 3GPP TSG RAN WG1 Meeting #75, R1-135532, San Francisco, USA, Nov. 11-15, 2013, 5 pages.
LG Electronics, Discussion on Design of D2DSS and PD2DSCH, 3GPP TSG RAN WG1 Meeting #75, R1-135479, San Francisco, USA, Nov. 11-15, 2013, pp. 1-6.
Qualcomm Incorporated, "Signal Design and Resource Allocation for D2D Synchronization", R1-135317, 3GPP TSG-RAN WG1 #75, Nov. 11-15, 2013, San Francisco, USA.

* cited by examiner

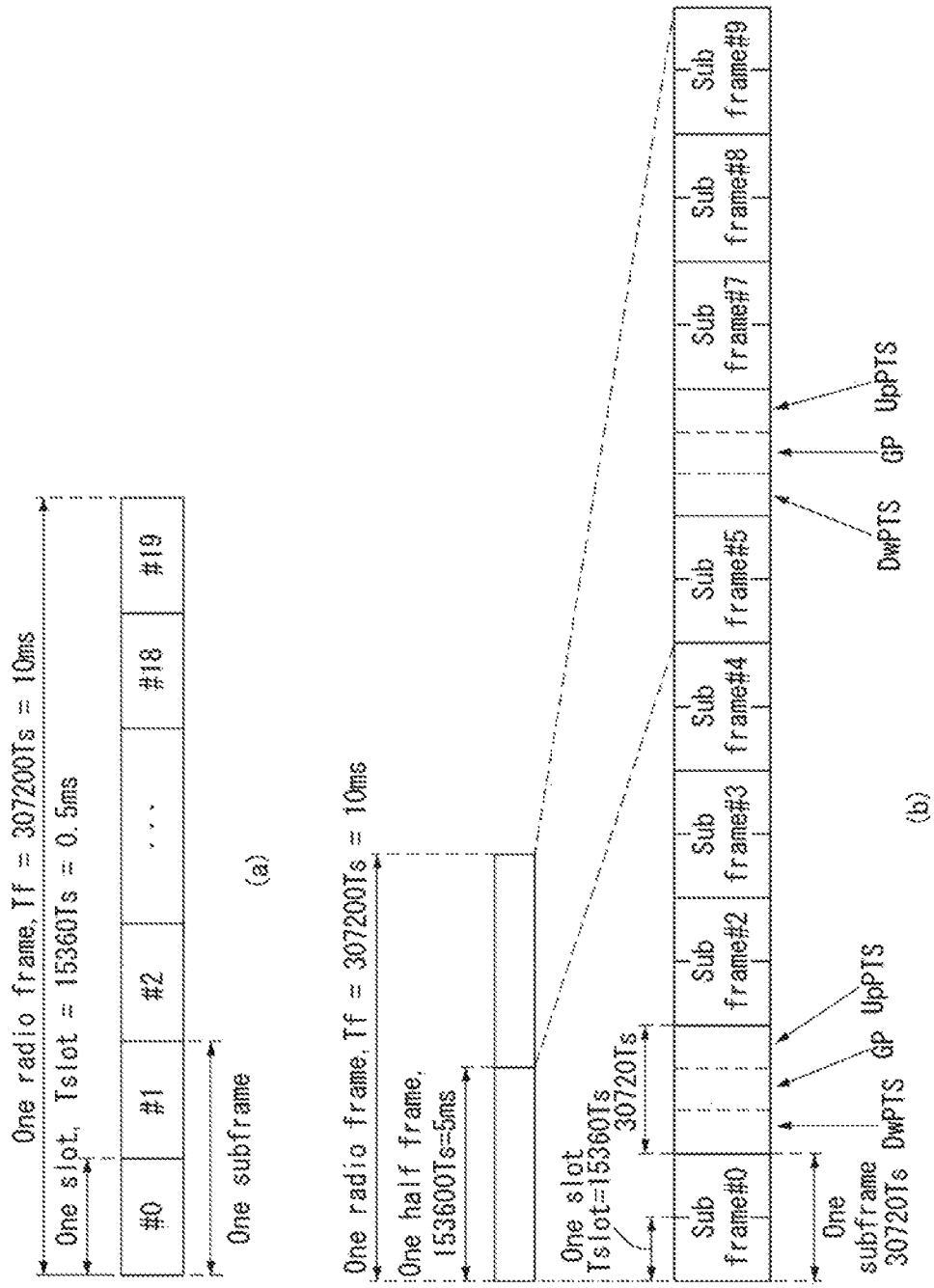
[FIG. 1]

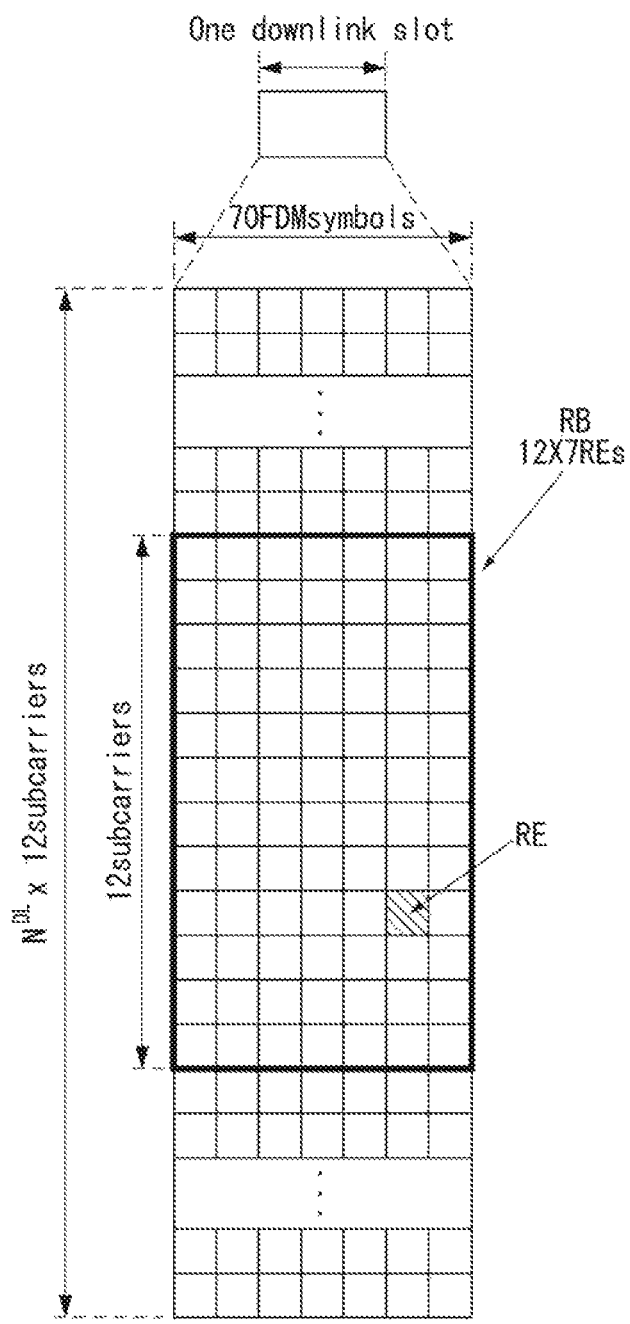
[FIG. 2]

[FIG. 3]
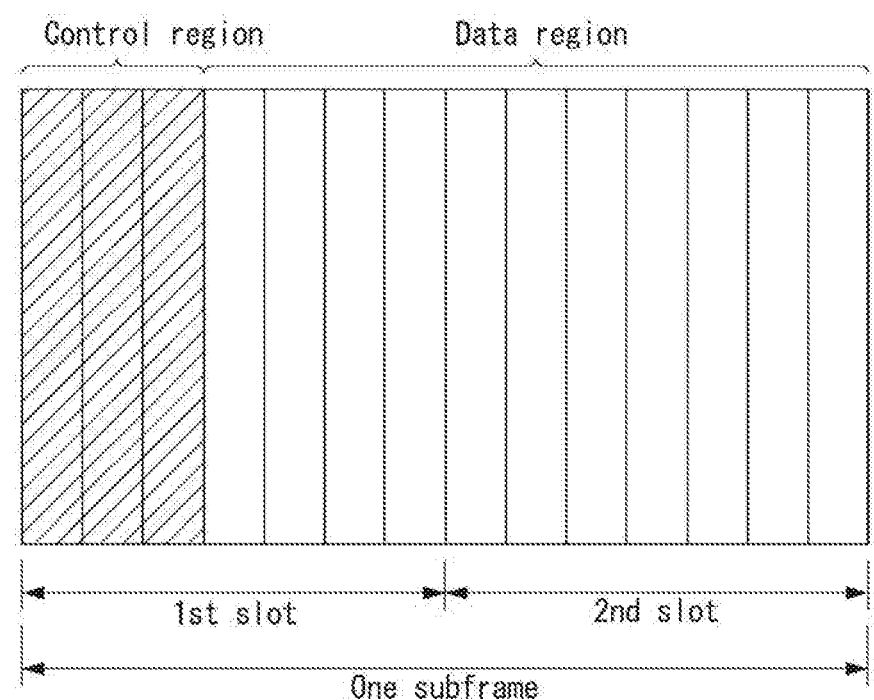

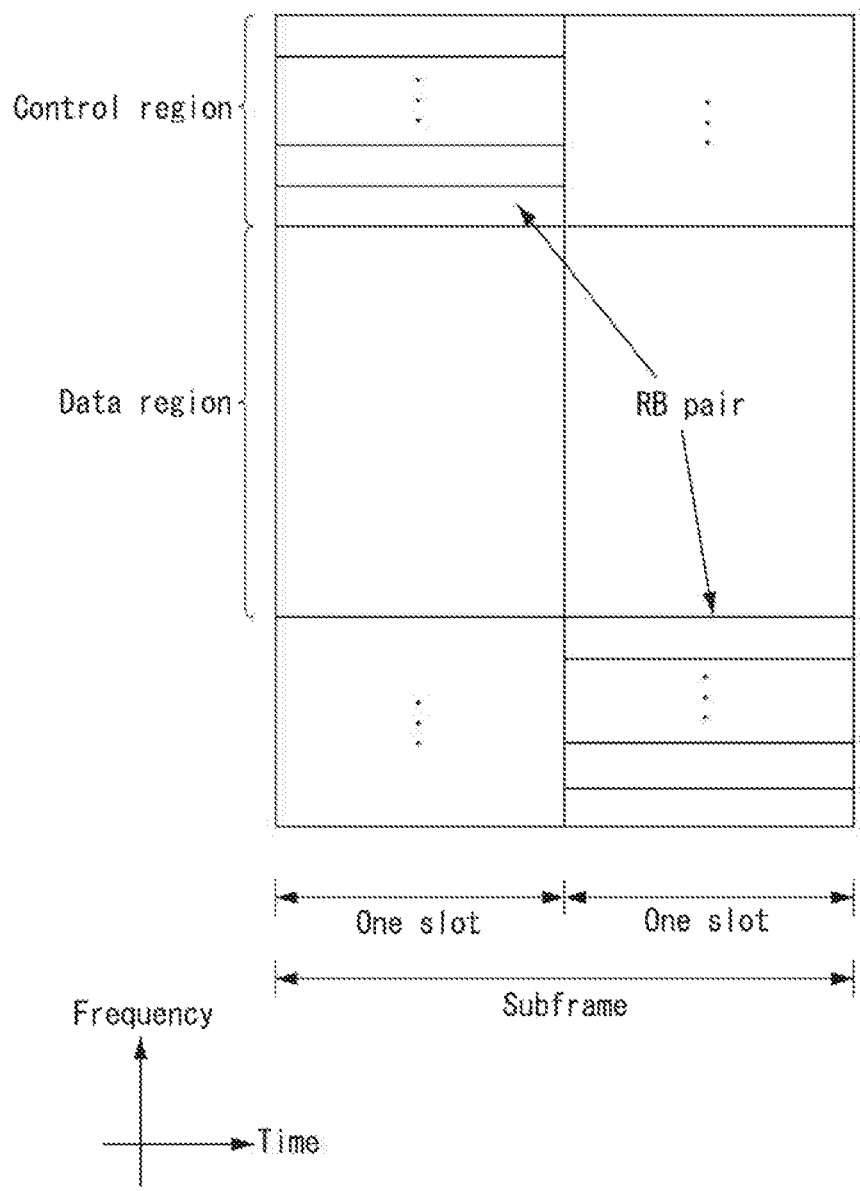
[FIG. 4]

[FIG. 5]
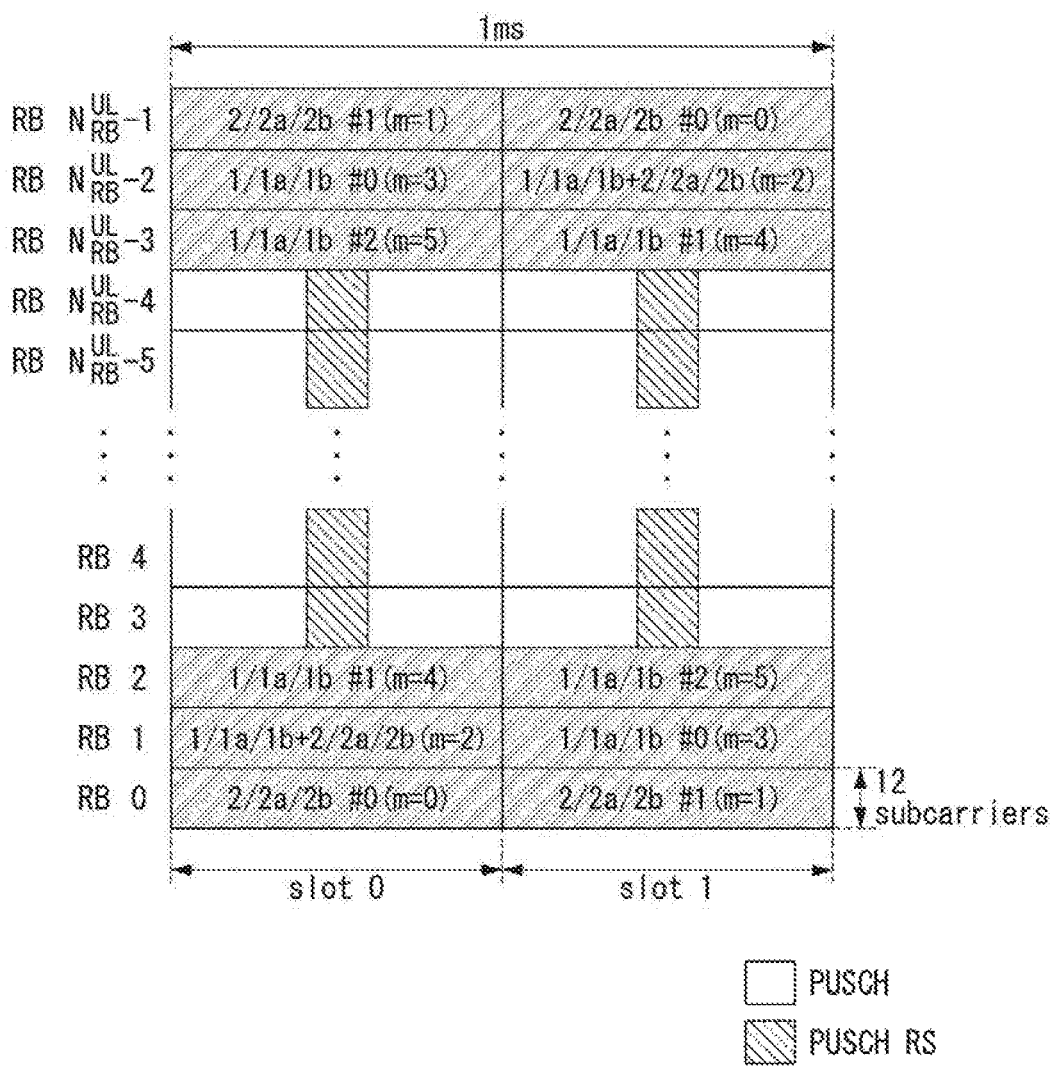

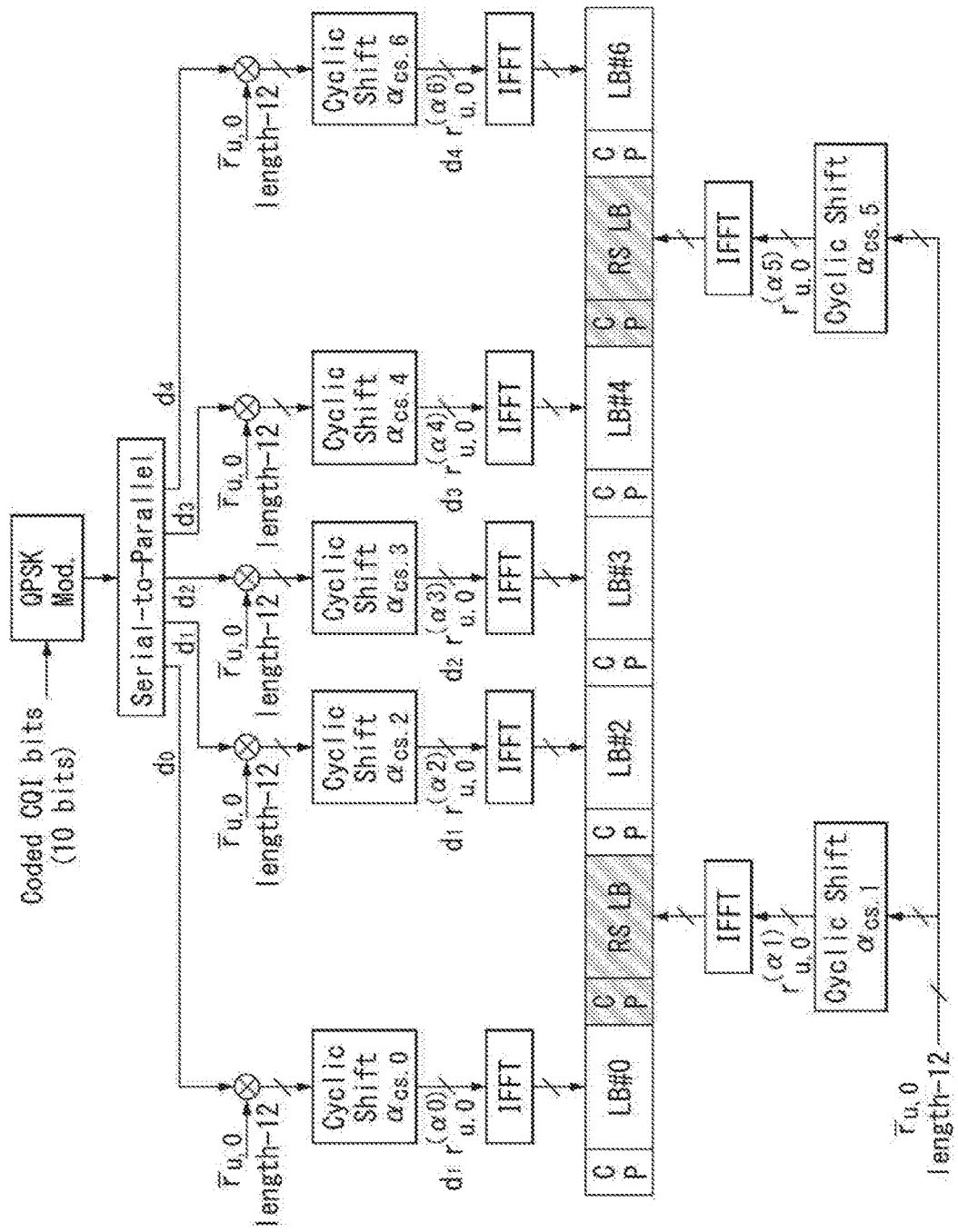
[FIG. 6]

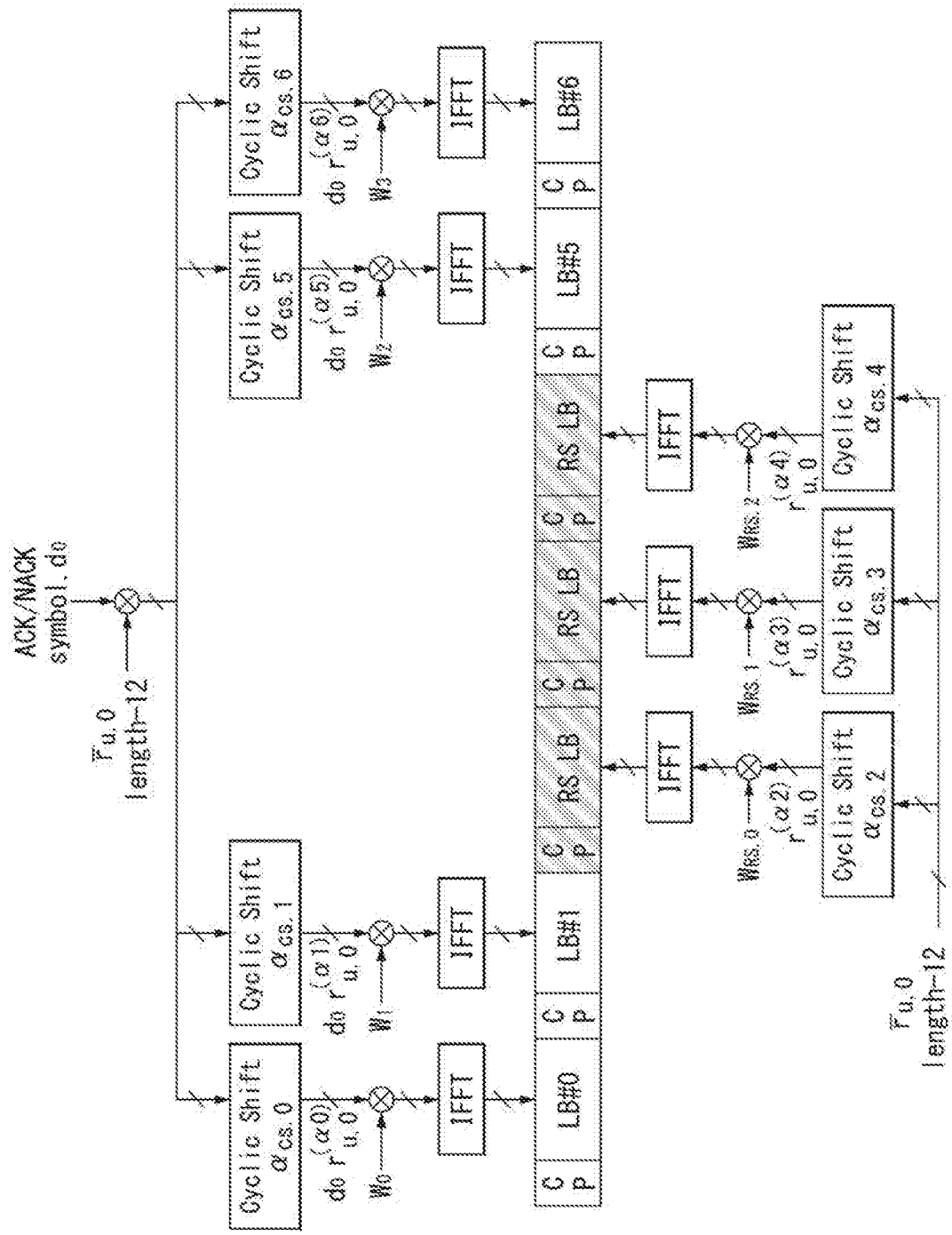
[FIG. 7]

[FIG. 8]
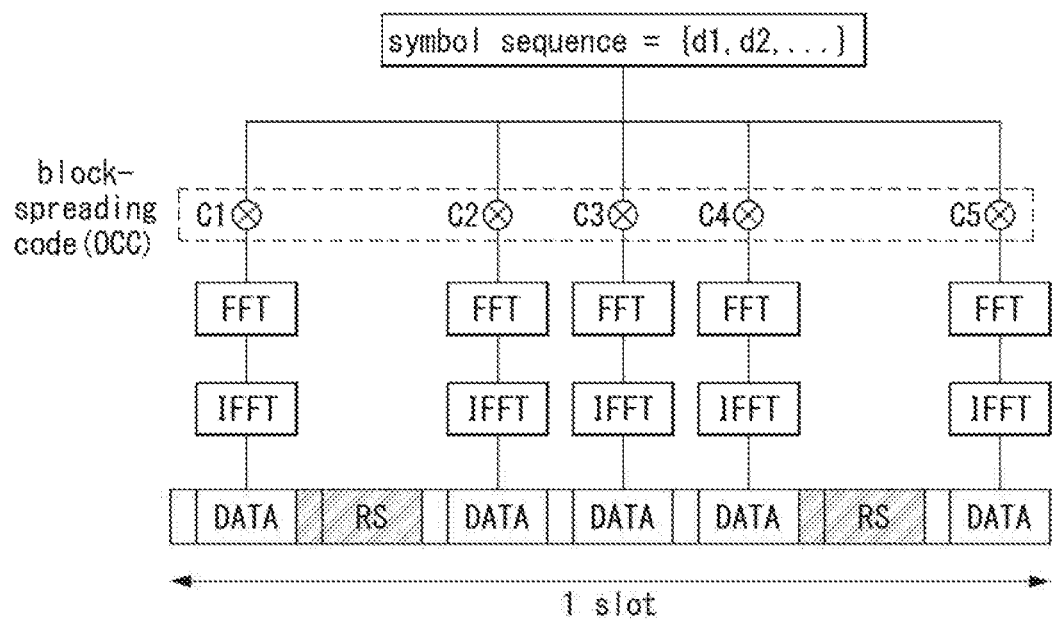

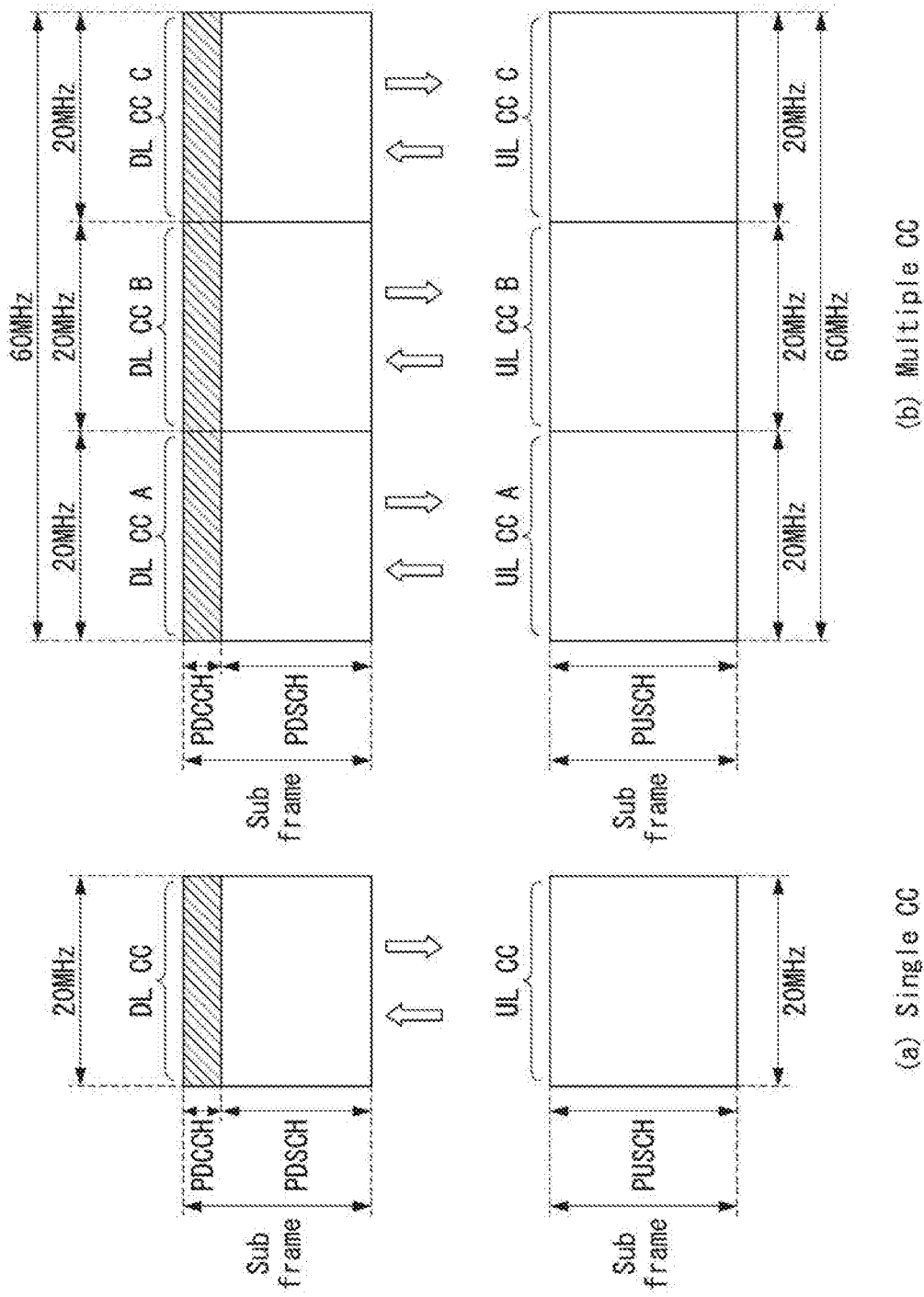

[FIG. 10]
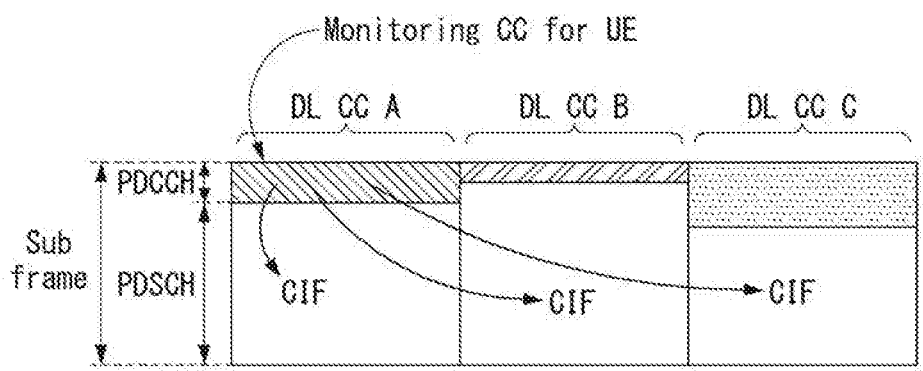
[FIG. 11]
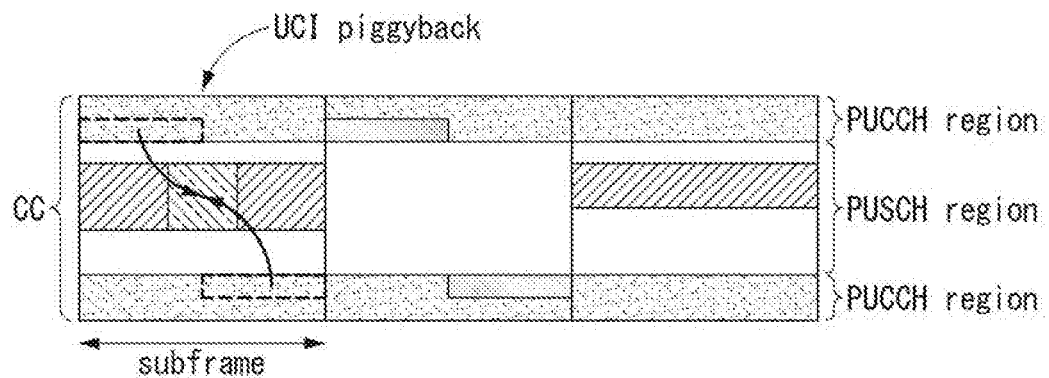

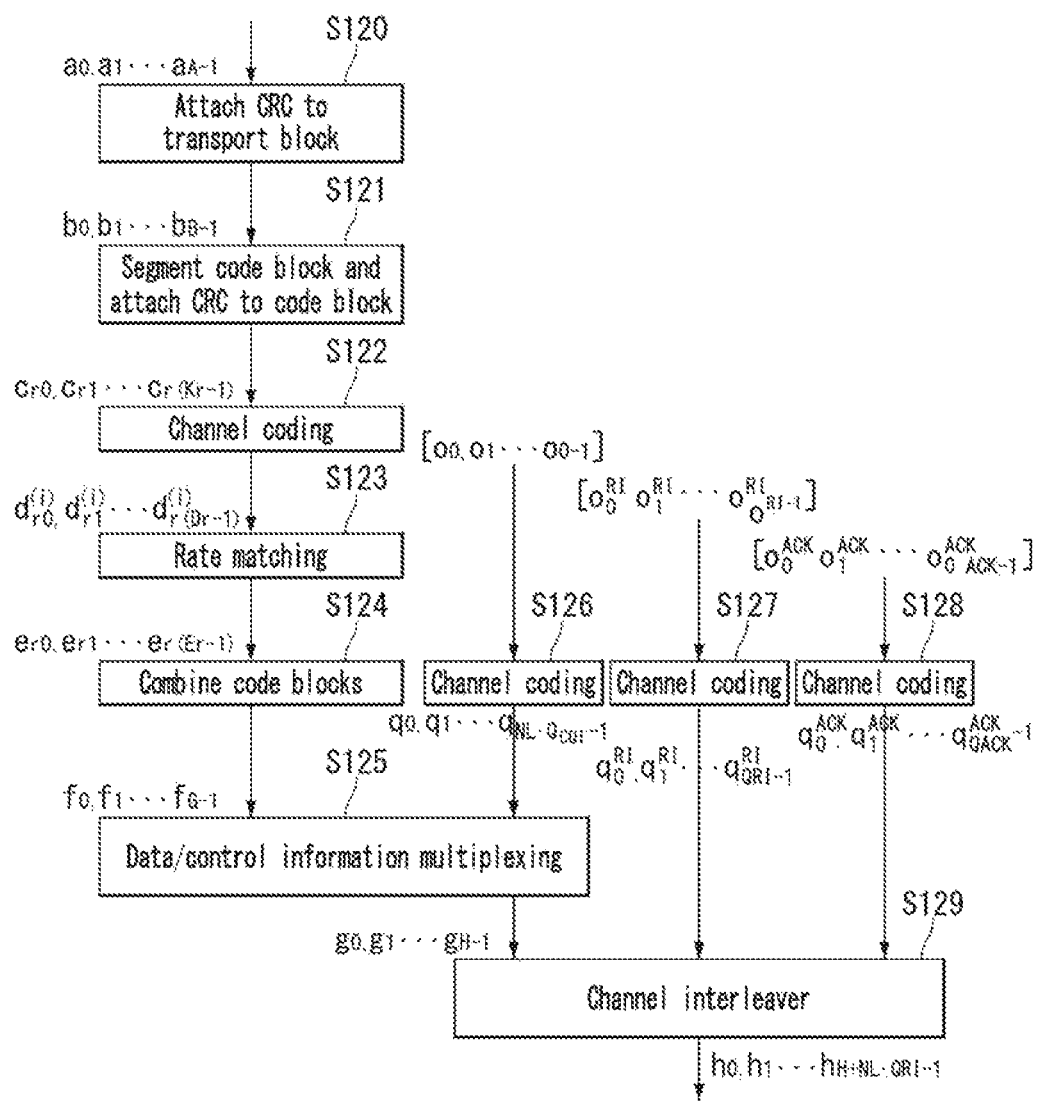
[FIG. 12]

[FIG. 13]
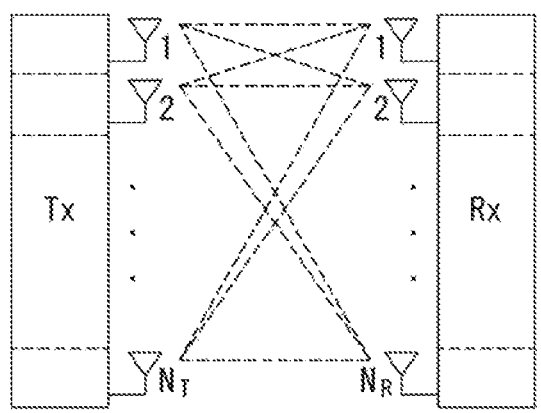
[FIG. 14]
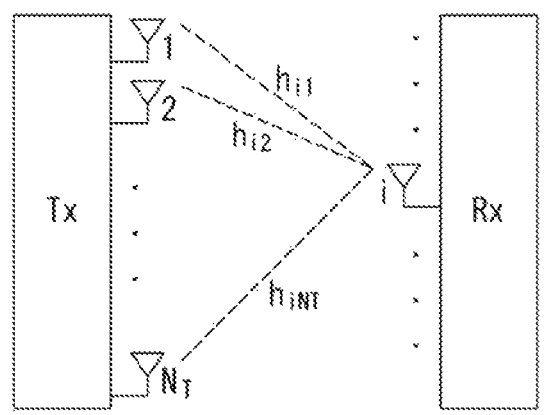

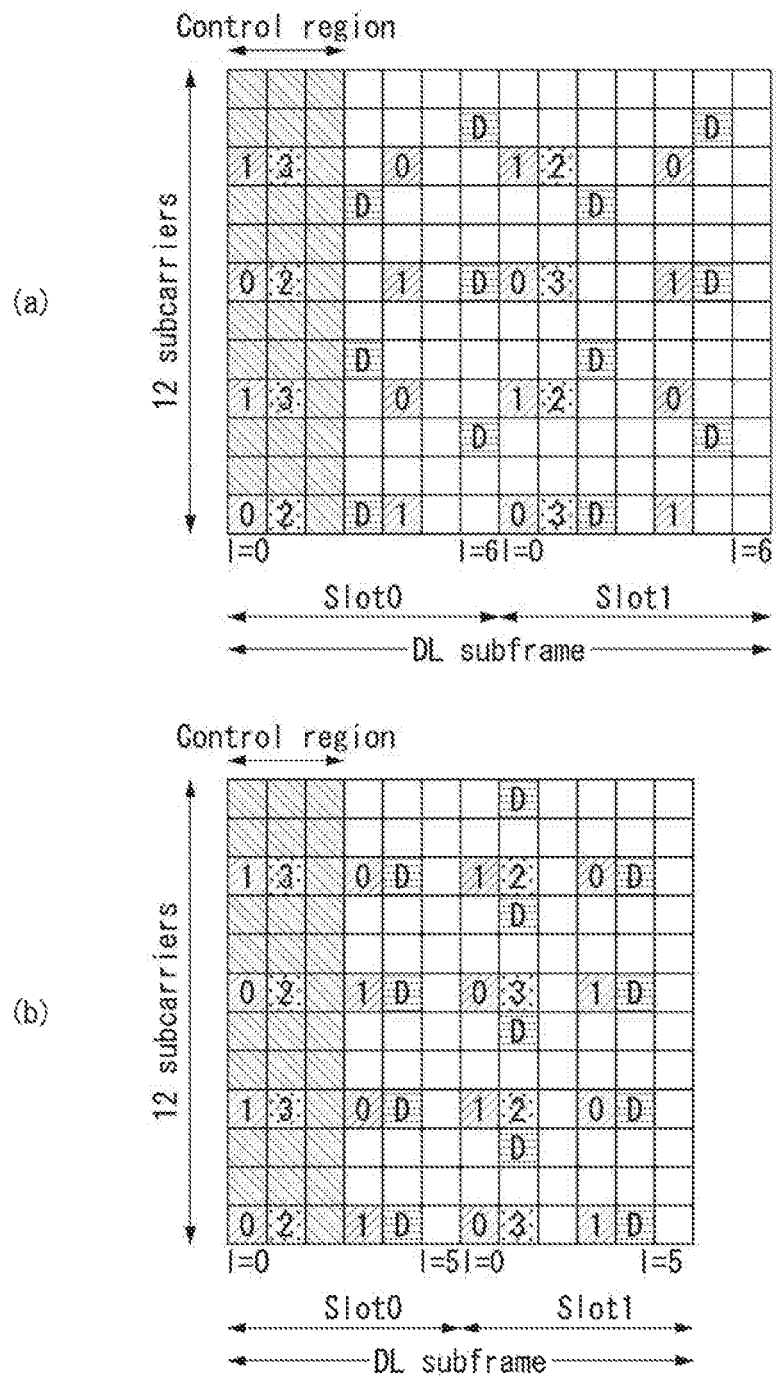

[FIG. 16]
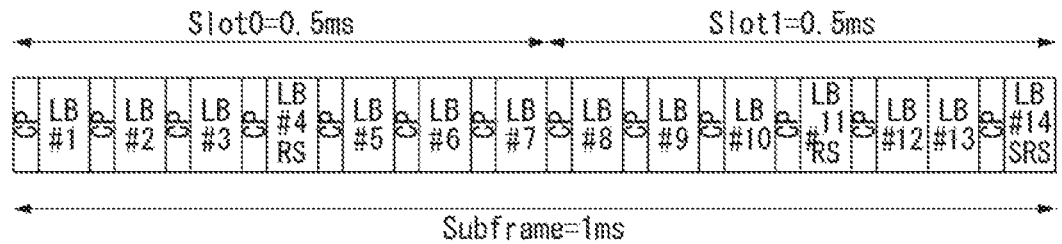
[FIG. 17]
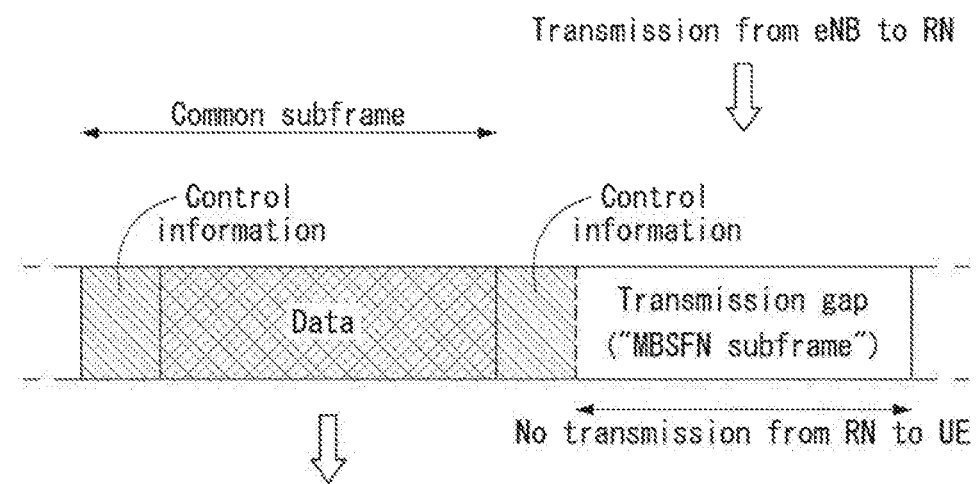
[FIG. 18]
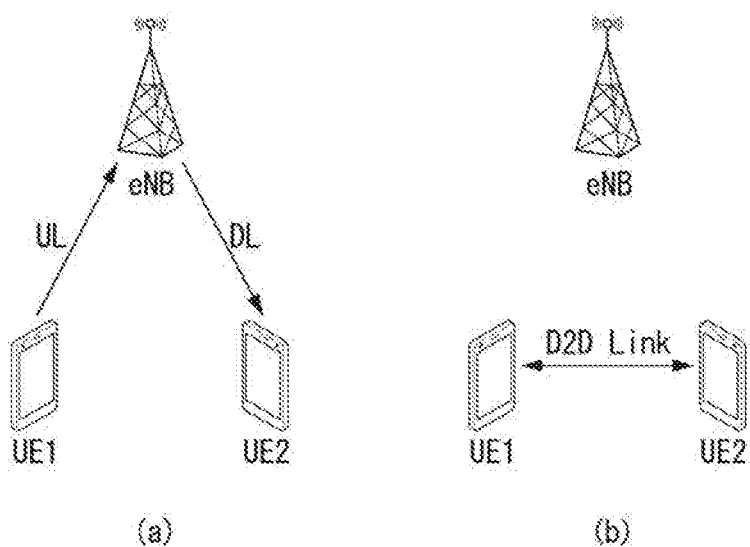

[FIG. 19]
(a) 
(b) 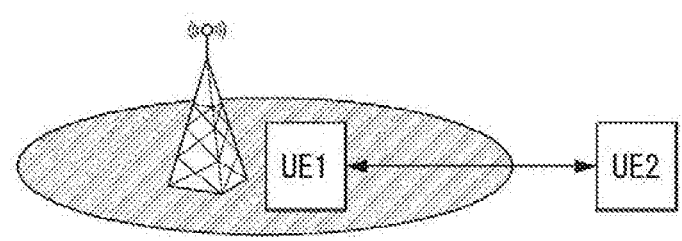
(c) 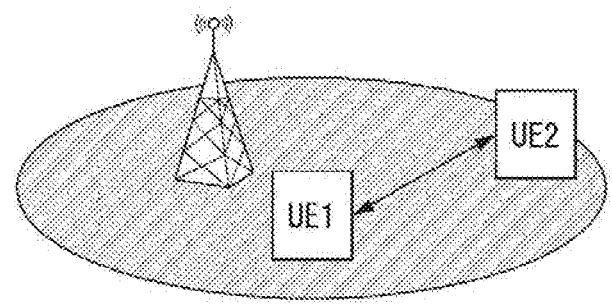
(d) 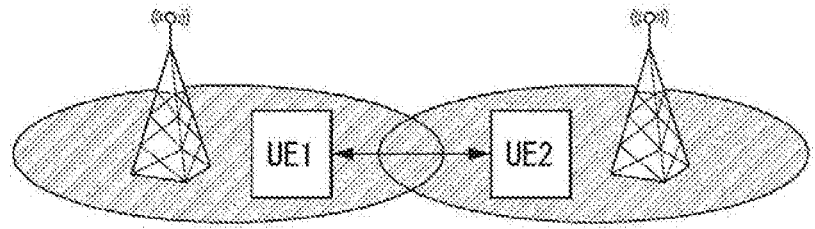

[FIG. 20]
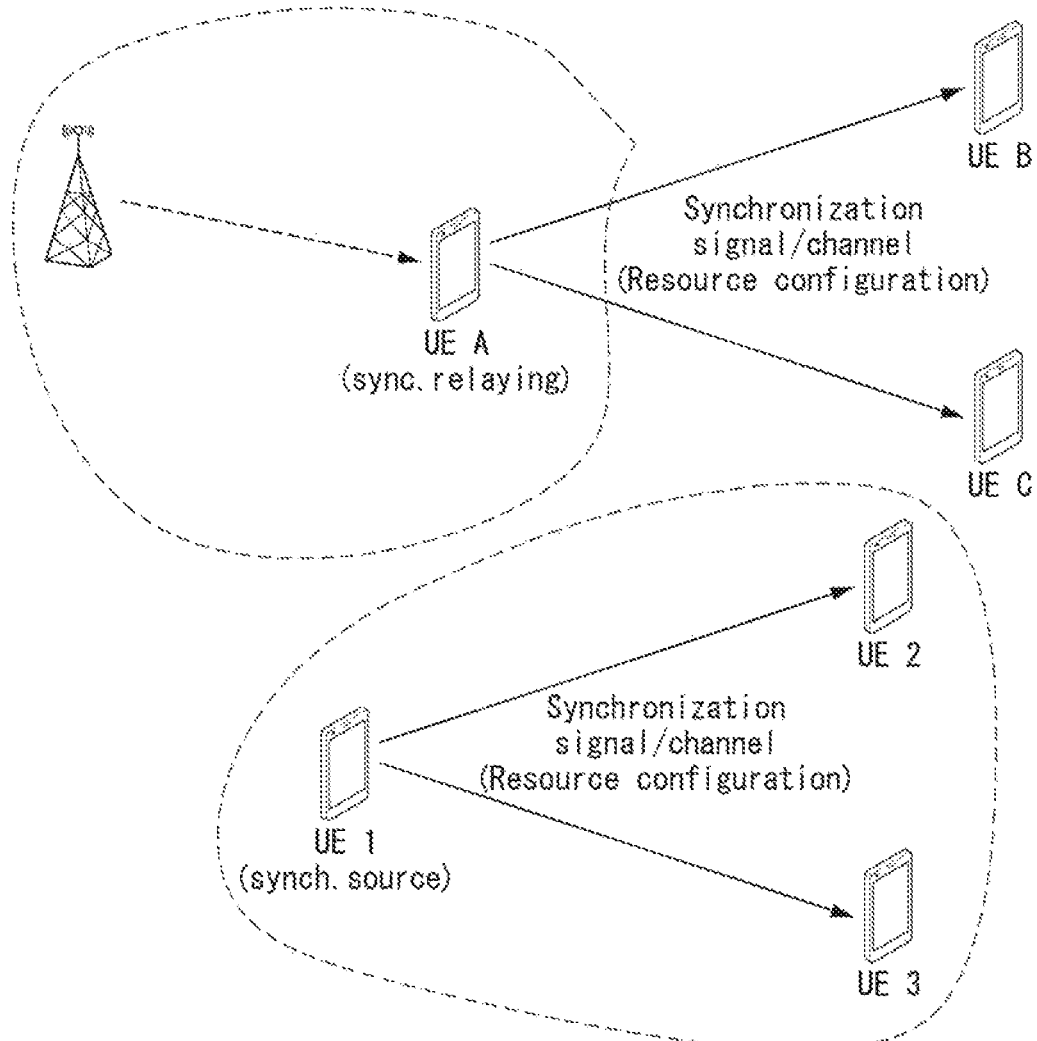

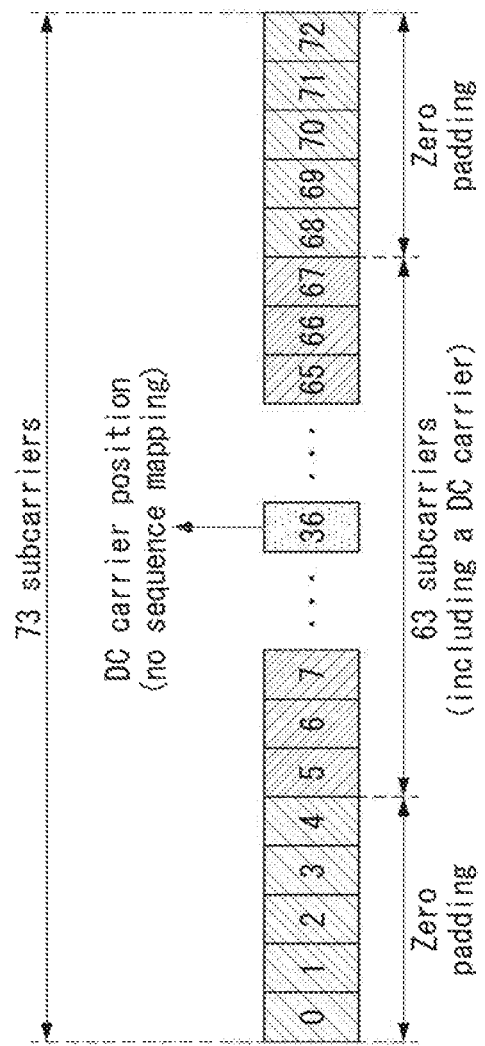
[FIG. 21]

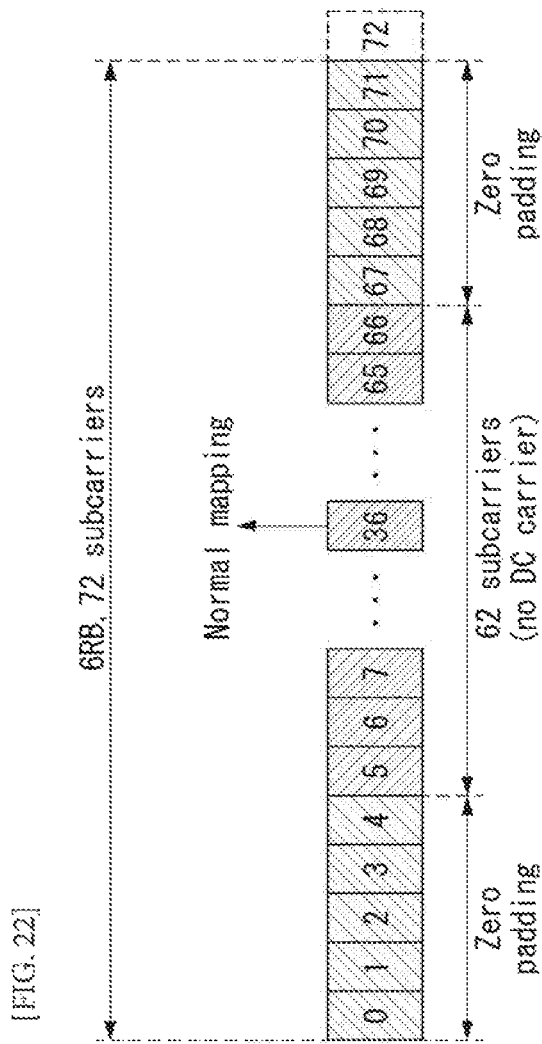
[FIG. 22]

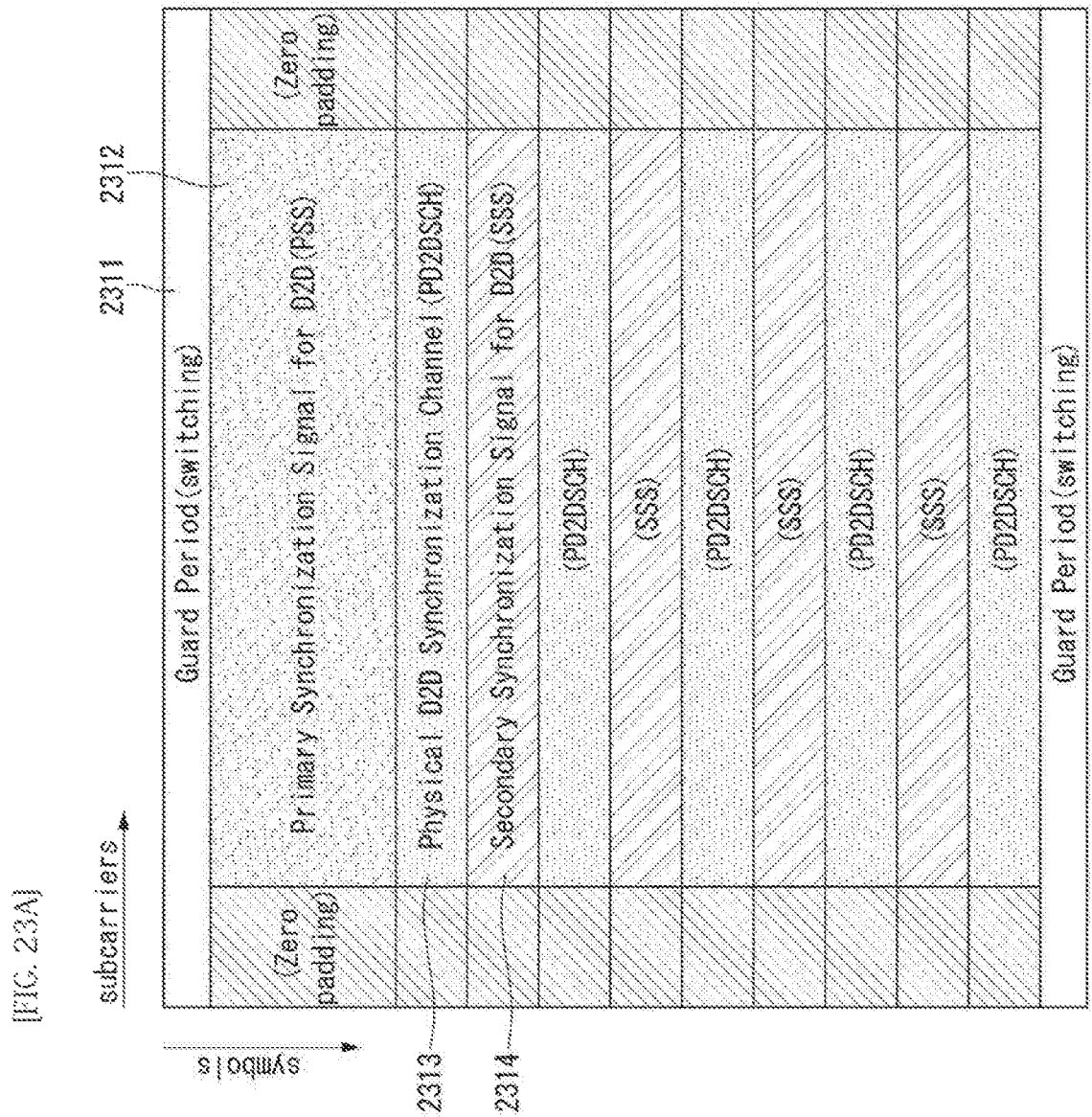

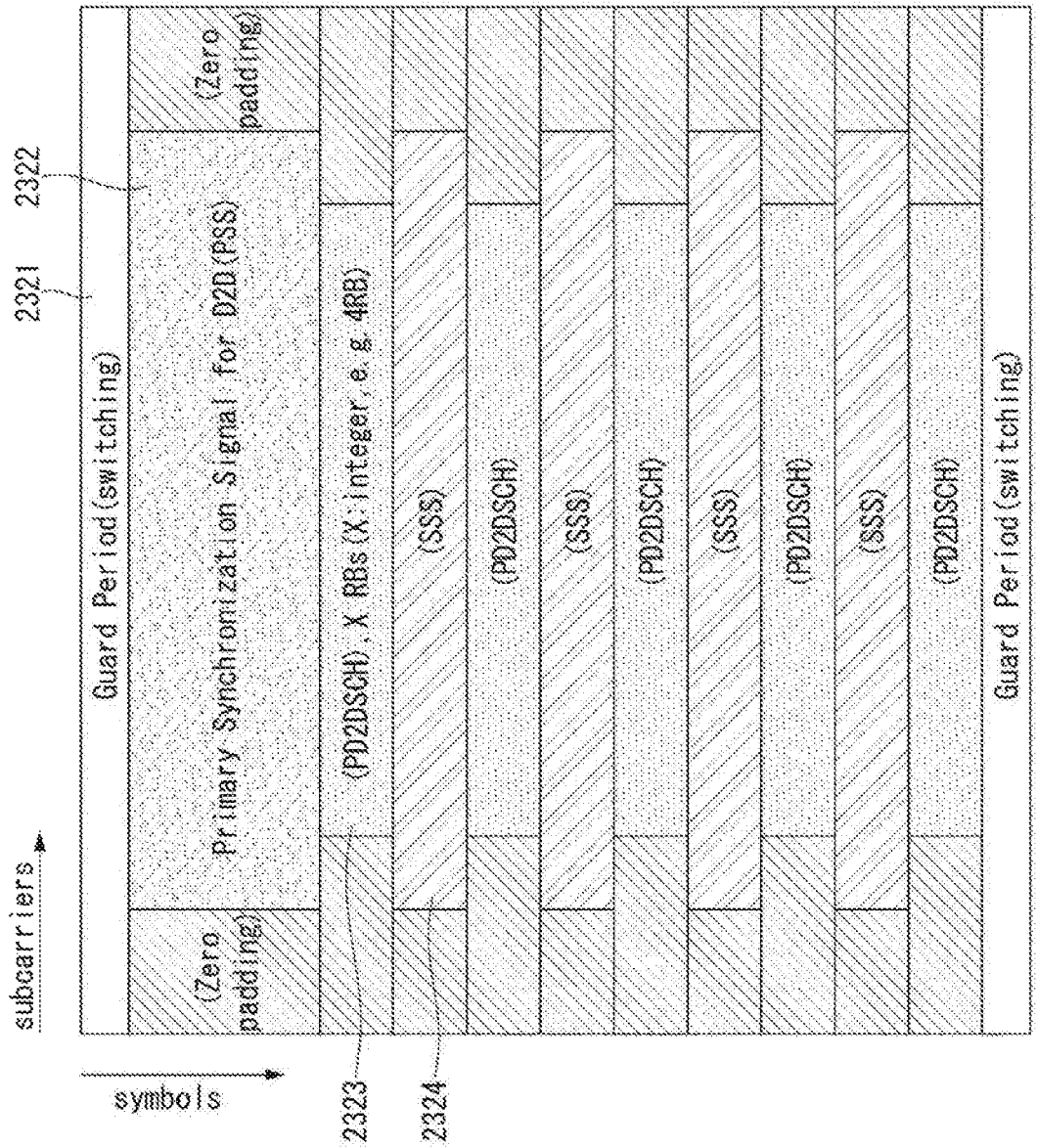

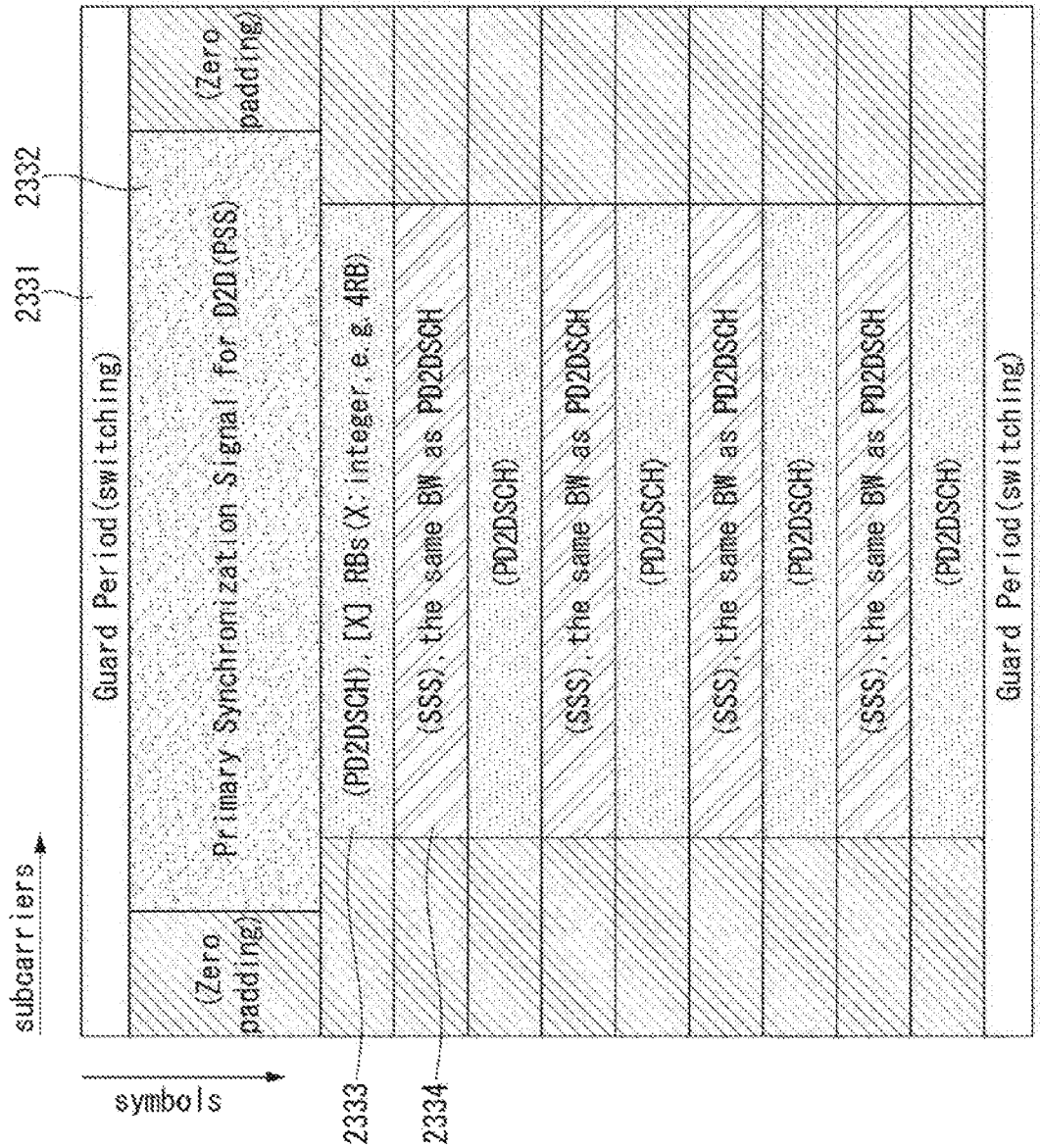

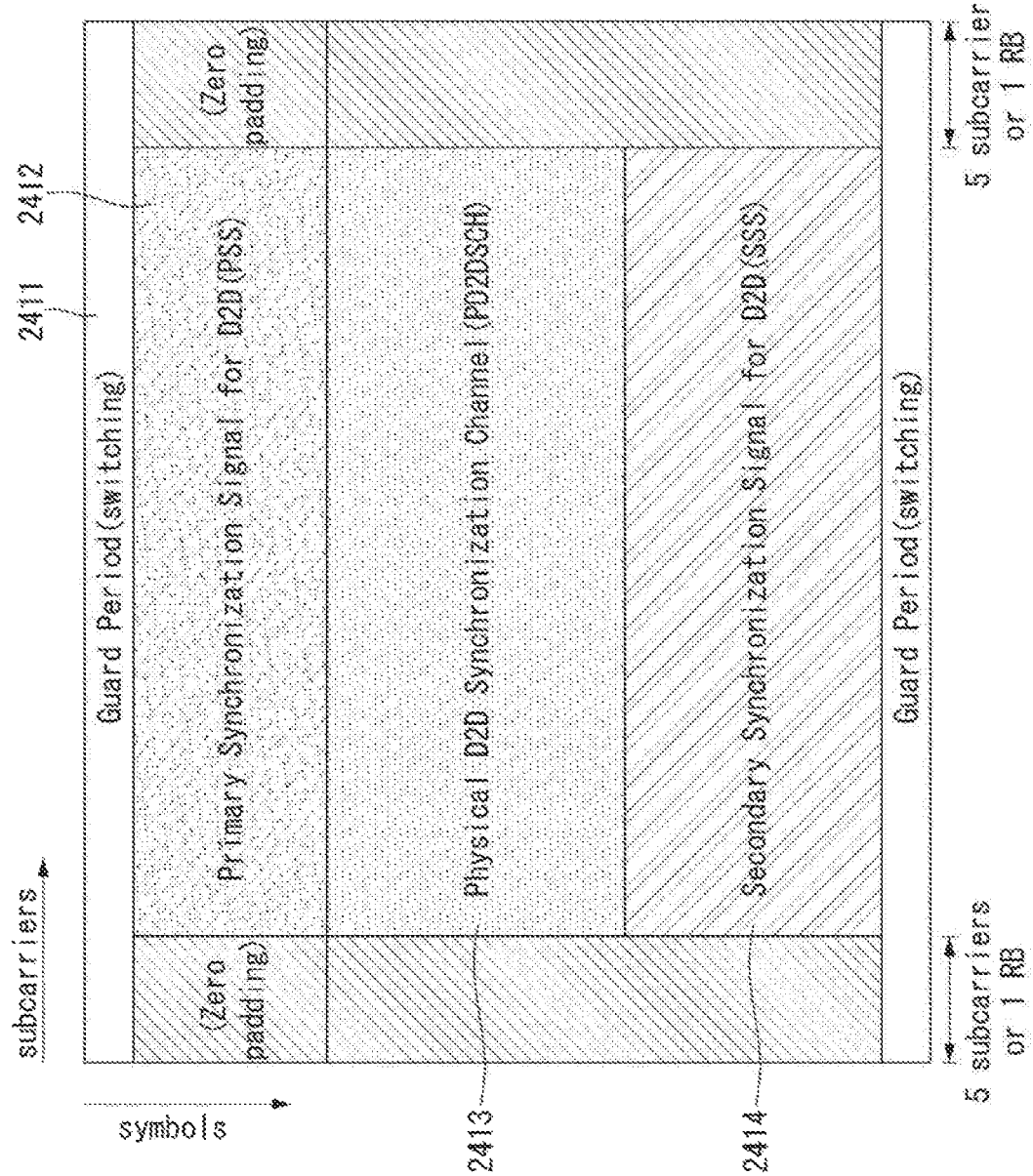

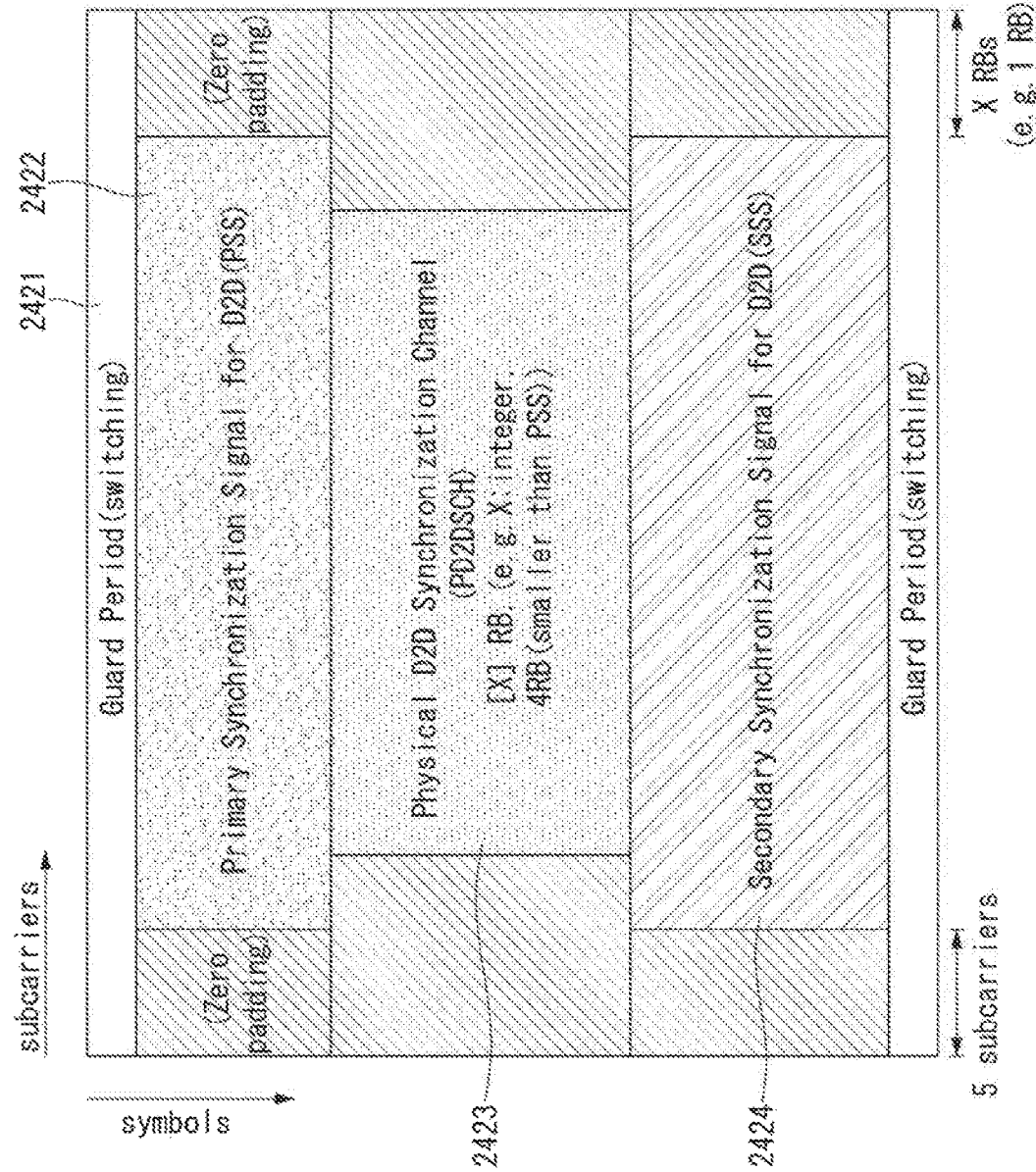

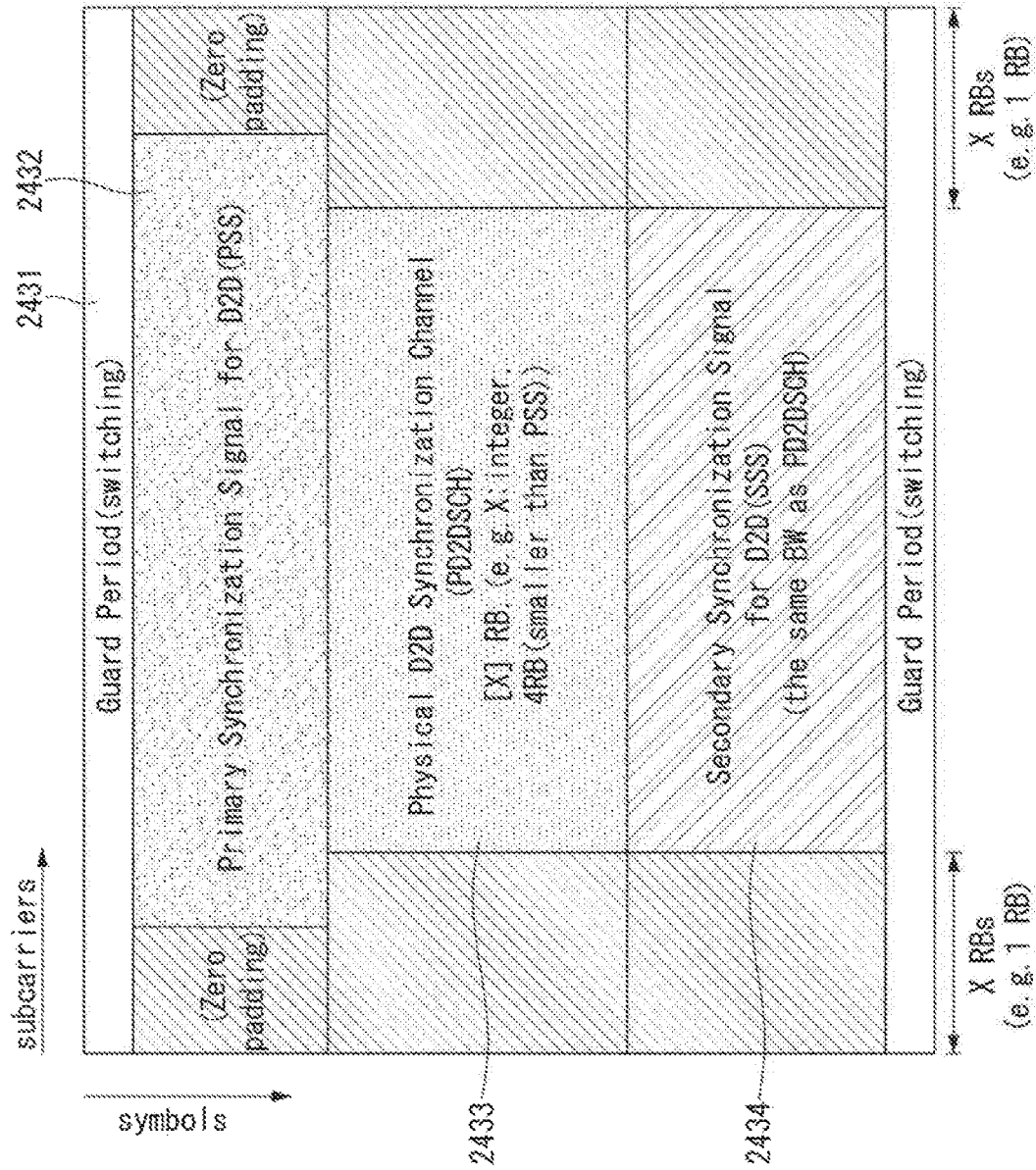

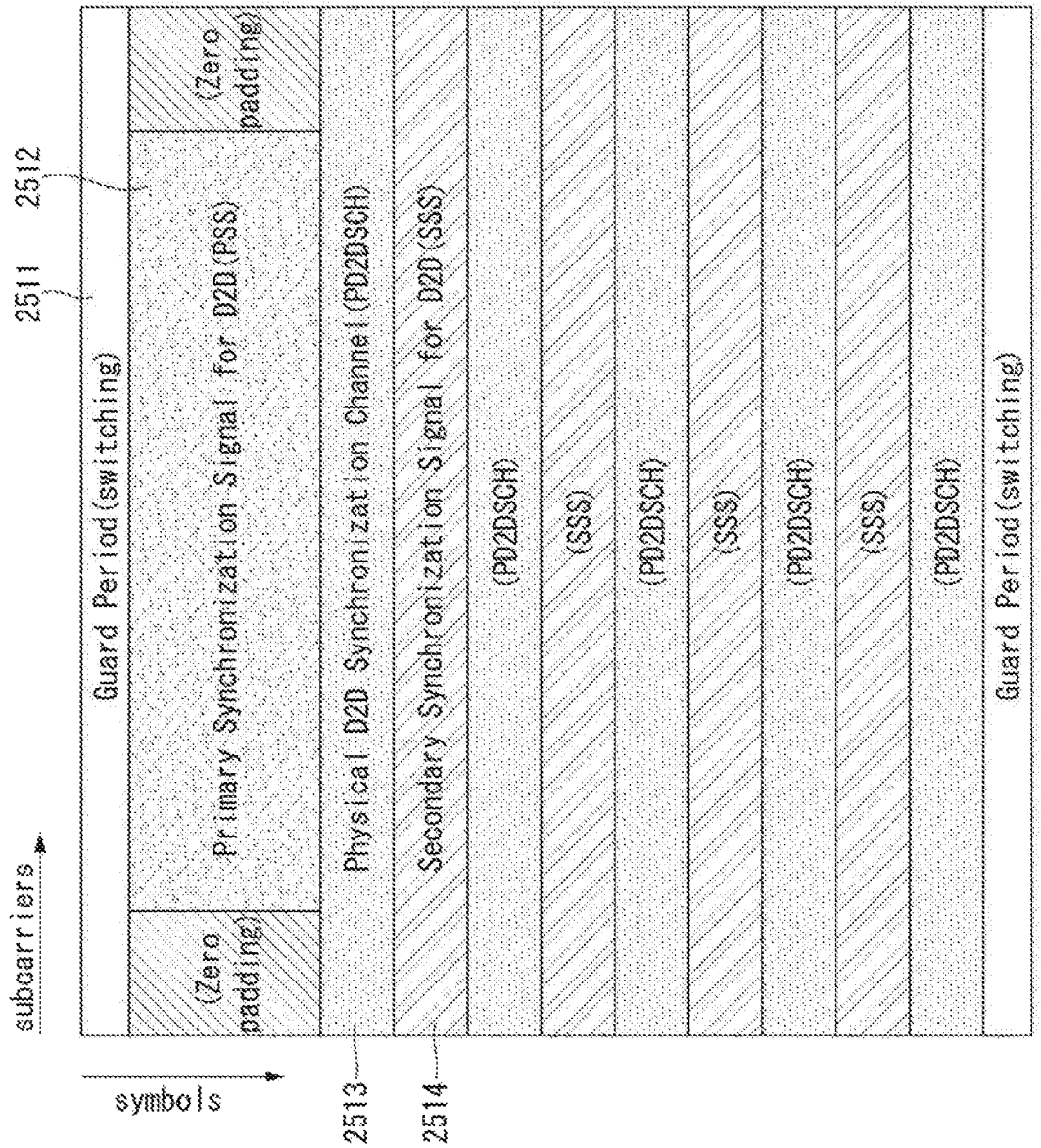

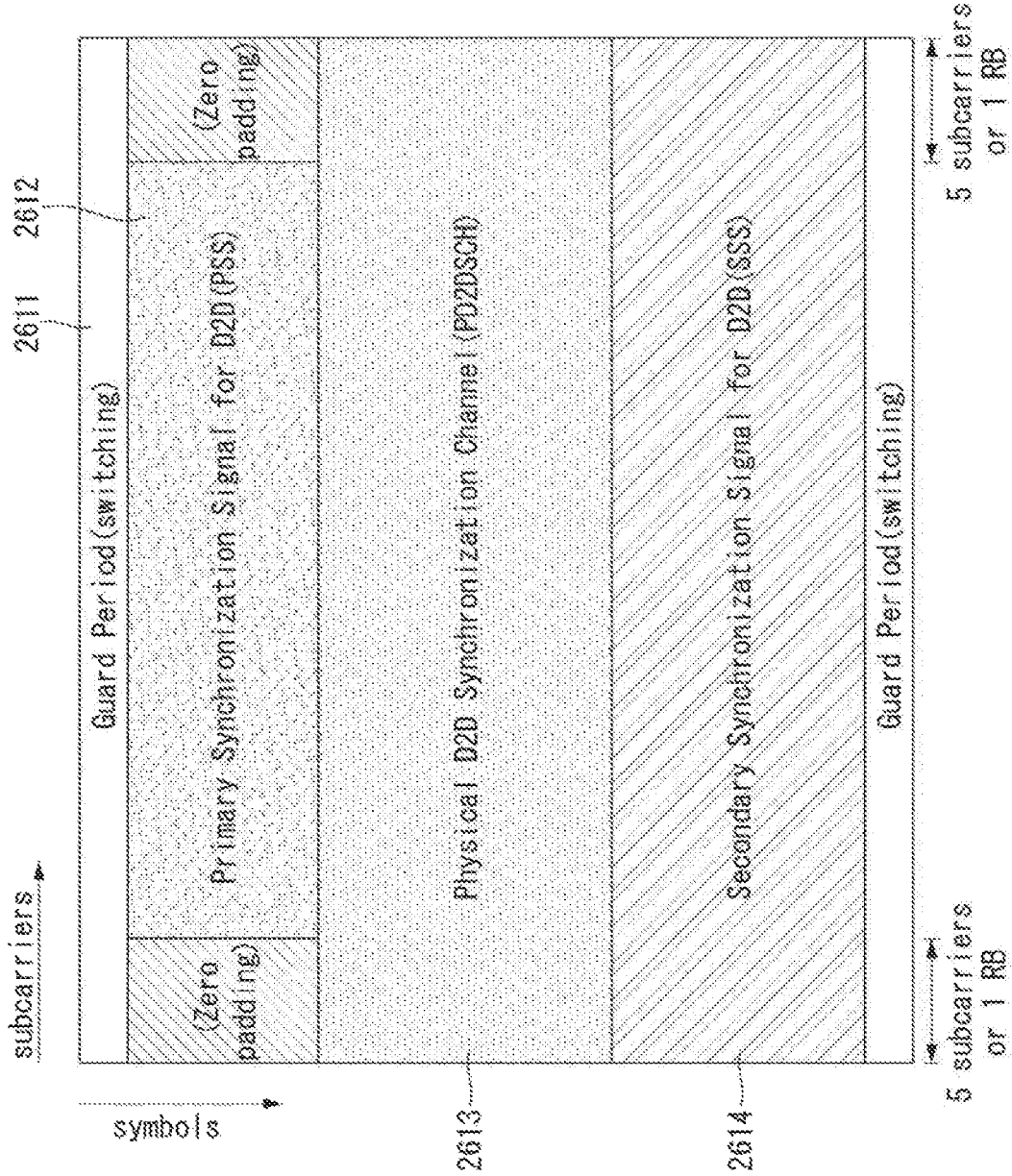

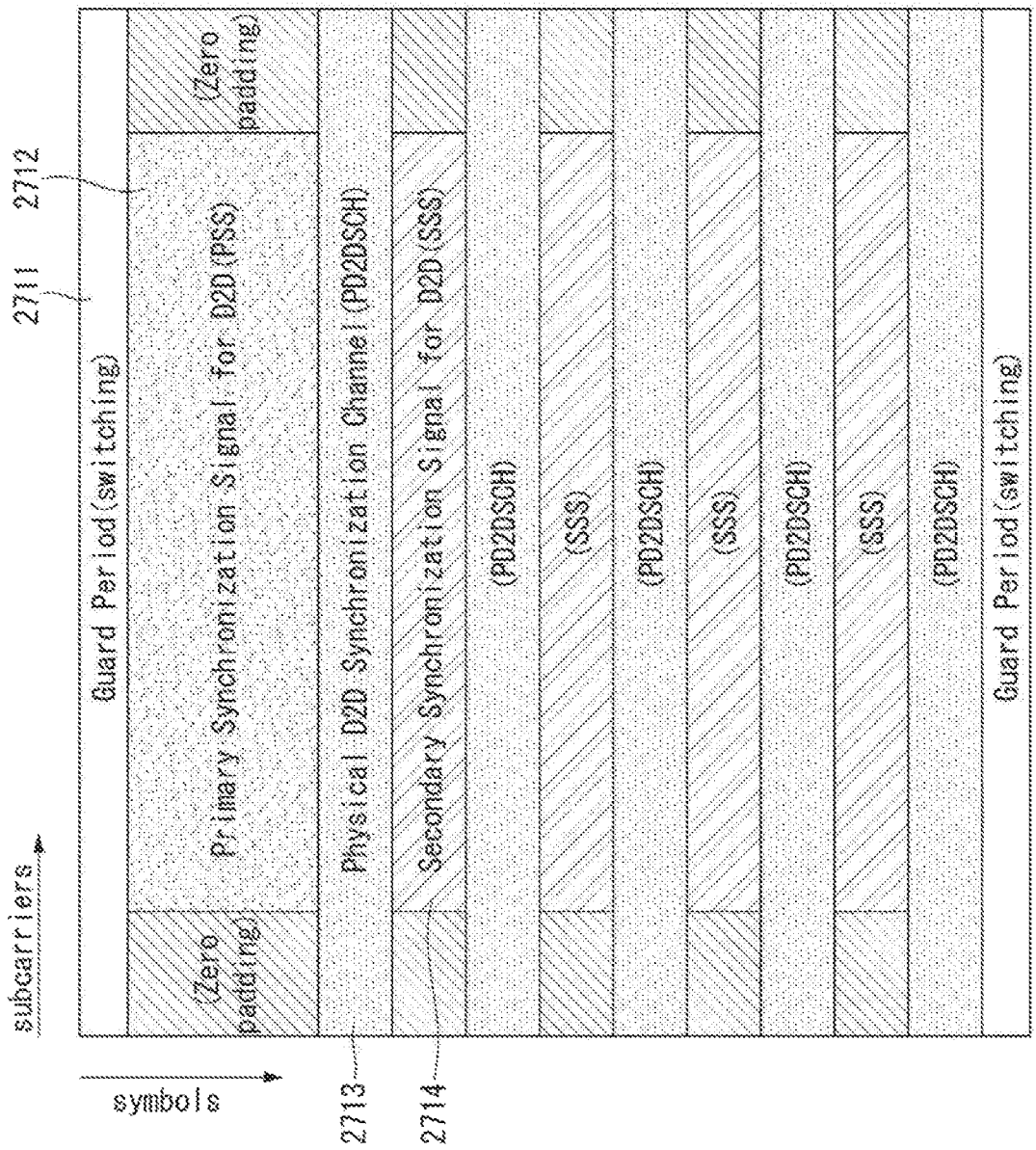

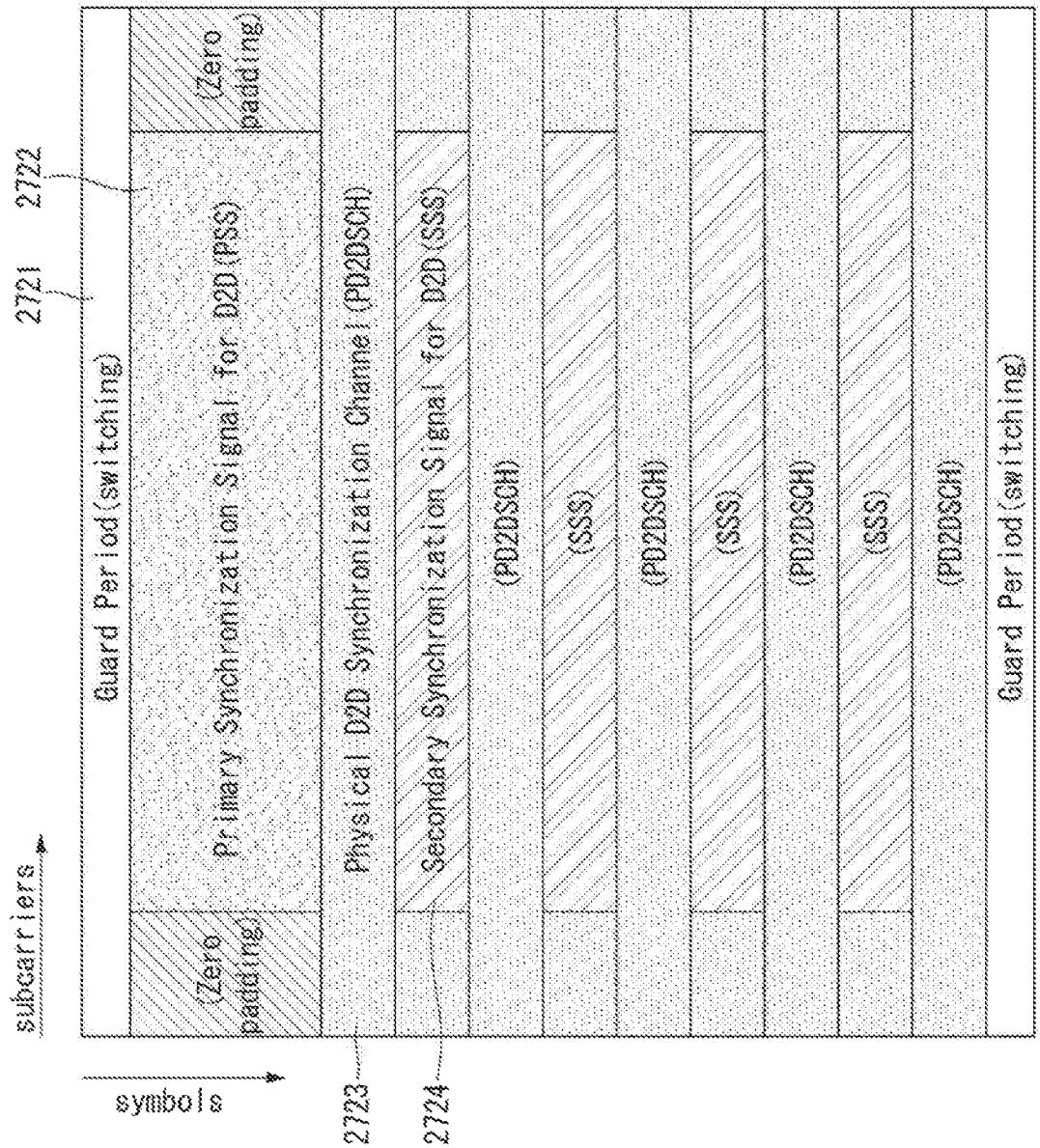

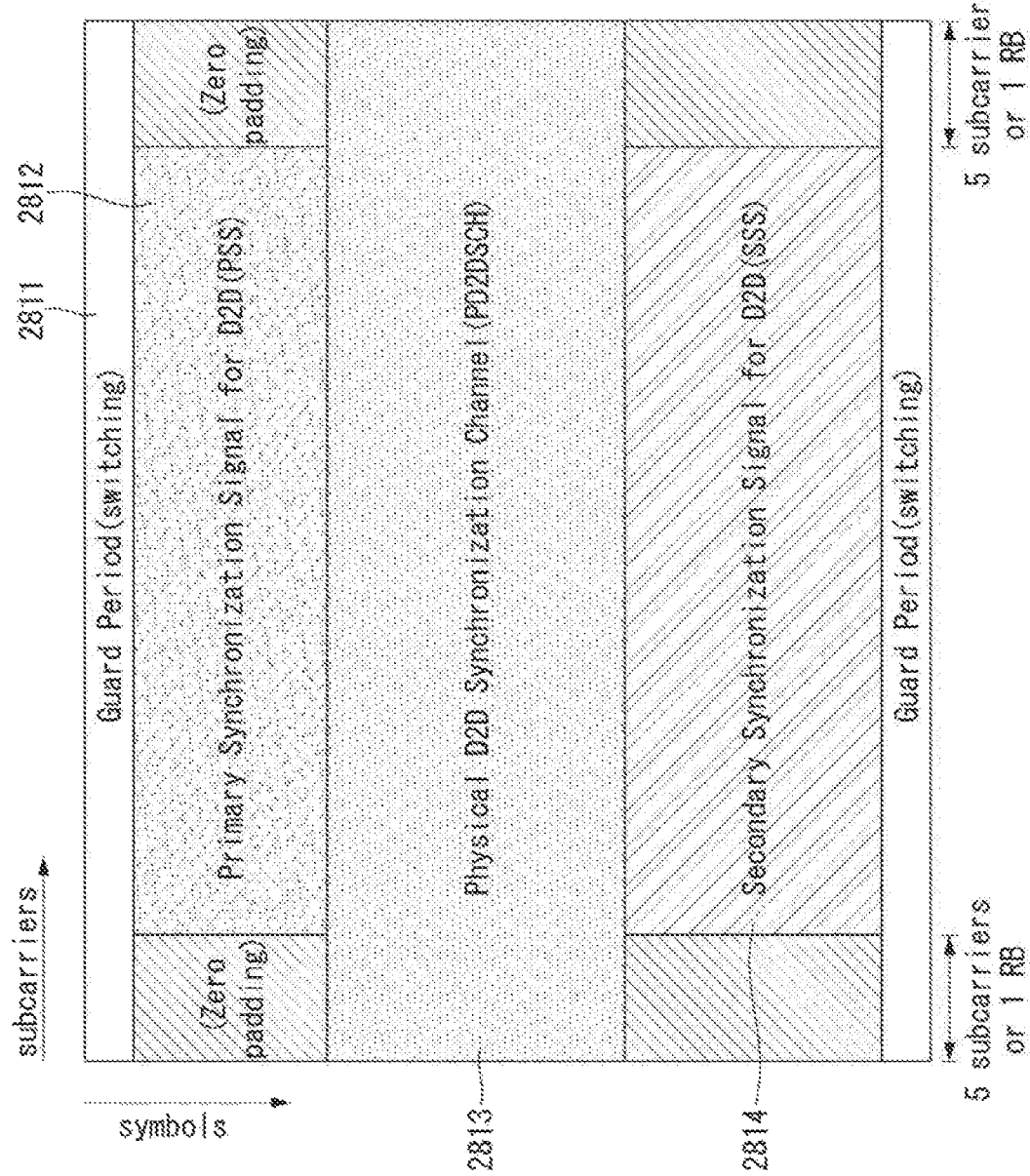

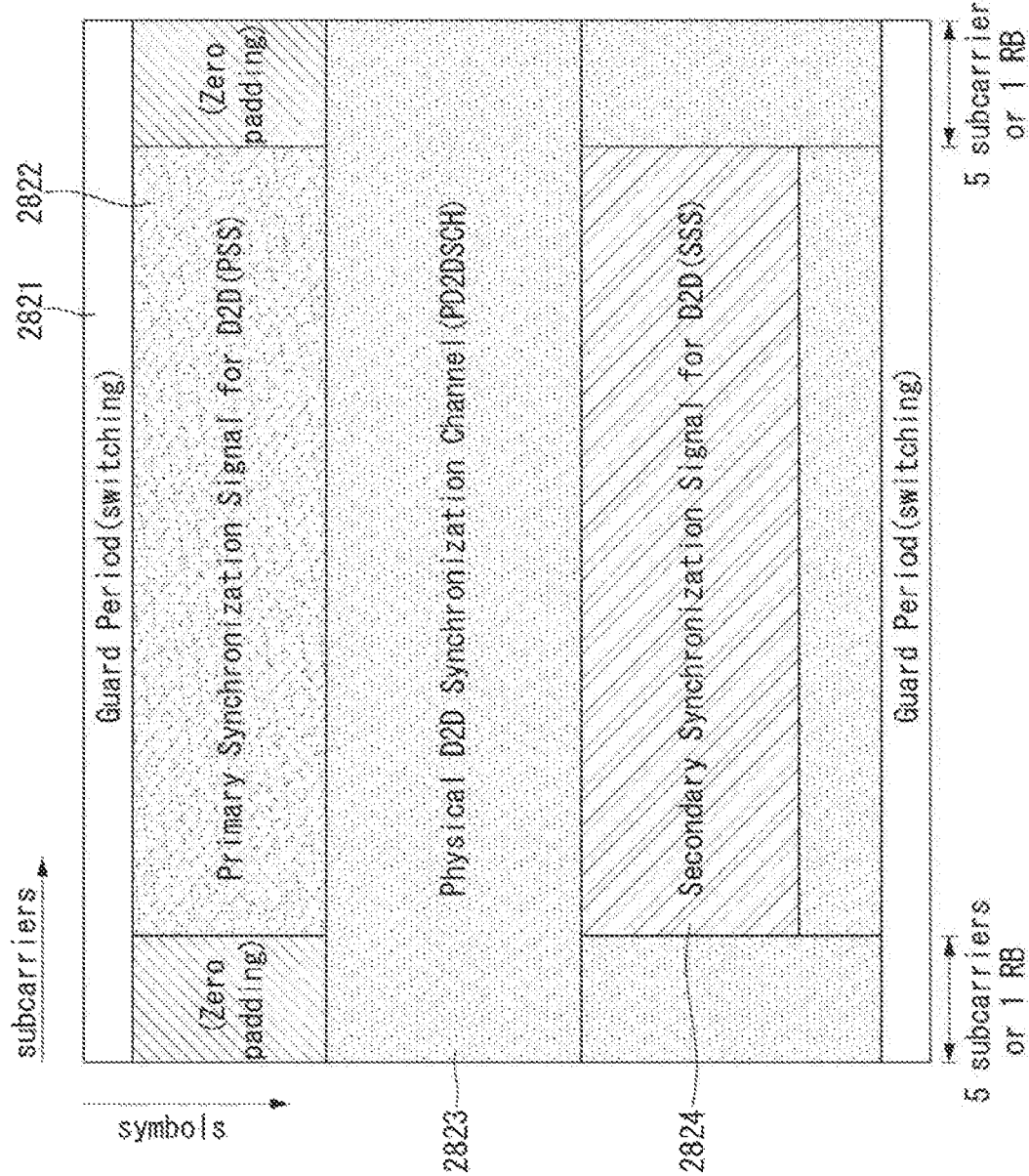

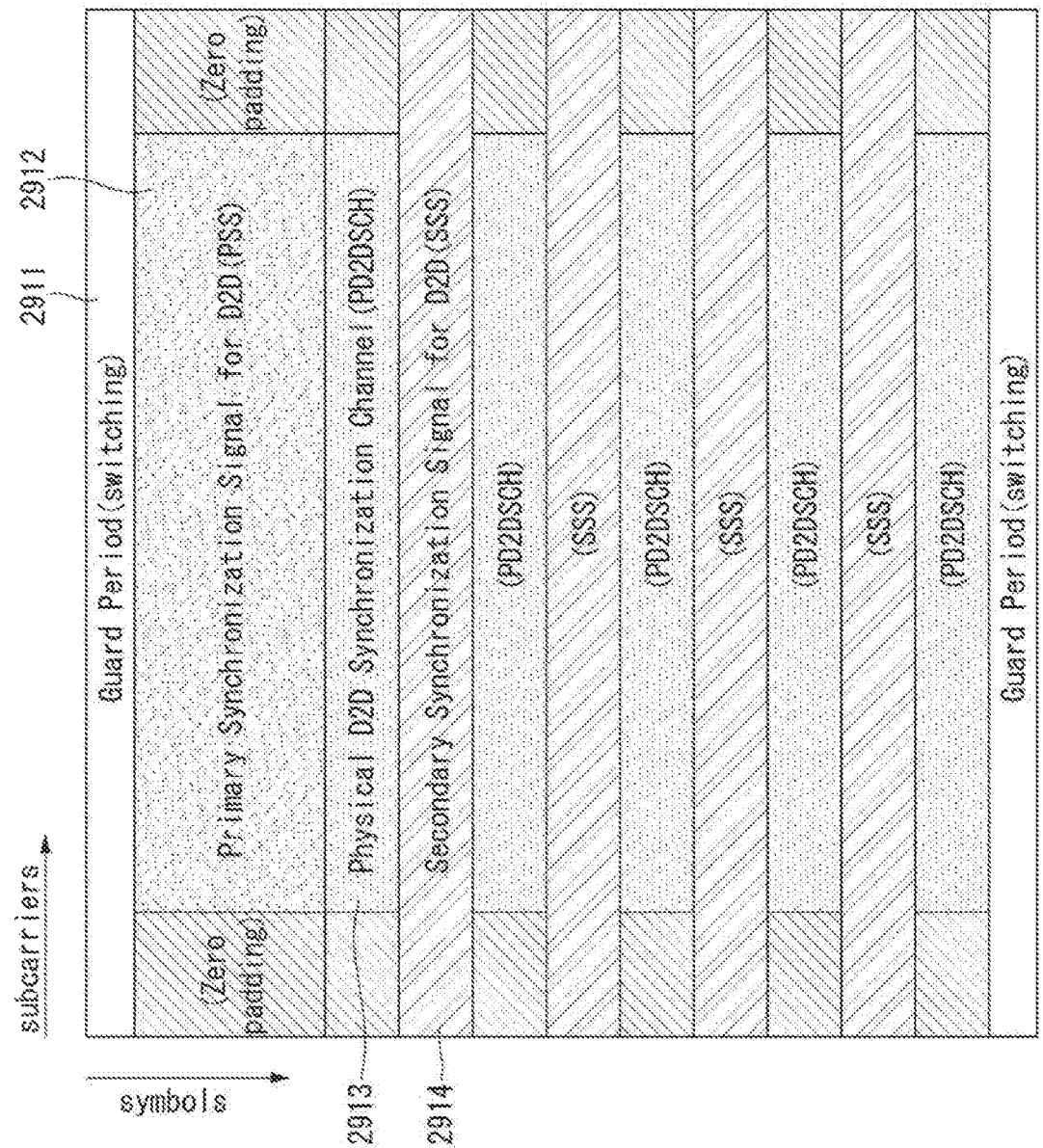

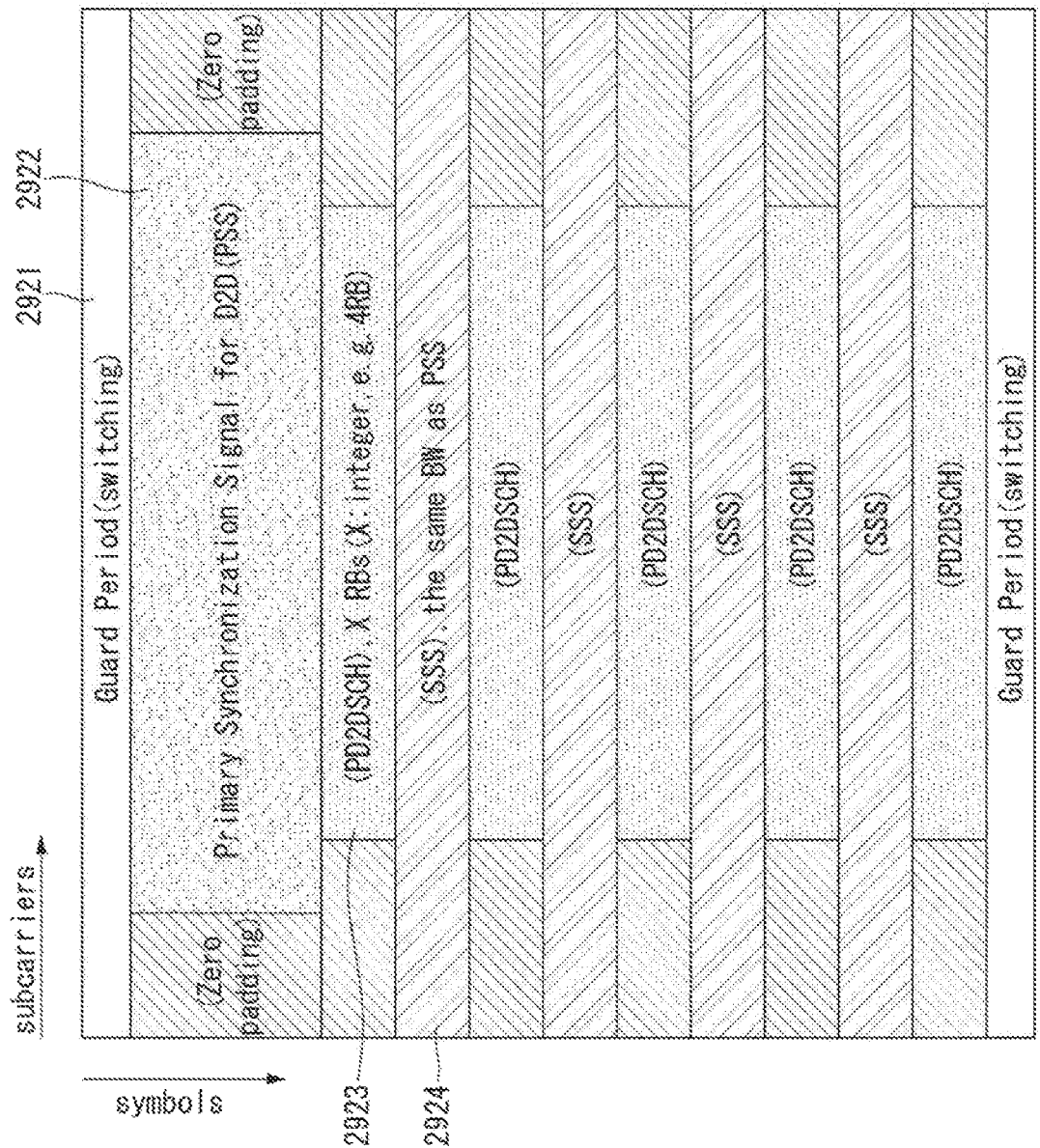

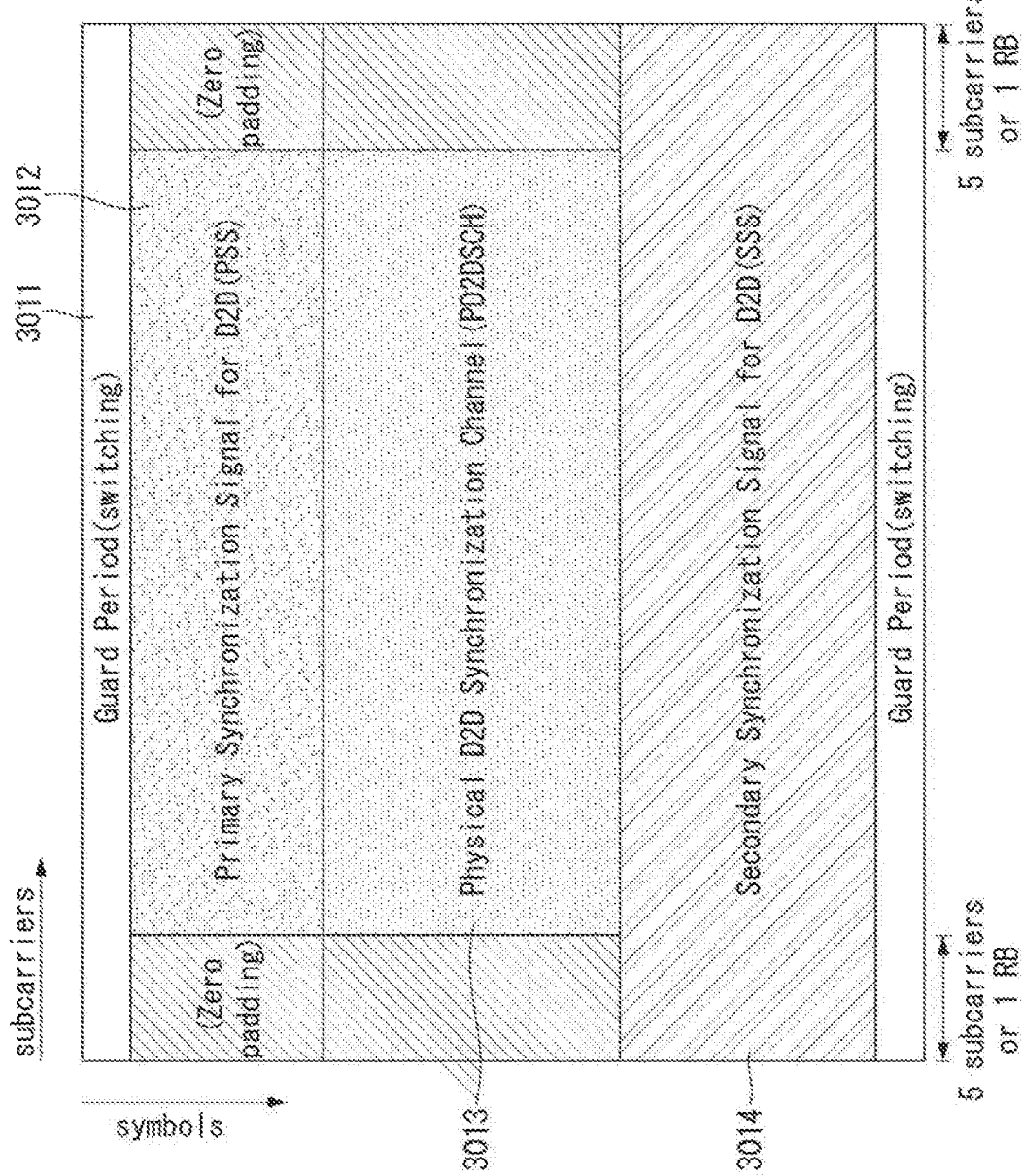

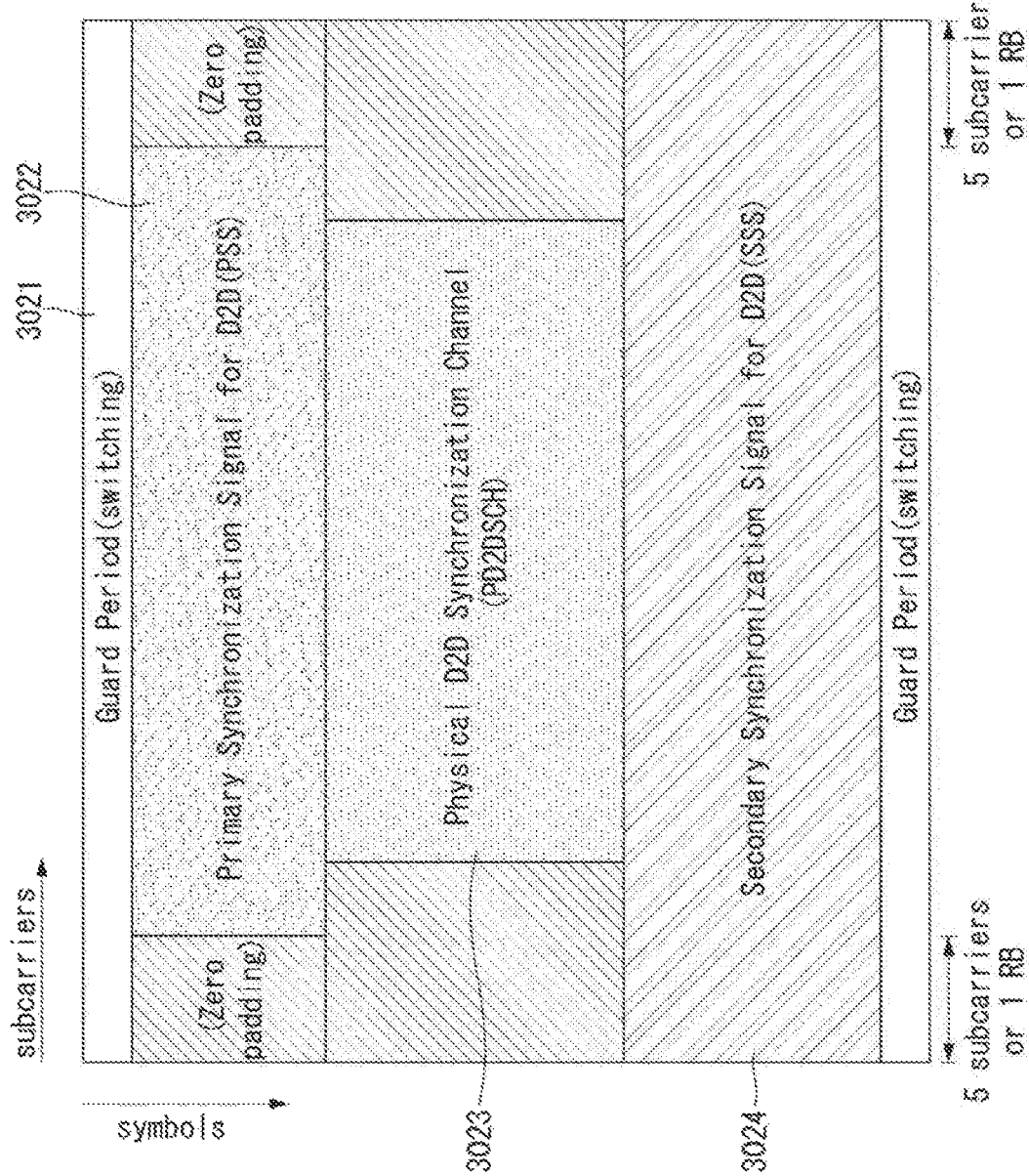

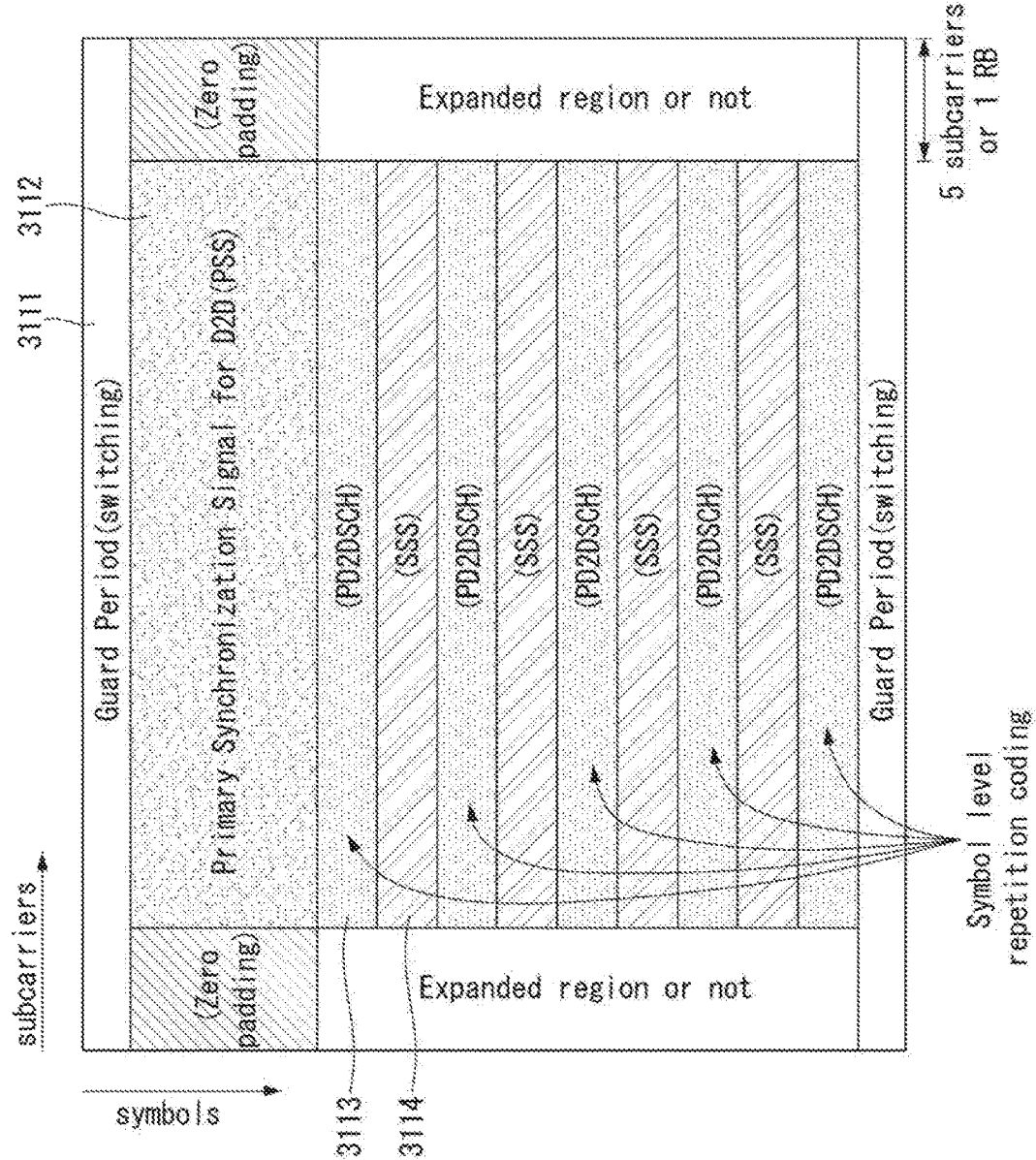

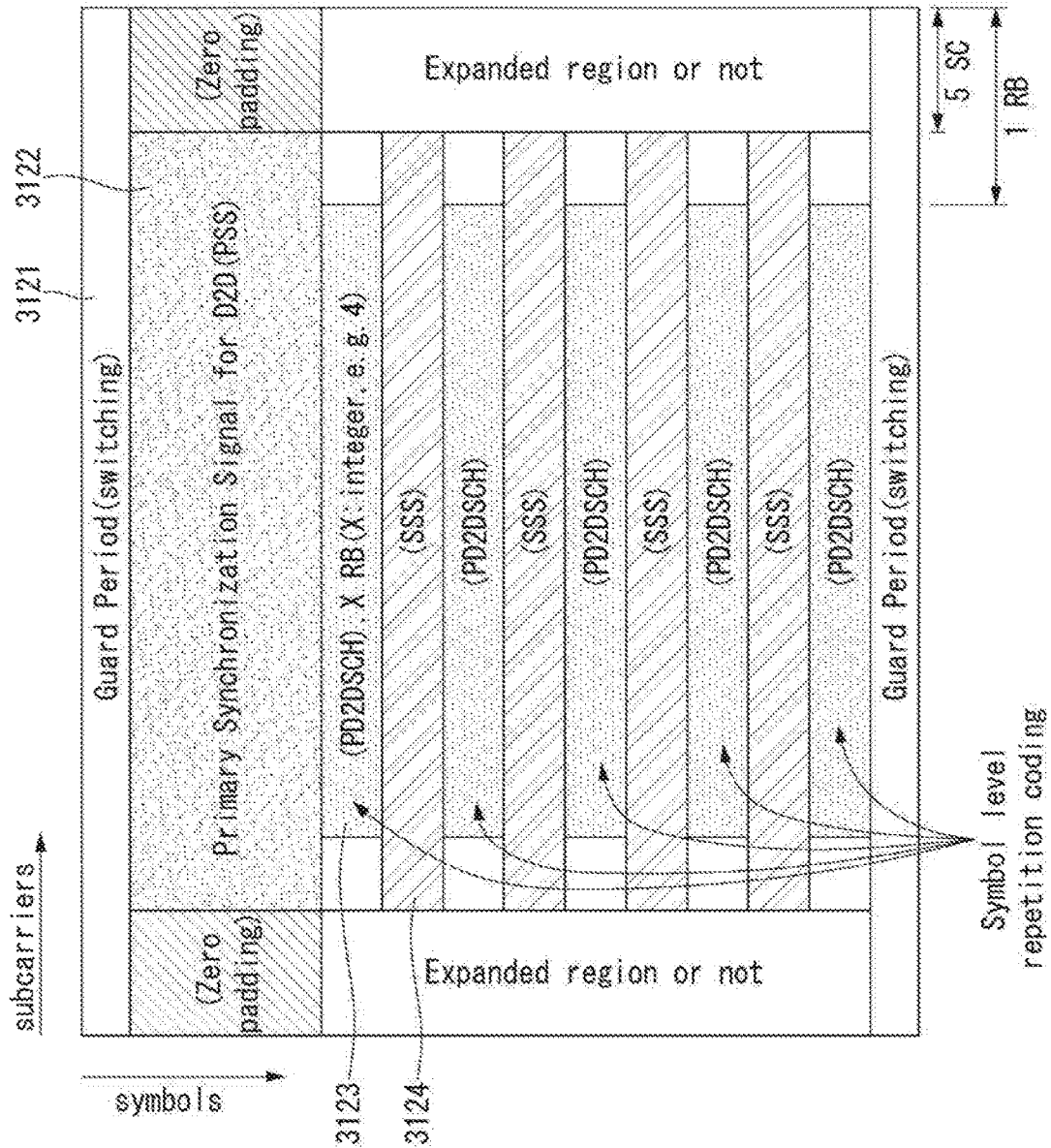

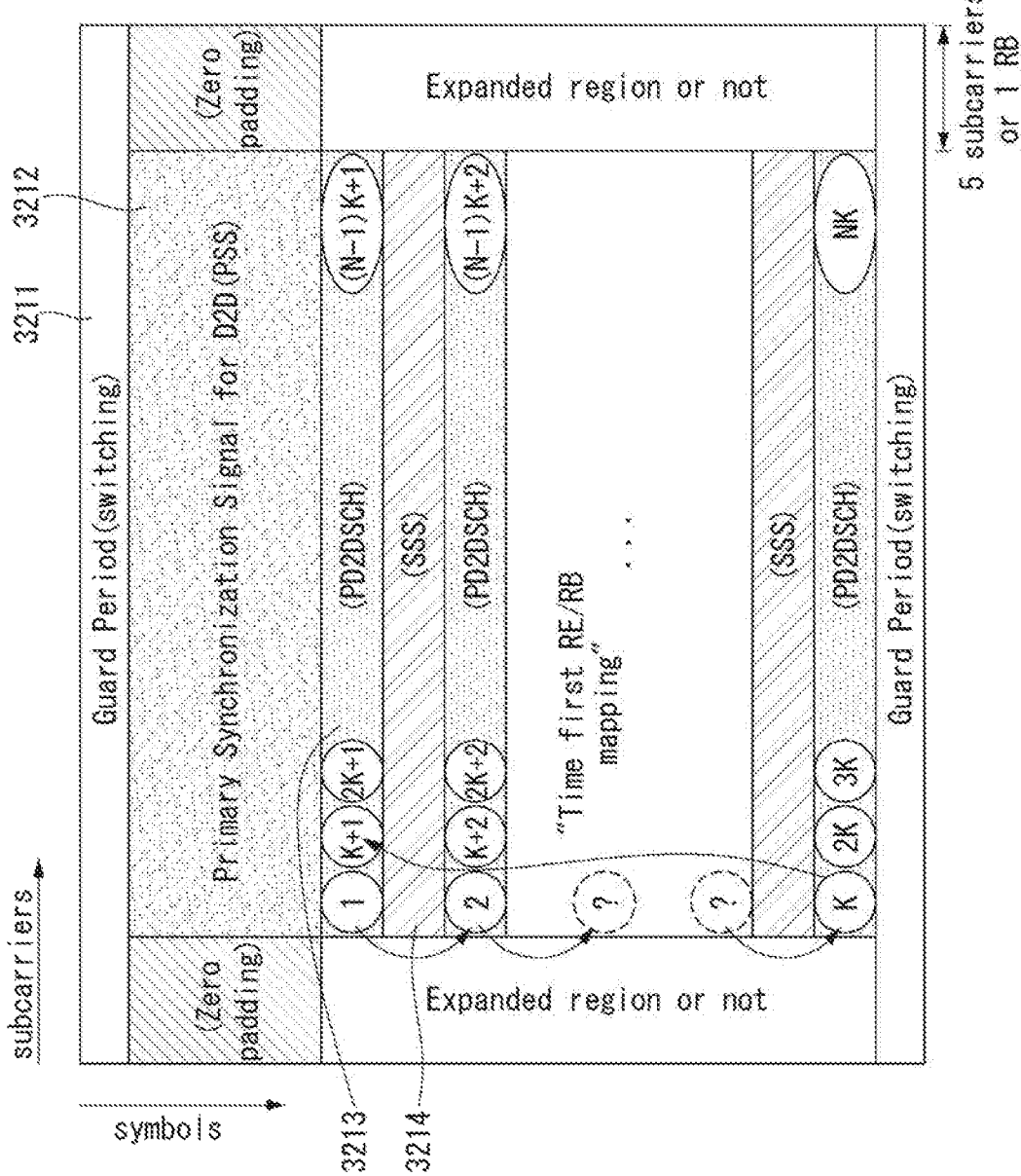
[FIG. 32A]

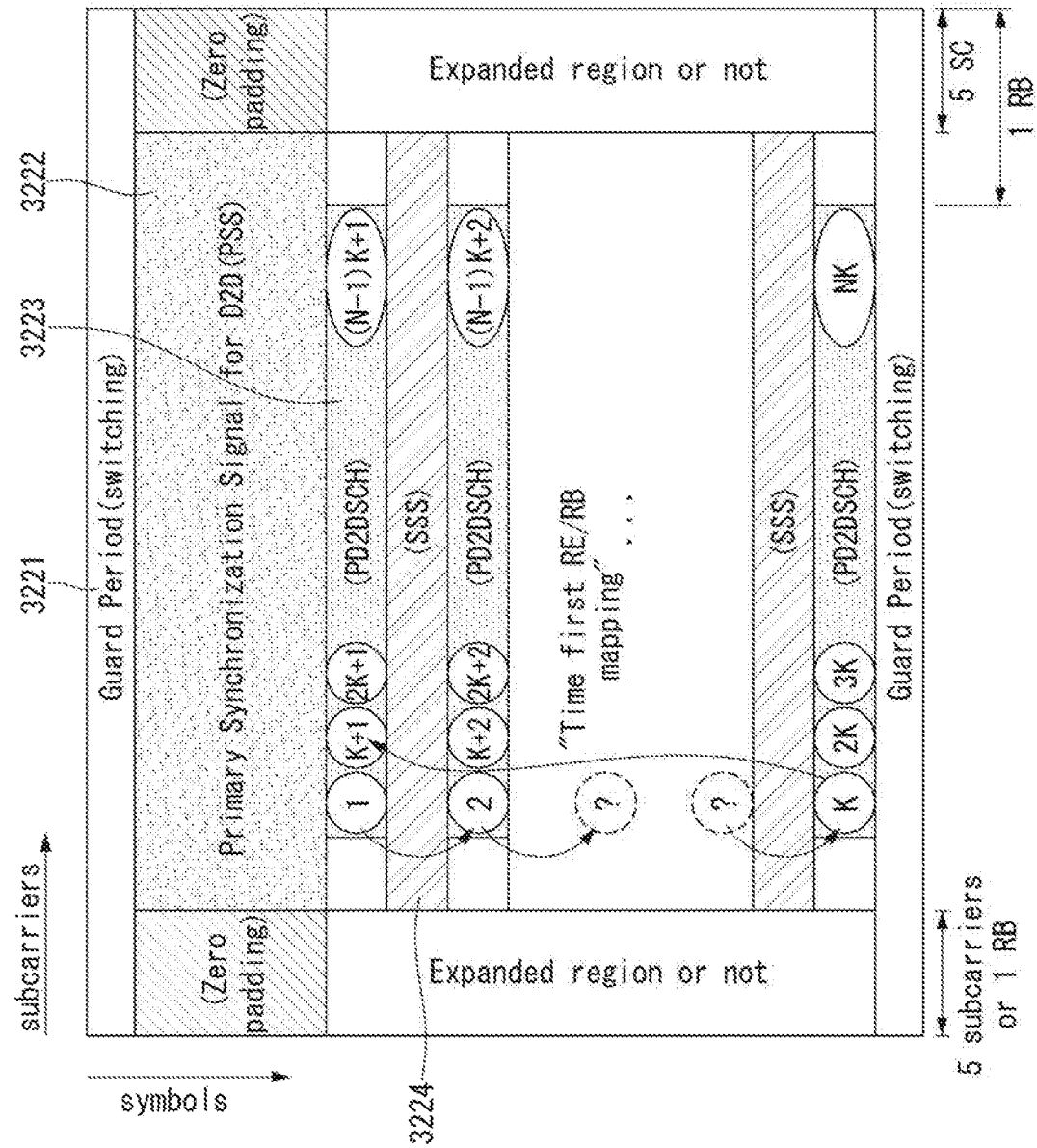

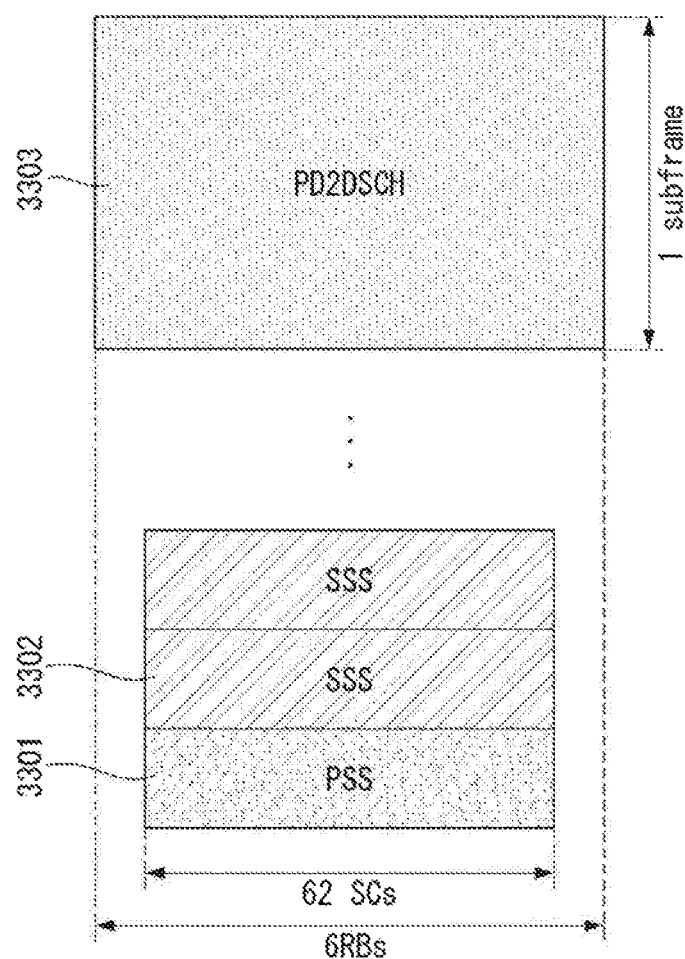
[FIG. 33]

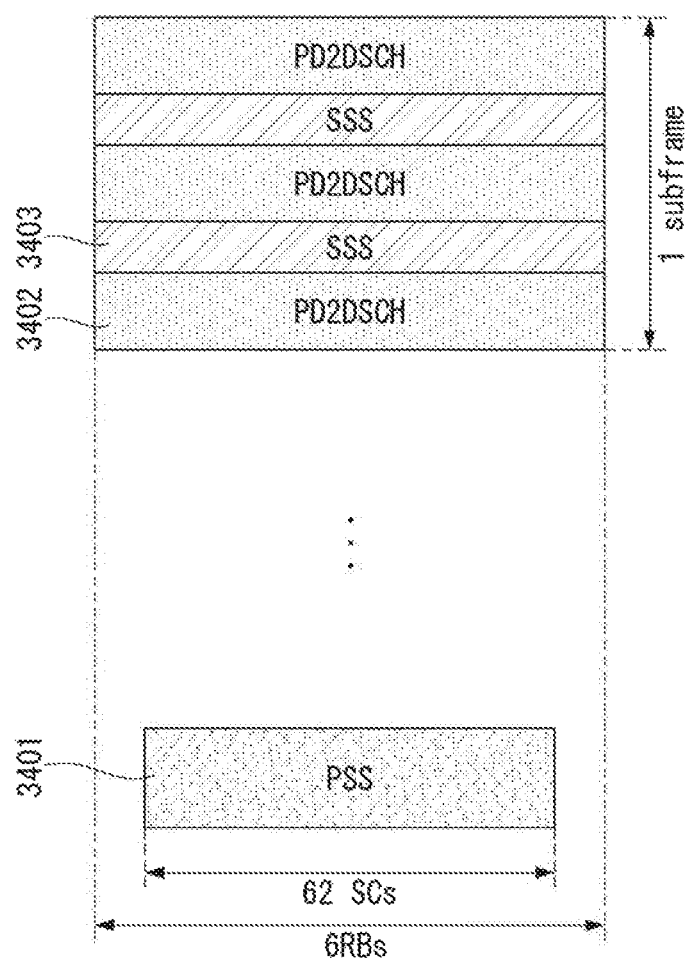
[FIG. 34]

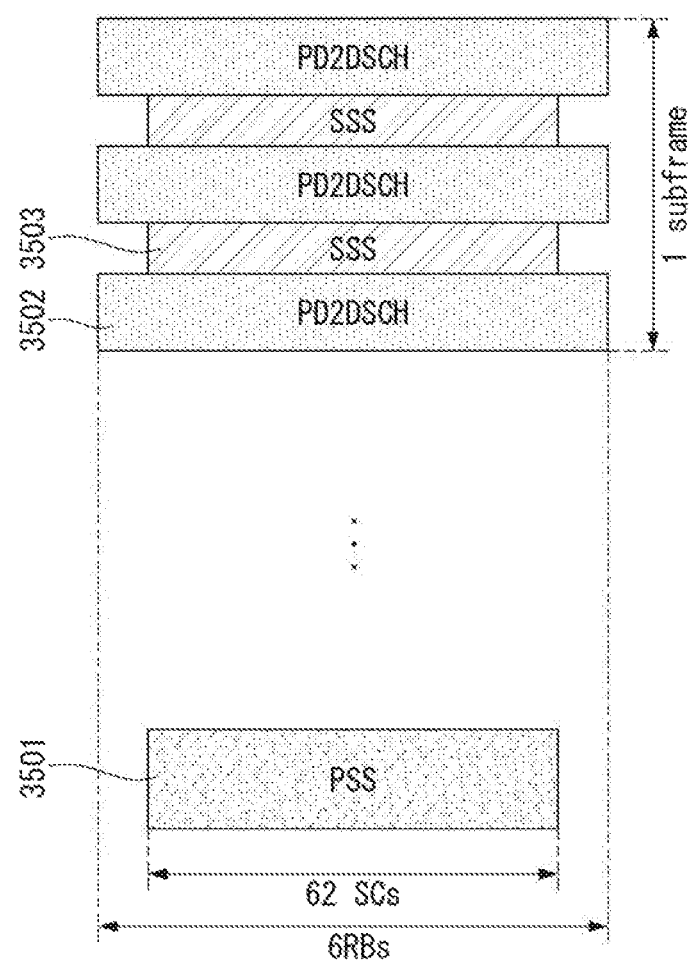
[FIG. 35]

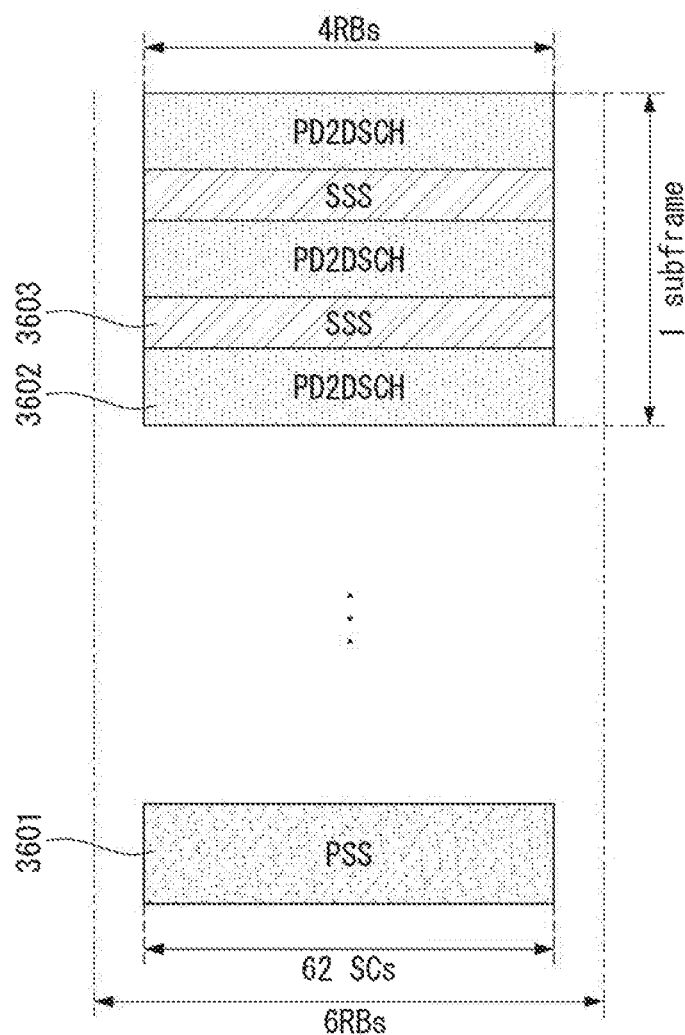

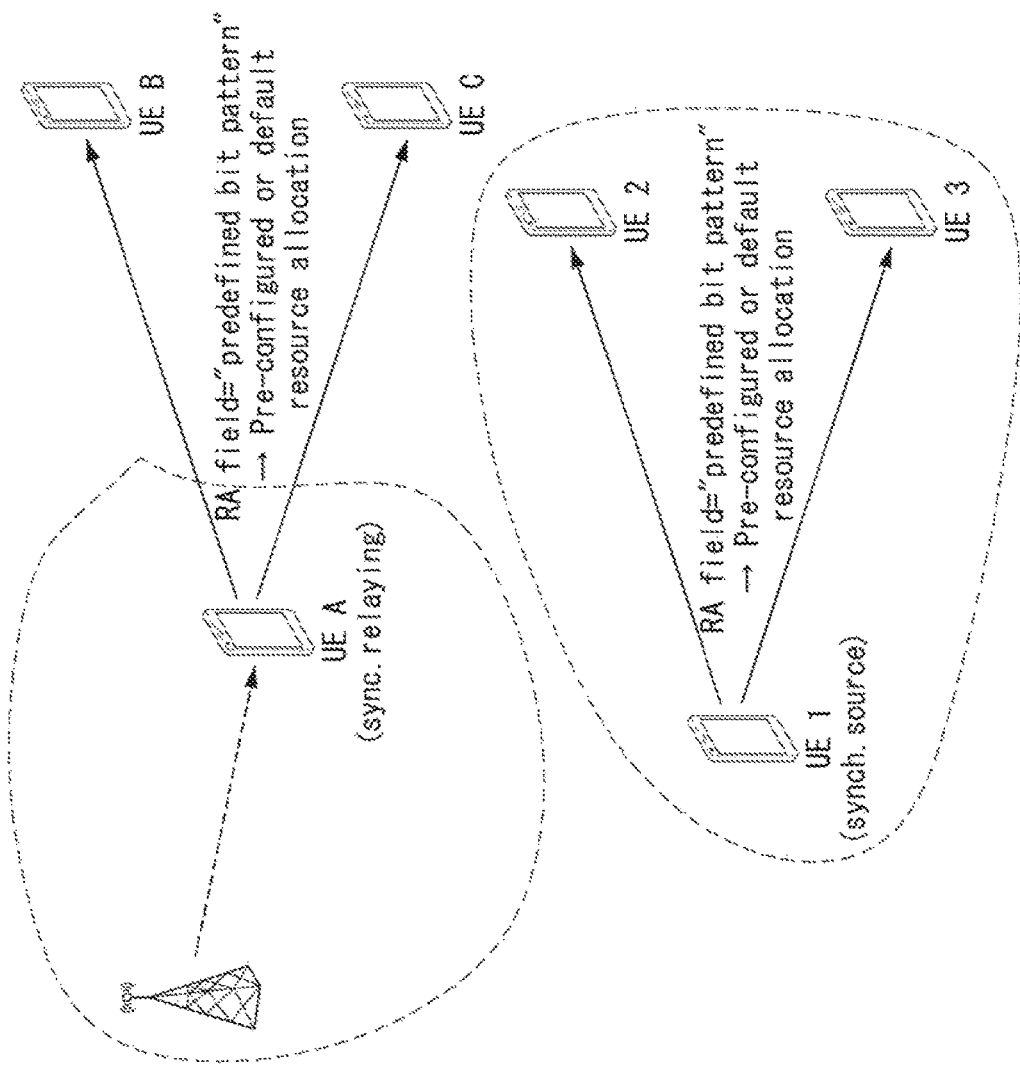
[FIG. 37]

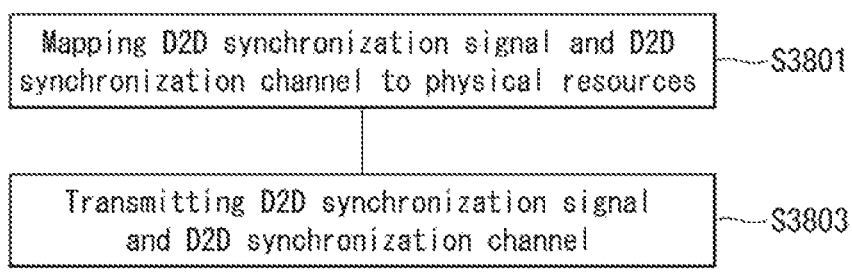
[FIG. 38]
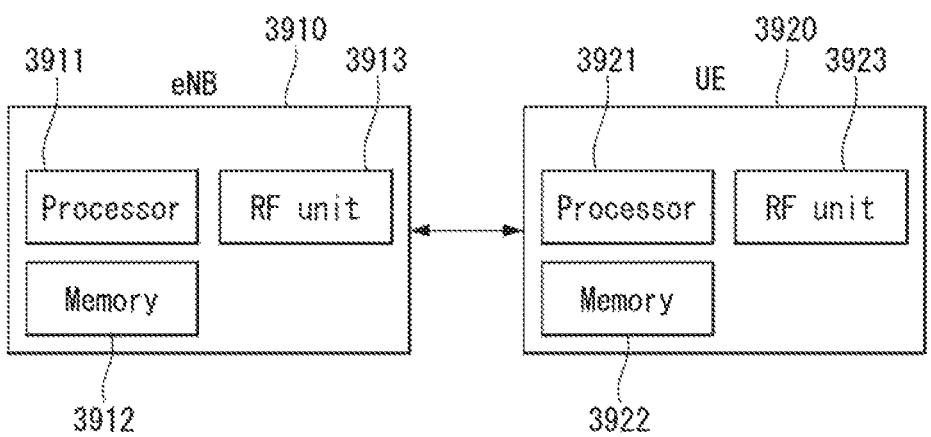
[FIG. 39]

METHOD FOR TRANSMITTING SYNCHRONIZATION SIGNAL AND SYNCHRONIZATION CHANNEL IN WIRELESS COMMUNICATION SYSTEM SUPPORTING DEVICE-TO-DEVICE COMMUNICATION AND APPARATUS FOR THE SAME

CROSS-REFERENCE TO RELATED APPLICATIONS

This Application is a Continuation of U.S. patent application Ser. No. 15/858,982 filed on Dec. 29, 2017 (now U.S. Pat. No. 10,411,858 issued on Sep. 10, 2019), which is a Continuation of U.S. patent application Ser. No. 15/114,344 filed on Jul. 26, 2016 (now U.S. Pat. No. 9,893,855 issued on Feb. 13, 2018), which is the National Phase of PCT International Application No. PCT/KR2015/000616 filed on Jan. 21, 2015, which claims the benefit under 35 U.S.C. § 119(e) to U.S. Provisional Application No. 61/931,686 filed on Jan. 26, 2014, and U.S. Provisional Application No. 61/939,685 filed on Feb. 13, 2014, all of these applications are hereby expressly incorporated by reference into the present application.

BACKGROUND OF THE INVENTION

Field of the Invention

The present invention is related to a wireless communication system and more particularly, a method for transmitting a synchronization signal and a synchronization channel in a wireless communication system supporting device-to-device communication and an apparatus supporting the method.

Discussion of the Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

Since UEs have to be synchronized with each other before performing device-to-device (D2D) communication in a wireless communication system supporting D2D communication, a D2D synchronization signal is required to obtain synchronization between UEs. Also, a D2D synchronization channel is also required to transmit essential information for D2D communication. However, D2D synchronization signals and D2D synchronization channels are not defined yet.

To solve the technical problem above, the present invention provides structure of a D2D synchronization signal and a D2D synchronization channel in a wireless communication system supporting D2D communication.

Also, the present invention provides a method for transmitting a D2D synchronization signal and a D2D synchronization channel by using a structure of the D2D synchronization signal and the D2D synchronization channel proposed in a wireless communication system supporting D2D communication.

The technical problems solved by the present invention are not limited to the above technical problems and those skilled in the art may understand other technical problems from the following description.

SUMMARY OF THE INVENTION

According to one aspect of the present invention, a method for transmitting a D2D synchronization signal and a D2D synchronization channel in a wireless communication system supporting D2D communication comprises mapping the D2D synchronization signal and the D2D synchronization channel to a physical resource; and transmitting the mapped D2D synchronization signal and D2D synchronization channel to a UE, wherein the D2D synchronization signal is mapped to 64 subcarriers in the frequency domain, and the D2D synchronization channel is mapped to the same resource block as the D2D synchronization signal.

According to another aspect of the present invention, a UE transmitting a D2D synchronization signal and a D2D synchronization channel in a wireless communication system supporting D2D communication comprises a Radio Frequency (RF) unit for transmitting and receiving a radio signal; and a processor, wherein the processor is configured to map the D2D synchronization signal and the D2D synchronization channel to a physical resource; and to transmit the mapped D2D synchronization signal and D2D synchronization channel to a UE, wherein the D2D synchronization signal is mapped to 64 subcarriers in the frequency domain, and the D2D synchronization channel is mapped to the same resource block as the D2D synchronization signal.

Preferably, one resource block can comprise 12 subcarriers in the frequency domain, and the D2D synchronization signal can be mapped to 64 subcarriers located in the center of 6 resource blocks.

Preferably, the D2D synchronization channel can be mapped to the six resource blocks in the frequency domain.

Preferably, the D2D synchronization channel can be mapped in units of resource blocks in the frequency domain.

Preferably, the D2D synchronization channel can be mapped to the 64 subcarriers in the same way with the D2D synchronization signal in the frequency domain.

Preferably, in a symbol to which the D2D synchronization signal is mapped, 5 subcarriers at both ends of the symbol to which the D2D synchronization signal is not mapped can be padded with zeros.

Preferably, the D2D synchronization signal can comprises a D2D Primary Synchronization Signal (PSS) and a D2D Secondary Synchronization Signal (SSS); and the D2D PSS can be mapped to the symbol preceding the D2D SSS in the time domain.

Preferably, mapping can be performed in the order of the D2D PSS, the D2D channel, and the D2D SSS in the time domain.

Preferably, the D2D synchronization channel can transmit at least one of identifier of a device transmitting the D2D synchronization signal, type of a device transmitting the D2D synchronization signal, and resource allocation information for data channel, control channel, and discovery channel.

Preferably, the synchronization channel can transmit an indicator indicating whether a UE receiving the synchronization channel uses transmission resources from a preconfigured resource pool, whether a UE receiving the synchronization channel uses resources indicated by the synchronization channel, or whether a UE receiving the synchronization channel uses a predetermined resource unit.

Preferably, the D2D synchronization channel can deliver information about resources to which a scheduling assignment about a data channel, control channel, and discovery channel is transmitted.

Preferably, the D2D synchronization channel can deliver information about resources used for transmitting a scheduling assignment for requesting resources for a data channel, control channel, and discovery channel.

According to an embodiment of the present invention, in a wireless communication system supporting D2D communication, D2D communication can be performed smoothly by transmitting a D2D synchronization signal and D2D synchronization channel according to structures of the D2D synchronization signal and D2D synchronization channel.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows an example of a form in which PUCCH formats are mapped to the PUCCH region of the uplink physical resource block in a wireless communication system to which an embodiment of the present invention may be applied.

FIG. 6 shows the structure of a CQI channel in the case of a normal CP in a wireless communication system to which an embodiment of the present invention may be applied.

FIG. 7 shows the structure of an ACK/NACK channel in the case of a normal CP in a wireless communication system to which an embodiment of the present invention may be applied.

FIG. 8 shows an example in which five SC-FDMA symbols are generated and transmitted during one slot in a wireless communication system to which an embodiment of the present invention may be applied.

FIG. 9 shows an example of component carriers and a carrier aggregation in a wireless communication system to which an embodiment of the present invention may be applied.

FIG. 10 shows an example of the structure of a subframe according to cross-carrier scheduling in a wireless communication system to which an embodiment of the present invention may be applied.

FIG. 11 shows an example of transport channel processing for an UL-SCH in a wireless communication system to which an embodiment of the present invention may be applied.

FIG. 12 shows an example of a signal processing process in an uplink shared channel, that is, a transport channel, in a wireless communication system to which an embodiment of the present invention may be applied.

FIG. 13 shows the configuration of a known Multi-Input Multi-Output (MIMO) communication system.

FIG. 14 is a diagram showing a channel from a plurality of transmission antennas to a single reception antenna.

FIG. 15 illustrates a reference signal pattern mapped to a downlink resource block pair in a wireless communication system to which an embodiment of the present invention may be applied.

FIG. 16 illustrates an uplink subframe including sounding reference signal symbols in a wireless communication system to which an embodiment of the present invention may be applied.

FIG. 17 illustrates the segmentation of a relay node resource in a wireless communication system to which an embodiment of the present invention may be applied.

FIG. 18 is a diagram conceptually illustrating D2D communication in a wireless communication system to which an embodiment of the present invention may be applied.

FIG. 19 shows an example of various scenarios of D2D communication to which a method proposed in this specification may be applied.

FIG. 20 illustrates a scenario used for a D2D synchronization signal and D2D synchronization channel according to one embodiment of the present invention.

FIGS. 21 and 22 illustrate configuration of D2D synchronization signal resources according to one embodiment of the present invention.

FIGS. 23A to 30B illustrate structures of a D2D synchronization signal and D2D synchronization channel according to one embodiment of the present invention.

FIGS. 31A to 32B illustrate a method for mapping a D2D synchronization channel to a physical resource according to one embodiment of the present invention.

FIGS. 33 to 36 illustrate structures of a D2D synchronization signal and D2D synchronization channel according to one embodiment of the present invention.

FIG. 37 illustrates configuration of information transmitted to a D2D synchronization channel and D2D operation according to the information according to one embodiment of the present invention.

FIG. 38 illustrates a method for transmitting a D2D synchronization signal and D2D synchronization channel according to one embodiment of the present invention.

FIG. 39 illustrates a block diagram of a wireless communication device according to one embodiment of the present invention.

DETAILED DESCRIPTION OF THE EMBODIMENTS

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Uplink Control Channel (PUCCH)

The Uplink Control Information (UCI) transmitted through a PUCCH can include Scheduling Request (SR). HARQ ACK/NACK information, and downlink channel measurement information as shown below.

SR (Scheduling Request): used for requesting uplink UL-SCH resources. SR is transmitted by On-Off Keying (OOK) scheme.

HARQ ACK/NACK: a signal responding to a downlink data packet on a PDSCH. This signal indicates whether a downlink data packet has successfully received or not. ACK/NACK 1 bit is transmitted in response to a single downlink codeword while ACK/NACK 2 bits are transmitted in response to two downlink codewords.

CSI (Channel State Information): feedback information about a downlink channel. CSI can include at least one of a Channel Quality Indicator (CQI), a Rank Indicator (RI), a Precoding Matrix Indicator (PMI), and a Precoding Type Indicator (PTI). For each subframe, 20 bits are used to represent the CSI.

HARQ ACK/NACK information may be generated depending on whether a downlink data packet on a PDSCH has been successfully decoded. In an existing wireless communication system, 1 bit is transmitted as ACK/NACK information with respect to the transmission of downlink single codeword, and 2 bits are transmission as ACK/NACK information with respect to the transmission of downlink 2 codewords.

Channel measurement information denotes feedback information related to a Multiple Input Multiple Output (MIMO) scheme and may include a Channel Quality Indicator (CQI), a Precoding Matrix Index (PMI), and a Rank Indicator (RI). Such channel measurement information may be commonly called a CQI.

In order to transmit a CQI, 20 bits may be used in each subframe.

A PUCCH may be modulated using a Binary Phase Shift Keying (BPSK) scheme and a Quadrature Phase Shift Keying (QPSK) scheme. Control information for a plurality of UEs may be transmitted through a PUCCH. If Code Division Multiplexing (CDM) is performed in order to distinguish the signals of UEs from each other, a Constant Amplitude Zero Autocorrelation (CAZAC) sequence of a length 12 is mostly used. The CAZAC sequence has a characteristic in that a constant size (amplitude) is maintained in a time domain and a frequency domain. Accordingly, the CAZAC sequence has a property suitable for increasing coverage by lowering the Peak-to-Average Power Ratio (PAPR) or Cubic Metric (CM) of UE. Furthermore, ACK/NACK information about downlink data transmission transmitted through a PUCCH is covered using an orthogonal sequence or an Orthogonal Cover (OC).

Furthermore, control information transmitted through a PUCCH may be distinguished from each other using a cyclically shifted sequence having a different Cyclic Shift (CS) value. The cyclically shifted sequence may be generated by cyclically shifting a base sequence by a specific CS amount. The specific CS amount is indicated by a CS index. The number of available CSs may be different depending on delay spread of a channel. A variety of types of sequences may be used as the base sequence, and the CAZAC sequence is an example of the sequences.

Furthermore, the amount of control information that may be transmitted by UE in one subframe may be determined depending on the number of SC-FDMA symbols which may be used to send the control information (i.e., SC-FDMA symbols other than SC-FDMA symbols which are used to send a Reference Signal (RS) for the coherent detection of a PUCCH).

In a 3GPP LTE system, a PUCCH is defined as a total of 7 different formats depending on control information that is transmitted, a modulation scheme, and the amount of control information. The attributes of Uplink Control Information (UCI) transmitted according to each PUCCH format may be summarized as in Table 2 below.

TABLE 2

| PUCCH Format | Uplink Control Information(UCI) |
|---|---|
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

The PUCCH format 1 is used for SR-only transmission. In the case of SR-only transmission, a not-modulated waveform is applied. This is described in detail later.

The PUCCH format 1a or 1b is used to send HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

PUCCCH format 2 is used for transmission of CQI, and PUCCH format 2a or 2b is used for transmission of CQI and HARQ ACK/NACK. In the case of extended CP, PUCCH format 2 may be used for transmission of CQI and HARQ ACK/NACK.

PUCCH format 3 is used for carrying an encoded UCI of 48 bits. PUCCH format 3 can carry HARQ ACK/NACK about a plurality of serving cells, SR (if exists), and a CSI report about one serving cell.

FIG. 5 shows an example of a form in which the PUCCH formats are mapped to the PUCCH region of the uplink physical resource block in a wireless communication system to which an embodiment of the present invention may be applied.

In FIG. 5, $N_{RB}^{UL}$ is indicative of the number of RBs in uplink, and 0, 1, . . . , $N_{RB}^{UL}-1$ means the number of physical RBs. Basically, a PUCCH is mapped to both edges of an uplink frequency block. As shown in FIG. 5, the PUCCH format 2/2a/2b is mapped to a PUCCH region indicated by m=0, 1. This may represent that the PUCCH format 2/2a/2b is mapped to RBs located at a band edge. Furthermore, the PUCCH format 2/2a/2b and the PUCCH format 1/1a/1b may be mixed and mapped to a PUCCH region indicated by m=2. Furthermore, the PUCCH format 1/1a/1b may be mapped to a PUCCH region indicated by m=3, 4, 5. UEs within a cell may be notified of the number $N_{RB}^{(2)}$ of PUCCH RBs which may be used by the PUCCH format 2/2a/2b through broadcasting signaling.

The PUCCH format 2/2a/2b is described below. The PUCCH format 2/2a/2b is a control channel for transmitting channel measurement feedback (i.e., a CQI, a PMI, and an RI).

The report cycle of channel measurement feedback (hereinafter commonly called "CQI information") and a frequency unit (or frequency resolution) to be measured may be controlled by an eNB. In a time domain, a periodic or aperiodic CQI report may be supported. The PUCCH format 2 may be used for a periodic report, and a PUSCH may be used for an aperiodic report. In the case of an aperiodic report, an eNB may instruct UE to carry an individual CQI report on a resource scheduled to transmit uplink data.

FIG. 6 shows the structure of a CQI channel in the case of a normal CP in a wireless communication system to which an embodiment of the present invention may be applied.

The SC-FDMA symbols 1 and 5 (i.e., the second and the sixth symbols) of the SC-FDMA symbols 0 to 6 of one slot are used to transmit a demodulation reference signal (DMRS), and the remaining SC-FDMA symbols of the SC-FDMA symbols 0 to 6 of the slot may be used to CQI information. Meanwhile, in the case of an extended CP, one SC-FDMA symbol (SC-FDMA symbol 3) is used for DMRS transmission.

In the PUCCH format 2/2a/2b, modulation by a CAZAC sequence is supported, and a QPSK-modulated symbol is multiplied by a CAZAC sequence of a length 12. A Cyclic Shift (CS) of the sequence is changed between a symbol and a slot. Orthogonal covering is used for a DMRS.

A reference signal (DMRS) is carried on 2 SC-FDMA symbols that belong to 7 SC-FDMA symbols included in one slot and that is spaced at 3 SC-FDMA symbols. CQI information is carried on the remaining 5 SC-FDMA symbols of the 7 SC-FDMA symbols. Two RSs are used in one slot in order to support high-speed UE. Furthermore, UEs are distinguished from each other using Cyclic Shift (CS) sequences. CQI information symbols are modulated into all SC-FDMA symbols and transferred. The SC-FDMA symbols consist of one sequence. That is, UE modulates a CQI using each sequence and sends the CQI.

The number of symbols which may be transmitted in one TTI is 10, and the modulation of CQI information is determined up to QPSK. If QPSK mapping is used for an SC-FDMA symbol, a CQI value of 10 bits may be carried on one slot because a CQI value of 2 bits may be carried on the SC-FDMA symbol. Accordingly, a CQI value having a maximum of 20 bits may be carried on one subframe. Frequency domain spread code is used to spread CQI information in a frequency domain.

A CAZAC sequence (e.g., ZC sequence) of a length 12 may be used as the frequency domain spread code. Control channels may be distinguished from each other by applying CAZAC sequences having different cyclic shift values. IFFT is performed on frequency domain-spread CQI information.

12 different UEs may be subjected to orthogonal multiplexing on the same PUCCH RB by 12 cyclic shifts having the same interval. In the case of a normal CP, a DMRS sequence on the SC-FDMA symbols 1 and 5 (on an SC-FDMA symbol 3 in the case of an extended CP) are similar to a CQI signal sequence on a frequency domain, but modulation, such as CQI information, is not applied to the DMRS sequence.

UE may be semi-statically configured by higher layer signaling so that it periodically reports different CQI, PMI and RI Types on PUCCH resources indicated by PUCCH resource indices $n_{PUCCH}^{(1,\tilde{p})}$, $n_{PUCCH}^{(2,\tilde{p})}$, and $n_{PUCCH}^{(3,\tilde{p})}$. In this case, the PUCCH resource index $n_{PUCCH}^{(2,\tilde{p})}$ is information indicative of a PUCCH region that is used to transmit the PUCCH format 2/2a/2b and the value of a Cyclic Shift (CS) to be used.

Hereinafter, the PUCCH format 1 a and 1b is described below.

In the PUCCH format 1 a/1 b, a symbol modulated using a BPSK or QPSK modulation scheme is multiplied by a CAZAC sequence of a length 12. For example, the results of a modulation symbol d(0) by a CAZAC sequence r(n)(n=0, 1, 2, . . . . N−1) of a length N become y(0), y(1), y(2), . . . , y(N−1). The symbols y(0), . . . , y(N−1) may be called a block of symbols. After the modulation symbol is multiplied by the CAZAC sequence, block-wise spread using an orthogonal sequence is applied.

A Hadamard sequence of a length 4 is used for common ACK/NACK information, and a Discrete Fourier Transform (DFT) sequence of a length 3 is used for shortened ACK/NACK information and a reference signal.

In the case of an extended CP, a Hadamard sequence of a length 2 is used in a reference signal.

FIG. 7 shows the structure of an ACK/NACK channel in the case of a normal CP in a wireless communication system to which an embodiment of the present invention may be applied.

FIG. 7 illustrates a PUCCH channel structure for transmitting HARQ ACK/NACK without a CQI.

A Reference Signal (RS) is carried on 3 contiguous SC-FDMA symbol that belong to 7 SC-FDMA symbols included in one slot and that are placed in a middle portion, and an ACK/NACK signal is carried on the remaining 4 SC-FDMA symbols of the 7 SC-FDMA symbols.

Meanwhile, in the case of an extended CP, an RS may be carried on 2 contiguous symbols placed in the middle of one slot. The number and positions of symbols used in an RS may be different depending on control channels, and the number and positions of symbols used in an ACK/NACK signal associated with the control channels may be changed depending on the number and positions of symbols used in the RS.

ACK information (not-scrambled state) of 1 bit and 2 bits may be represented as one HARQ ACK/NACK modulation symbol using respective BPSK and QPSK modulation schemes. Positive ACK (ACK) may be encoded as "1", and negative ACK (NACK) may be encoded as "0".

When a control signal is to be transmitted within an allocated bandwidth, two-dimensional spreading is applied in order to increase multiplexing capacity. That is, in order to increase the number of UEs or the number of control channels that may be multiplexed, frequency domain spreading and time domain spreading are used at the same time.

In order to spread an ACK/NACK signal in a frequency domain, a frequency domain sequence is used as a base sequence. A Zadoff-Chu (ZC) sequence which is one of CAZAC sequences, may be used as the frequency domain sequence. For example, by applying a different Cyclic Shift (CS) to a ZC sequence which is a base sequence, different UEs or different control channels may be multiplexed. The number of CS resources supported in a SC-FDMA symbol for PUCCH RBs for transmitting HARQ ACK/NACK is configured by a cell-specific upper layer signaling parameter shirt $\Delta_{shift}^{PUCCH}$.

An ACK/NACK signal spread in a frequency domain is spread in a time domain using orthogonal spreading code. A Walsh-Hadamard sequence or DFT sequence may be used as the orthogonal spreading code. For example, an ACK/NACK signal may be spread for 4 symbols using an orthogonal sequence w0, w1, w2, or w3 of a length 4. Furthermore, an RS is also spread using an orthogonal sequence of a length 3 or length 2. This is called Orthogonal Covering (OC).

A plurality of UEs may be multiplexed using a Code Division Multiplexing (CDM) method using CS resources in a frequency domain and OC resources in a time domain, such as those described above. That is, ACK/NACK information and RSs of a large number of UEs may be multiplexed on the same PUCCH RB.

The number of spreading code supported for ACK/NACK information is restricted by the number of RS symbols with respect to such time domain spreading CDM. That is, the multiplexing capacity of an RS is smaller than the multiplexing capacity of ACK/NACK information because the number of SC-FDMA symbols for RS transmission is smaller than the number of SC-FDMA symbols for ACK/NACK information transmission.

For example, in the case of a normal CP, ACK/NACK information may be transmitted in 4 symbols. 3 pieces of orthogonal spreading code not 4 are used for ACK/NACK information. The reason for this is that only 3 pieces of orthogonal spreading code may be used for an RS because the number of symbols for RS transmission is limited to 3.

In case that 3 symbols of one slot may be used for RS transmission and 4 symbols of the slot may be used for ACK/NACK information transmission in a subframe of a normal CP, for example, if 6 Cyclic Shifts (CSs) may be used in a frequency domain and 3 Orthogonal Cover (OC) resources may be used in a time domain, HARQ ACK from a total of 18 different UEs may be multiplexed within one PUCCH RB. In case that 2 symbols of one slot are used for RS transmission and 4 symbols of one slot are used for ACK/NACK information transmission in a subframe of an extended CP, for example, if 6 CSs may be used in a frequency domain and 2 OC resources may be used in a time domain, HARQ ACK from a total of 12 different UEs may be multiplexed within one PUCCH RB.

The PUCCH format 1 is described below. A Scheduling Request (SR) is transmitted in such a way as to make a request or does not make a request that UE is scheduled. An SR channel reuses an ACK/NACK channel structure in the PUCCH format 1 a/1 b and consists of an On-Off Keying (OKK) method based on an ACK/NACK channel design. An RS is not transmitted in the SR channel. Accordingly, a sequence of a length 7 is used in the case of a normal CP, and a sequence of a length 6 is used in the case of an extended CP. Different cyclic shifts or orthogonal covers may be allocated to an SR and ACK/NACK. That is, in order to send a positive SR, UE sends HARQ ACK/NACK through a resource allocated for the SR. In order to send a negative SR, UE sends HARQ ACK/NACK through a resource allocated for ACK/NACK.

An enhanced-PUCCH (e-PUCCH) format is described below. An e-PUCCH may correspond to the PUCCH format 3 of an LTE-A system. A block spreading scheme may be applied to ACK/NACK transmission using the PUCCH format 3.

Unlike in the existing PUCCH format 1 series or 2 series, the block spreading scheme is a method of modulating control signal transmission using an SC-FDMA method. As shown in FIG. 8, a symbol sequence may be spread in a time domain using Orthogonal Cover Code (OCC) and transmitted. By using OCC, the control signals of a plurality of UEs may be multiplexed on the same RB. In the case of the PUCCH format 2, one symbol sequence is transmitted in a time domain, and the control signals of a plurality of UEs are multiplexed using a Cyclic Shift (CS) of a CAZAC sequence. In contrast, in the case of a block spreading-based PUCCH format (e.g., the PUCCH format 3), one symbol sequence is transmitted in a frequency domain, and the control signals of a plurality of UEs are multiplexed using time domain spreading using OCC.

FIG. 8 shows an example in which 5 SC-FDMA symbols are generated and transmitted during one slot in a wireless communication system to which an embodiment of the present invention may be applied.

FIG. 8 shows an example in which 5 SC-FDMA symbols (i.e., a data part) are generated using OCC of a length=5 (or SF=5) in one symbol sequence during 1 slot and transmitted. In this case, 2 RS symbols may be used during the 1 slot.

In the example of FIG. 8, the RS symbols may be generated from a CAZAC sequence to which a specific CS value has been applied and may be transmitted in a form in which a specific OCC may be applied (or multiplied) to a plurality of RS symbols. Furthermore, in the example of FIG. 8, assuming that 12 modulation symbols are used in each OFDM symbol (or SC-FDMA symbol) and each of the modulation symbols is generated by QPSK, a maximum number of bits capable of being transmitted in one slot are 12×2=24 bits. Accordingly, a total number of bits capable of being transmitted in 2 slots are 48 bits. As described above, if a PUCCH channel structure using a block spreading method is used, control information having an extended size compared to the existing PUCCH format 1 series and 2 series can be transmitted.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfiguration) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 9 shows an example of component carriers and a carrier aggregation in a wireless communication system to which an embodiment of the present invention may be applied.

FIG. 9a shows the structure of a single carrier used in an LTE system. A component carrier includes a DL CC and an UL CC. One component carrier may have a frequency range of 20 MHz.

FIG. 9b shows the structure of a carrier aggregation used in an LTE-A system. FIG. 9b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specific, UE group-specific, or cell-specific way.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

FIG. 10 shows an example of the structure of a subframe according to cross-carrier scheduling in a wireless communication system to which an embodiment of the present invention may be applied.

FIG. 10 shows an example in which 3 DL CCs are aggregated in a DL subframe for LTE-A UE and a DL CC "A" has been configured as a PDCCH monitoring DL CC. IF a CIF is not used, each DL CC may send a PDCCH for scheduling its PDSCH without a CIF. In contrast, if a CIF is used through higher layer signaling, only the single DL CC "A" may send its PDSCH or a PDCCH for scheduling a PDSCH of a different CC using the CIF. In this case, the DL CCs "B" and "C" not configured as PDCCH monitoring DL CCs do not send a PDCCH.

General ACK/NACK Multiplexing Method

In a situation in which UE has to simultaneously send a plurality of ACK/NACKs corresponding to a plurality of data units received from an eNB, an ACK/NACK multiplexing method based on the selection of a PUCCH resource may be taken into consideration in order to maintain the single frequency characteristic of an ACK/NACK signal and to reduce ACK/NACK transmission power.

The content of ACK/NACK responses for a plurality of data units, together with ACK/NACK multiplexing, is identified by a combination of a PUCCH resource used in actual ACK/NACK transmission and the resource of QPSK modulation symbols.

For example, if one PUCCH resource sends 4 bits and a maximum of 4 data units are transmitted, ACK/NACK results may be identified in an eNB as in Table 3 below.

TABLE 3

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3, HARQ-ACK (i) is indicative of ACK/NACK results for an i-th data unit. In Table 3, discontinuous transmission (DTX) means that there is no data unit transmitted for a corresponding HARQ-ACK(i) or that UE does not detect a data unit corresponding to the HARQ-ACK(i).

In accordance with Table 3, a maximum of 4 PUCCH resources $n_{PUCCH,0}^{(1)}, n_{PUCCH,1}^{(1)}, n_{PUCCH,2}^{(1)}$ and $n_{PUCCH,3}^{(1)}$ are resent, and b(0), b(1) has 2 bits transmitted using a selected PUCCH.

For example, if UE successfully receives all of the 4 data units, the UE sends 2 bits (1, 1) using the PUCCH resource $n_{PUCCH,0}^{(1)}$.

If UE fails in decoding in first and third data units and succeed in decoding in second and fourth data units, the UE sends bits (1, 0) using the PUCCH resource $n_{PUCCH,3}^{(1)}$.

In the selection of an ACK/NACK channel, if at least one ACK is present, NACK and DTX are coupled. The reason for this is that all of ACK/NACK states are unable to be represented using a combination of a reserved PUCCH resource and a QPSK symbol. If ACK is not present, however, DTX is decoupled from NACK.

In this case, a PUCCH resource linked to a data unit corresponding to one clear NACK may be reserved in order to send a signal for a plurality of ACKs/NACKs.

PDCCH Validation for Semi-Persistent Scheduling

Semi-Persistent Scheduling (SPS) is a scheduling method for allocating resources to specific UE so that the resources continue to be maintained during a specific time interval.

If a specific amount of data is transmitted during a specific time as in a Voice over Internet Protocol (VoIP), the waste of control information can be reduced using the SPS method because the control information does not need to be transmitted at each data transmission interval for resource allocation. In a so-called SPS method, a time resource area in which resources may be allocated is first allocated to UE.

In this case, in the semi-persistent allocation method, a time resource area allocated to specific UE may be configured to have a cycle. Next, the allocation of time-frequency resources is completed by allocating a frequency resource area, if necessary. The allocation of a frequency resource area as described above may be called so-called activation. If the semi-persistent allocation method is used, resource allocation is maintained by one signaling during a specific period. Accordingly, signaling overhead can be reduced because resource allocation does not need to be repeatedly performed.

Thereafter, if resource allocation for the UE is not required, signaling for releasing the frequency resource allocation may be transmitted from an eNB to the UE. The release of the allocation of a frequency resource area as described above may be called deactivation.

In current LTE, for SPS for uplink and/or downlink, first, UE is notified of that SPS transmission/reception need to be performed in what subframes through Radio Resource Control (RRC) signaling. That is, a time resource of time-frequency resources allocated for SPS is first designated through RRC signaling. In order to notify the UE of available subframes, for example, the UE may be notified of the cycle and offset of a subframe. However, the UE does not immediately perform transmission/reception according to SPS although it has received RRC signaling because only the time resource area is allocated to the UE through RRC signaling. The allocation of the time-frequency resources is completed by allocating a frequency resource area, if necessary. The allocation of a frequency resource area as described above may be called activation, and the release of the allocation of a frequency resource area may be called deactivation.

Accordingly, the UE receives a PDCCH indicative of activation, allocates a frequency resource based on RB allocation information included in the received PDCCH, and starts to perform transmission/reception based on a subframe cycle and offset allocated through RRC signaling by applying a modulation scheme and coding rate according to Modulation and Coding Scheme (MCS) information.

Next, when receiving a PDCCH indicative of deactivation from an eNB, the UE stops the transmission/reception. When a PDCCH indicative of activation or reactivation is received after the transmission/reception is stopped, the UE resumes transmission/reception using a subframe cycle and offset allocated through RRC signaling using RBs and an MCS designated in the corresponding PDCCH. That is, the allocation of time resources is performed through RRC signaling, but the transmission/reception of actual signals may be performed after a PDCCH indicative of the activation and reactivation of SPS is received. The stop of signal transmission/reception is performed after a PDCCH indicative of the deactivation of SPS is received.

If the following conditions are all satisfied, the UE may validate a PDCCH including an SPS indication. First, CRC parity bits added for PDCCH payload need to be scrambled with an SPS C-RNTI. Second, a New Data Indicator (NDI) field needs to be set to 0. In this case, in the case of the DCI formats 2, 2A, 2B, and 2C, an NDI field is indicative of one of activated transport blocks.

Furthermore, the validation of each field used in the DCI format is completed when each field is set based on Table 4 and Table 5 below. When such a validation is completed, the UE recognizes the received DCI information as being valid SPS activation or deactivation (or release). In contrast, if the validation is not completed, the UE recognizes that non-matching CRC is included in a received DCI format.

Table 4 illustrates fields for PDCCH validation indicative of SPS activation.

TABLE 4

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 illustrates fields for PDCCH validation indicative of SPS deactivation (or release).

TABLE 5

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |

TABLE 5-continued

| | DCI format 0 | DCI format 1A |
|---|---|---|
| Modulation and coding scheme | N/A | set to '11111' |
| Redundancy version | N/A | set to '00' |
| Resource block assignment | N/A | Set to all '1's |

If a DCI format is indicative of SPS downlink scheduling activation, a TPC command value for a PUCCH field may be used an index indicative of 4 PUCCH resource values set by a higher layer.

PUCCH Piggybacking

FIG. 11 shows an example of transport channel processing for an UL-SCH in a wireless communication system to which an embodiment of the present invention may be applied.

In a 3GPP LTE system (=E-UTRA, Rel. 8), in the case of UL, in order to efficiently use the power amplifier of UE, a Peak-to-Average Power Ratio (PAPR) characteristic or Cubic Metric (CM) characteristic affecting performance of the power amplifier are set to maintain good single carrier transmission. That is, in the case of PUSCH transmission in an existing LTE system, the single carrier characteristic of data may be maintained through DFT-precoding. In the case of PUCCH transmission, a single carrier characteristic may be maintained by carrying information on a sequence having a single carrier characteristic and sending the information. However, if DFT-precoded data is discontiguously allocated based on a frequency axis, or a PUSCH and a PUCCH are transmitted at the same time, such a single carrier characteristic is not maintained. Accordingly, if PUSCH transmission is to be performed in the same subframe as that of PUCCH transmission as in FIG. 11, Uplink Control Information (UCI) information to be transmitted through a PUCCH is transmitted (piggybacked) along with data through a PUSCH in order to maintain the single carrier characteristic.

In a subframe in which a PUSCH is transmitted, a method of multiplexing Uplink Control Information (UCI) (a CQI/PMI, HARQ-ACK, an RI, etc.) with a PUSCH region is used because existing LTE UE is unable to send a PUCCH and a PUSCH at the same time as described above.

For example, if a Channel Quality Indicator (CQI) and/or a Precoding Matrix Indicator (PMI) are to be transmitted in a subframe allocated to send a PUSCH, UL-SCH data and the CQI/PMI may be multiplexed prior to DFT-spreading and may be transmitted along with control information and data. In this case, the UL-SCH data is subjected to rate matching by taking the CQI/PMI resources into consideration. Furthermore, a method of puncturing the UL-SCH data into control information, such as HARQ ACK, and an RI, and multiplexing the results with a PUSCH region is used.

FIG. 12 shows an example of a signal processing process in an uplink shared channel, that is, a transport channel, in a wireless communication system to which an embodiment of the present invention may be applied.

Hereinafter, a signal processing process for an uplink shared channel (hereinafter called an "UL-SCH") may be applied to one or more transport channels or control information types.

Referring to FIG. 12, an UL-SCH transfers data to a coding unit in the form of a Transport Block (TB) once for each Transmission Time Interval (TTI).

CRC parity bits $p_0, p_1, p_2, p_3, \ldots, p_{L-1}$ are attached to the bits $a_0, a_1, a_2, a_3, \ldots, a_{A-1}$ of the transport block received from a higher layer at step S120. In this case, A is the size of the transport block, and L is the number of parity bits. The input bits to which the CRC parity bits have been attached are $b_0, b_1, b_2, b_3, \ldots, b_{B-1}$. In this case, B is indicative of the number of bits of the transport block including the CRC parity bits.

The input bits $b_0, b_1, b_2, b_3, \ldots, b_{B-1}$ are segmented into several Code Blocks (CBs) based on the TB size. A CRC is attached to the segmented several CBs at step S121. Bits after the segmentation of the CBs and the attachment of the CRC are $c_{r0}, c_{r1}, c_{r2}, c_{r3}, \ldots, c_{r(K_r-1)}$. In this case, r is a CB number (r=0, ..., C−1), and $K_r$ is the number of bits according to a CB r. Furthermore, C is a total number of CBs.

Next, channel coding is performed at step S122. Output bits after the channel coding are $d_{r0}^{(i)}, d_{r1}^{(i)}, d_{r2}^{(i)}, d_{r3}^{(i)}, \ldots, d_{r(D_r-1)}^{(i)}$. In this case, i is a coded stream index and may have a value 0, 1, or 2 value. $D_r$ is the number of bits of the i-th-coded stream for the CB r. r is a CB number (r=0, ..., C−1), and C a total number of CBs. Each CB may be coded by turbo coding.

Next, rate matching is performed at step S123. Bits after the rate matching are $e_{r0}, e_{r1}, e_{r2}, e_{r3}, \ldots, e_{r(E_r-1)}$. In this case, r is a CB number (r=0, ..., C−1), and C is a total number of CBs. $E_r$ is the number of bits of a r-th code block that has been subjected to rate matching.

Next, a concatenation between the CBs is performed again at step S124. Bits after the concatenation of the CBs are $f_0, f_1, f_2, f_3, \ldots f_{G-1}$. this case, G is a total number of coded bits for transmission. When control information is multiplexed with UL-SCH transmission, the number of bits used for control information transmission is not included.

Meanwhile, when control information is transmitted in a PUSCH, channel coding is independently performed on a CQI/PMI, an RI, and ACK/NACK, that is, the control information, at steps S126, S127, and S128. The pieces of control information have different coding rates because different coded symbols are allocated for the transmission of the control information.

In Time Division Duplex (TDD), ACK/NACK feedback mode supports two types of ACK/NACK bundling mode and ACK/NACK multiplexing mode by the configuration of a higher layer. For ACK/NACK bundling, ACK/NACK information bits include 1 bit or 2 bits. For ACK/NACK multiplexing, ACK/NACK information bits include 1 bit to 4 bits.

After the concatenation between the CBs at step S124, the multiplexing of the coded bits $f_0, f_1, f_2, f_3, \ldots, f_{G-1}$ of the UL-SCH data and the coded bits $q_0, q_1, q_2, q_3, \ldots q_{N_L \cdot Q_{CQI}-1}$ of the CQI/PMI are performed at step S125. The results of the multiplexing of the UL-SCH data and the CQI/PMI are $g_0, g_1, g_2, g_3, \ldots, g_{H'-1}$. In this case, $g_i$=0, ..., H'−1) is indicative of a column vector having a length $(Q_m \cdot N_L)$. $H=(G+N_L \cdot Q_{CQI})$ and $H'=H/(N_L \cdot Q_m)$. $N_L$ is the number of layers to which an UL-SCH transport block has been mapped. H is a total number of coded bits allocated to the $N_L$ transmission layers to which the transport block has been mapped for the UL-SCH data and CQI/PMI information.

Next, the multiplexed data and CQI/PMI and the separately channel-coded RI and ACK/NACK are subjected to channel interleaving, thereby generating an output signal at step S129.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 13 shows the configuration of a known MIMO communication system.

Referring to FIG. 13, if the number of transmission (Tx) antennas is increased to $N_T$ and the number of reception (Rx) antennas is increased to $N_R$ at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment $R_i$ by a maximum transfer rate $R_o$ if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (NT×NR) of the number of transmission antennas (NT) and the number of reception antennas (NR).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 13, it is assumed that NT transmission antennas and NR reception antennas are present.

First, a transmission signal is described below. If the NT transmission antennas are present as described above, a maximum number of pieces of information which can be transmitted are NT, which may be represented using the following vector.

$$s = [s_1, s_2, \Lambda, s_{N_T}]^T \qquad \text{[Equation 2]}$$

Meanwhile, transmission power may be different in each of pieces of transmission information $s_1, s_2, \ldots, s_{N_T}$. In this case, if pieces of transmission power are $P_1, P_2, \ldots, P_{N_T}$, transmission information having controlled transmission power may be represented using the following vector.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T \qquad \text{[Equation 3]}$$

Furthermore, $\hat{s}$ may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \qquad \text{[Equation 4]}$$

Meanwhile, the information vector $\hat{s}$ having controlled transmission power is multiplied by a weight matrix W, thus forming $N_T$ transmission signals $x_1, x_2, \ldots, x_{N_T}$ that are actually transmitted. In this case, the weight matrix functions to properly distribute the transmission information to antennas according to a transport channel condition. The following may be represented using the transmission signals $x_1, x_2, \ldots, x_{N_T}$, $$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T1} & w_{N_T2} & \Lambda & w_{N_TN_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

In this case, wij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If $N_R$ reception antennas are present, the reception signals $y_1, y_2, \ldots, y_{N_R}$ of the respective antennas are represented as follows using a vector y.

$$y = [y_1, y_2, \Lambda, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as $h_{ij}$. In this case, it is to be noted that in order of the index of $h_{ij}$, the index of a reception antenna comes first and the index of a transmission antenna then comes.

Several channels may be grouped and expressed in a vector and matrix form. For example, a vector expression is described below.

FIG. 14 is a diagram showing a channel from a plurality of transmission antennas to a single reception antenna.

As shown in FIG. 14, a channel from a total of NT transmission antennas to a reception antenna i may be represented as follows.

$$h_i^T = [h_{i1}, h_{i2}, \Lambda, h_{iN_T}] \quad \text{[Equation 7]}$$

Furthermore, if all channels from the $N_T$ transmission antenna to $N_R$ reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix} \quad \text{[Equation 8]}$$

Meanwhile, Additive White Gaussian Noise (AWGN) is added to an actual channel after the actual channel experiences the channel matrix H. Accordingly, AWGN $n_1, n_2, \ldots, n_{N_R}$ added to the $N_R$ reception antennas, respectively, are represented using a vector as follows.

$$n = [n_1, n_2, \Lambda, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_j \\ M \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas $N_R$, and the number of columns becomes equal to the number of transmission antennas $N_T$. That is, the channel matrix H becomes an $N_R \times N_T$ matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission when signal is transmitted through a channel and a method of transmitting signal known to both the transmission side and the reception side is mostly used. The aforementioned signal is called a pilot signal or Reference Signal (RS).

When data is transmitted/received using a multi-input/output antenna, a channel state between a transmission antenna and a reception antenna needs to be detected in order to accurately receive a signal. Accordingly, each transmission antenna needs to have an individual reference signal.

A downlink reference signal includes a Common Reference Signal (CRS) shared by all UEs within one cell and a Dedicated Reference Signal (DRS) for specific UE. Information for demodulation and channel measurement may be provided using such reference signals.

The reception side (i.e., UE) measures a channel state based on a CRS and feeds indicators related to channel quality, such as a Channel Quality Indicator (CQI), a Precoding Matrix Index (PMI) and/or a Rank Indicator (RI), back to the transmission side (i.e., an eNB). The CRS is also called a cell-specific RS. In contrast, a reference signal related to the feedback of Channel State Information (CSI) may be defined as a CSI-RS.

The DRS may be transmitted through resource elements if data on a PDSCH needs to be demodulated. UE may receive information about whether a DRS is present through a higher layer, and the DRS is valid only if a corresponding PDSCH has been mapped. The DRS may also be called a UE-specific RS or demodulation RS (DMRS).

FIG. 15 illustrates a reference signal pattern mapped to a downlink resource block pair in a wireless communication system to which an embodiment of the present invention may be applied.

Referring to FIG. 15, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 15a) and has a length of 12 OFDM symbols in the case of an extended CP (FIG. 15b). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or a multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

A rule for mapping a CRS to a resource block is defined as follows.

$$k = 6m + (v + v_{shift}) \bmod 6 \qquad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 2 \end{cases}$$

$$v_{shift} = N_{ID}^{cell} \bmod 6$$

In Equation 12, k and l denote a subcarrier index and a symbol index, respectively, and p denotes an antenna port. $N_{symb}^{DL}$ denotes the number of OFDM symbols in one downlink slot, and $N_{RB}^{DL}$ denotes the number of radio resources allocated to downlink. $n_s$ denotes a slot index, and $n_{ID_c}^{ell}$ denotes a cell ID. mod denotes modulo operation. The position of a reference signal is different depending on a value $v_{shift}$ in a frequency domain. Since the value $v_{shift}$ depends on a cell ID, the position of a reference signal has various frequency shift values depending on a cell.

More specifically, in order to improve channel estimation performance through a CRS, the position of a CRS may be shifted in a frequency domain. For example, if reference signals are placed at an interval of 3 subcarriers, reference signals in one cell are allocated to a 3k-th subcarrier, and reference signals in the other cell are allocated to a (3k+1)-th subcarrier. From the point of view of a single antenna port, reference signals are arrayed at an interval of 6 resource elements in a frequency domain. Reference signals are spaced apart from reference signals allocated in other antenna ports at an interval of 3 resource elements.

In a time domain, reference signals are started from the symbol index 0 of each slot and are arrayed at a constant interval. A time interval is different defined depending on the length of a cyclic prefix. In the case of a normal cyclic prefix, reference signals are placed in the symbol indices 0 and 4 of a slot. In the case of an extended cyclic prefix, reference signals are placed in the symbol indices 0 and 3 of a slot. A reference signal for an antenna port that belongs to 2 antenna ports and that has a maximum value is defined within one OFDM symbol. Accordingly, in the case of 4 transmission antenna transmission, reference signals for RS antenna ports 0 and 1 are placed in the symbol indices 0 and 4 of a slot (i.e., symbol indices 0 and 3 in the case of an extended cyclic prefix), and reference signals for antenna ports 2 and 3 are placed in the symbol index 1 of the slot. The positions of reference signals for antenna ports 2 and 3 in a frequency domain are changed in a second slot.

A DRS is described in more detail below. The DRS is used to demodulate data. In multi-input/output antenna transmission, precoding weight used for specific UE is combined with a transport channel transmitted by each transmission antenna when the UE receives a reference signal and is used to estimate a corresponding channel without any change.

A 3GPP LTE system (e.g., release-8) supports a maximum of 4 transmission antennas and uses a DRS for rank 1 beamforming. The DRS for rank 1 beamforming also indicates a reference signal for an antenna port index 5.

A rule on which a DRS is mapped to a resource block is defined as follows. Equation 13 illustrates a normal cyclic prefix, and Equation 14 illustrates an extended cyclic prefix.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 12 to 14, k and p denote a subcarrier index and an antenna port, cell respectively. $N_{RB}^{DL}$, $n_s$, and $N_{ID}^{cell}$ denote the number of RBs allocated to downlink, the number of slot indices, and the number of cell IDs. The position of an RS is different depending on the value $v_{shift}$ from the point of view of a frequency domain.

In Equations 13 and 14, k and l denote a subcarrier index and a symbol index, respectively, and p denotes an antenna port. $N_{sc}^{RB}$ denotes the size of an RB in a frequency domain and is represented as the number of subcarriers. $n_{PRB}$ denotes the number of physical RBs. $N_{RB}^{PDSCH}$ denotes the frequency bandwidth of an RB for PDSCH transmission. $n_s$ denotes the index of a slot, and $N_{ID}^{cell}$ denotes the ID of a cell. mod denotes modulo operation. The position of a reference signal is different depending on the value $v_{shift}$ in a frequency domain. Since the value $v_{shift}$ depends on the ID of a cell, the position of a reference signal has various frequency shift values depending on a cell.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead can be provided according to a deployment scenario.

A sixteenth array completely turns off the switch of an SRS within a cell, which is mostly suitable for a serving cell which provides service to high-speed UEs.

FIG. 16 illustrates an uplink subframe including the symbols of a Sounding Reference Signal (SRS) in a wireless communication system to which an embodiment of the present invention may be applied.

Referring to FIG. 16, an SRS is always transmitted through the last SC-FDMA symbol in an arrayed subframe. Accordingly, an SRS and DMRS are placed in different SC-FDMA symbols. The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

Coordinated Multi-Point (CoMP) Transmission and Reception

In line with the demand of LTE-advanced, there has been proposed CoMP transmission in order to improve system performance. CoMP is also called co-MIMO, collaborative MIMO, or network MIMO. CoMP is expected to improve performance of UE located in a cell edge and to improve the average throughput of a cell (or sector).

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in a cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a Coordinated Scheduling/Beamforming (CS/CB) method.

In the JP method, data may be used in each point (ie, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

Relay Node (RN)

In a relay node, data transmitted/received between an eNB and UE is transferred through two different links (i.e., a backhaul link and an access link). An eNB may include a donor cell. A relay node is wirelessly connected to a radio access network through a donor cell.

In relation to the use of the bandwidth (or spectrum) of a relay node, a case where a backhaul link operates in the same frequency bandwidth as that of an access link is called an "in-band", and a case where a backhaul link and an access link operate in different frequency bandwidths is called an "out-band." In both the in-band and the out-band, UE (hereinafter called "legacy UE") operating in accordance with an existing LTE system (e.g., release-8) needs to be able to access a donor cell.

A relay node may be divided into a transparent relay node and a non-transparent relay node depending on whether UE recognizes a relay node. The term "transparent" means whether UE communicates with a network through a relay node is not recognized. The term "non-transparent" means whether UE communicates with a network through a relay node is recognized.

In relation to control of a relay node, a relay node may be divided into a relay node formed as part of a donor cell and a relay node autonomously controlling a cell.

A relay node formed as part of a donor cell may have a relay node identity (relay ID), but does not have its own cell identity.

If at least part of Radio Resource Management (RRM) is controlled by an eNB belonging to a donor cell, it is called a relay node formed as part of a donor cell although the remaining parts of the RRM are placed in the relay node. Such a relay node may support legacy UE. For example, various types of smart repeaters, decode-and-forward relays, and second layer (L2) relay nodes and a Type-2 relay node correspond to such a relay node.

In the case of a relay node autonomously controlling a cell, the relay node controls one or a plurality of cells, and a unique physical layer cell identity is provided to each of the cells controlled by the relay node. Furthermore, the cells controlled by the relay node may use the same RRM mechanism. From a viewpoint of UE, there is no difference between access to a cell controlled by a relay node and access to a cell controlled by a common eNB. A cell controlled by such a relay node can support legacy UE. For example, a self-backhauling relay node, a third layer (L3) relay node, a Type-1 relay node, and a Type-1a relay node correspond to such a relay node.

The Type-1 relay node is an in-band relay node and controls a plurality of cells, and each of the plurality of cells is seen by UE as a separate cell different from a donor cell. Furthermore, the plurality of cells has different physical cell IDs (this is defined in LTE release-8), and the relay node may send its own synchronization channel and reference signal. In the case of one cell operation, UE directly may receive scheduling information and HARQ feedback from a relay node and send its own control channels (e.g., a Scheduling Request (SR), a CQI, and ACK/NACK) to the relay node. Furthermore, the Type-1 relay node is seen by legacy UE (i.e., UE operating in accordance with an LTE release-8 system) as a legacy eNB (i.e., an eNB operating in accordance with an LTE release-8 system). That is, the Type-1 relay node has backward compatibility. Meanwhile, the Type-1 relay node is seen by UEs operating in accordance with an LTE-A system as an eNB different from a legacy eNB, thereby being capable of providing improved performance.

The Type-1a relay node has the same characteristics as the Type-1 relay node except that it operates in an out-band. The operation of the Type-1a relay node may be configured so that an influence on a first layer (L1) operation is minimized.

The Type-2 relay node is an in-band relay node. and it does not have a separate physical cell ID and thus does not form a new cell. The Type-2 relay node is transparent to legacy UE, and the legacy UE does not recognize the presence of the Type-2 relay node. The Type-2 relay node may send a PDSCH, but does not send at least CRS and PDCCH.

In order to prevent a relay node from operating in in-band, some resources in a time-frequency domain may need to be reserved for a backhaul link and may be configured so that they are not used for an access link. This is called resource partitioning.

A known principle in resource partitioning in a relay node may be described as follows. Backhaul downlink and access downlink may be multiplexed according to a Time Division Multiplexing (TDM) method on one carrier frequency (i.e., only one of a backhaul downlink and an access downlink in a specific time is activated). Likewise, backhaul uplink and access uplink may be multiplexed according to a TDM method on one carrier frequency (i.e., only one of a backhaul uplink and an access uplink in a specific time is activated).

In backhaul link multiplexing in FDD, backhaul downlink transmission may be performed in a downlink frequency bandwidth, and the transmission of a backhaul uplink may be performed in an uplink frequency bandwidth. In backhaul link multiplexing in TDD, backhaul downlink transmission may be performed in a downlink subframe of an eNB and a relay node, and the transmission of a backhaul uplink may be performed in an uplink subframe of an eNB and a relay node.

In the case of an in-band relay node, for example, when the reception of a backhaul downlink from an eNB and the transmission of an access downlink to UE are performed in the same frequency bandwidth at the same time, signal interference may be generated in the reception end of a relay node due to a signal transmitted by the transmission end of the relay node. That is, signal interference or RF jamming may be generated in the RF front end of the relay node. Likewise, when the transmission of a backhaul uplink to an eNB and the reception of an access uplink from UE are performed in the same frequency bandwidth at the same time, signal interference may be generated.

Accordingly, in order for a relay node to send/receive signals in the same frequency bandwidth at the same time, a sufficient separation needs to be provided between a reception signal and a transmission signal (e.g., that the reception signal and the transmission signal need to be sufficiently separated geographically, such as that a transmission antenna and a reception antenna are installed on the ground and in the grave, respectively).

One method for solving such signal interference is to allow a relay node to operate in such a way as not to send a signal to UE while receiving a signal from a donor cell. That is, a gap is generated in transmission from the relay node to the UE, and the UE (including legacy UE) is configured to not expect any transmission from the relay node during the gap. Such a gap may be configured by configuring a Multicast Broadcast Single Frequency Network (MBSFN) subframe.

FIG. 17 illustrates the segmentation of a relay node resource in a wireless communication system to which an embodiment of the present invention may be applied.

In FIG. 17, a first subframe is a common subframe, and a downlink (i.e., access downlink) control signal and data are transmitted from a relay node to UE in the first subframe. In contrast, a second subframe is an MBSFN subframe, and a control signal is transmitted from the relay node to the UE in the control region of the downlink subframe, but no transmission is performed from the relay node to the UE in the remaining region of the downlink subframe. In this case, since legacy UE expects the transmission of a PDCCH in all downlink subframes (i.e., a relay node needs to provide support so that legacy UEs within the region of the relay node perform measurement functions by receiving a PDCCH every subframe), the PDCCH needs to be transmitted in all downlink subframes for the correct operation of the legacy UE. Accordingly, the relay node does not perform backhaul downlink reception, but needs to perform access downlink transmission in the first N (N=1, 2 or 3) OFDM symbol period of a subframe (i.e., the second subframe) on the subframe configured for downlink (i.e., backhaul downlink) transmission from an eNB to the relay node. For this, the relay node may provide backward compatibility to serving legacy UE because a PDCCH is transmitted from the relay node to the UE in the control region of the second subframe. The relay node may receive transmission from the eNB while no transmission is performed from the relay node to the UE in the remaining region of the second subframe. Accordingly, access downlink transmission and backhaul downlink reception may not be performed at the same time in an in-band relay node through such a resource partitioning method.

The second subframe using an MBSFN subframe is described in detail. The control region of the second subframe may be said to be a relay node non-hearing period. The relay node non-hearing interval means an interval in which a relay node does not receive a backhaul downlink signal, but sends an access downlink signal. The interval may be configured to have a 1, 2 or 3 OFDM length, such as that described above. A relay node performs access downlink transmission to UE in a relay node non-hearing interval, but may perform backhaul downlink reception from an eNB in the remaining region. In this case, time is taken for the relay node to switch from transmission mode to reception mode because the relay node is unable to perform transmission/reception in the same frequency bandwidth at the same time. Accordingly, a Guard Time (GP) needs to be configured so that the relay node switches to transmission/reception mode in the first some interval of a backhaul downlink reception region. Likewise, a guard time for enabling the relay node to switch to reception/transmission mode may be configured although the relay node operates in such a way as to receive a backhaul downlink from the eNB and to send an access downlink to the UE. The length of such a guard time may be set as a value in a time domain. For example, the length of the guard time may be set as a k (k≥1) time sample (Ts) value or may be set as one or more OFDM symbol length. Alternatively, relay node backhaul downlink subframes may be contiguously configured, or the guard time of the last part of a subframe may not be defined or configured according to a specific subframe timing alignment relationship. Such a guard time may be defined only in a frequency domain configured for backhaul downlink subframe transmission in order to maintain backward compatibility (if a guard time is configured in an access downlink interval, legacy UE cannot be supported). In a backhaul downlink reception interval other than the guard time, the relay node can receive a PDCCH and a PDSCH from the eNB. This may be represented by a relay-PDCCH (R-PDCCH) and a relay-PDSCH (R-PDSCH) in the meaning of a relay node-dedicated physical channel.

Channel State Information (CSI) Feedback

An MIMO method may be divided into an open-loop method and a closed-loop method. In the open-loop method, a transmission end performs MIMO transmission without the feedback of CSI from an MIMO reception end. In the closed-loop MIMO method, a transmission end receives CSI fed back by an MIMO reception end and performs MIMO transmission. In the closed-loop MIMO method, in order to obtain the multiplexing gain of an MIMO transmission antenna, each of a transmission end and a reception end may perform beamforming based on CSI. A transmission end (e.g., an eNB) may allocate an uplink control channel or an uplink shared channel to a reception end (e.g., UE) so that a reception end (e.g., UE) is able to feed CSI back.

The feedback CSI may include a Rank Indicator (RI), a Precoding Matrix Index (PMI), and a Channel Quality Indicator (CQI).

The RI is information about a channel rank. The channel of a rank means a maximum number of layers (or streams) in which different information may be transmitted through the same time-frequency resource. A rank value may be fed back in a longer cycle (i.e., less frequently) than a PMI and CQI because it is mostly determined by long term fading of a channel.

The PMI is information about a precoding matrix which is used in transmission from a transmission end and is a value into which the spatial characteristic of a channel is reflected. The term "precoding" means that a transmission layer is mapped to a transmission antenna, and a layer-antenna mapping relationship may be determined based on a precoding matrix. The PMI corresponds to the PMI of an eNB, which is preferred by UE based on a metric, such as a Signal-to-Interference plus Noise Ratio (SINR). In order to reduce feedback overhead of precoding information, a method of previously sharing, by a transmission end and a reception end, a codebook including several precoding matrices and feeding only an index indicative of a specific precoding matrix in the corresponding codebook back may be used.

The CQI is information indicative of the intensity of channel or quality of channel. The CQI may be represented as a predetermined MCS combination. That is, a CQI index that is fed back is indicative of a corresponding modulation scheme and coding rate. In general, the CQI is a value into which a reception SINR which may be obtained when an eNB configures a space channel using a PMI is reflected.

In a system (e.g., LTE-A system) supporting an extended antenna configuration, to obtain additional multi-user diversity using a multi-user-MIMO (MU-MIMO) method is taken into consideration. In the MU-MIMO method, an interference channel is present between UEs multiplexed in an antenna region. Accordingly, it is necessary to prevent interference from occurring in another UE if an eNB performs downlink transmission using CSI fed back by one UE of multiple users. Accordingly, in order for an MU-MIMO operation to be correctly performed, CSI having higher accuracy compared to a single user-MIMO (SU-MIMO) method needs to be fed back.

A new CSI feedback method using improved CSI including an existing RI, PMI, and CQI may be used so that more accurate CSI can be measured and reported as described above. For example, precoding information fed back by a reception end may be indicated by a combination of two PMIs. One (the first PMI) of the two PMIs has the attributes of a long term and/or a wideband and may be called W1. The other (the second PMI) of the two PMIS has the attributes of a short term and/or a sub-band and may be called W2. The final PMI may be determined by a combination (or function) of W1 and W2. For example, assuming that the final PMI is W, W=W1*W2 or W=W2*W1 may be defined.

In this case, the average characteristics of a channel in terms of the frequency and/or time are reflected in W1. In other words, W1 may be defined as CSI in which the characteristics of a long term channel in terms of time are reflected, the characteristics of a wideband channel in terms of frequency are reflected, or the characteristics of a long term channel in terms of time and a wideband channel in terms of frequency are incorporated. In order to simply represent such characteristics of W1, W1 is called CSI of long term-wideband attributes (or a long term wideband PMI).

A channel characteristic that is instantaneous compared to W1 is reflected in W2. In other words, W2 may be defined as CSI in which the characteristics of a short term channel in terms of time are reflected, the characteristics of a sub-band channel in terms of frequency are reflected, or the characteristics of a short term channel in terms of time and a sub-band channel in terms of frequency are reflected. In order to simply represent such characteristics of W2, W2 is called CSI of a short term-sub-band attributes (or a short term sub-band PMI).

In order for one final precoding matrix W to be determined based on information about 2 different attributes (e.g., W1 and W2) indicative of a channel state, it is necessary to configure a separate codebook including precoding matrices indicative of channel information about attributes (i.e., a first codebook for W1 and a second codebook for W2). The form of a codebook configured as described above may be called a hierarchical codebook. Furthermore, to determine a codebook to be finally used using the hierarchical codebook may be called hierarchical codebook transformation.

If such a codebook is used, channel feedback of higher accuracy compared to a case where a single codebook is used is made possible. Single cell MU-MIMO and/or multi-cell cooperation communication may be supported using channel feedback of higher accuracy as described above.

Enhanced PMI for MU-MIMO or CoMP

In a next-generation communication standard, such as LTE-A, there has been proposed transmission schemes, such as MU-MIMO and CoMP, in order to achieve a high transfer rate. In order to implement such improved transmission schemes, UE needs to feed more complicated and various CSI back to an eNB.

For example, in MU-MIMO, a CSI feedback method of uploading, by UE-A, the PMI (hereinafter called a "best companion PMI (BCPMI)") of UE to be scheduled along with the UE-A, together with the desired PMI of the UE-A, when the UE-A selects a PMI is taken into consideration.

That is, when co-scheduled UE is used as a precoder in a precoding matrix codebook, it calculates a BCPMI that provides less interference to UE-A and additionally feeds the calculated BCPMI back to an eNB.

The eNB schedules the UE-A and another UE which prefers BCPM (Best Companion Precoding Matrix (BCPM) corresponding to a BCPMI) precoding using the information.

A BCPMI feedback method is divided into explicit feedback and implicit feedback depending on whether feedback payload is present or not.

First, there is an explicit feedback method having feedback payload.

In the explicit feedback method, UE-A determines a BCPMI within a precoding matrix codebook and feeds the BCPMI back to an eNB through a control channel. In one method, UE-A may select an interference signal precoding matrix that maximizes an estimated SINR within a codebook and feed the interference signal precoding matrix back as a BCPMI value.

An advantage of the explicit feedback method is to select a BCPMI more effective in removing interference and to send the selected BCPMI. The reason for this is that, assuming that each of all codewords within a codebook is one interference beam, UE determines a value most effective in removing interference to be a BCPMI by performing comparison on metrics, such as SINRs. A greater feedback payload size is required because candidate BCPMIs are increased as a codebook size is increased.

Second, there is an implicit feedback method not having feedback payload.

In the implicit feedback method, UE-A does not search a codebook for a codeword having the least interference and select the retrieved codebook as a BCPMI, but a corresponding BCPMI is statically determined once a desired PMI is determined. In this case, a BCPMI may include vectors orthogonal to the determined desired PMI.

The reason for this is that it is effective to reduce interference from an interference signal when desired PM is selected in directions other than the direction of a PM because the desired PM has been configured in the direction in which the channel gain of a channel H can be maximized in order to maximize a reception SINR. If the channel H is analyzed as a plurality of independent channels through Singular Value Decomposition (SVD), such a BCPMI decision method is further justified. A 4×4 channel H may be decomposed through SVD as in Equation 15 below.

$$H = ULV^H = [u_1 \ u_2 \ u_3 \ u_4] \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix}$$ [Equation 15]

In Equation 15, U,V is a unitary matrix. $u_i$, $v_i$, and $\lambda_i$ are the 4×1 left singular vector, 4×1 right singular vector, and singular value of a channel H and are arranged in $\lambda_i \geq \lambda_{i+1}$ in descending order. All channel gains which may be theoretically obtained if a beamforming matrix V is used in a transmission end and a beamforming matrix $U^H$ is used in a reception end can be obtained without a loss.

In the case of a rank 1, optimal performance may be obtained from the point of view of an SNR because a channel gain $[\lambda_1]^2$ is obtained when a transmission beamforming vector $v_1$ and a reception beamforming vector u1 are used. For example, it is advantage for UE-A to select a PM most similar to $v^1$ in the case of a rank 1. If a desired PM is ideally matched up with $v_i$, an interference signal can be perfectly removed without a loss of a desired signal by setting a reception beam as $u_1$ and setting the transmission beam of the interference signal in a direction orthogonal to the PM. If there is some difference between a desired PM and $v_1$ due to a quantization error, however, an interference signal may not be perfectly removed without a loss of a desired signal because the transmission beam of the interference signal set in the direction orthogonal to the PM is no longer the same as a beam orthogonal to $v_1$, but it may help control the interference signal if the quantization error is small.

As an example of implicit feedback, if an LTE codebook is used, a BCPMI may be statically determined to be a vector index orthogonal to a PMI.

In this case, it has been assumed that the number of transmission antennas is 4 and UE which has fed the PMI back has a reception rank of 1, and 3 vectors orthogonal to a desired PMI are represented as 3 BCPMIs.

For example if a PMI is 3, a BCPMI is determined to be 0, 1, or 2. The PMI and the BCPMI are indicative of the indices of a 4×1 vector codeword within a codebook. An eNB considers the BCPMI set (BCPMI=0, 1, 2) to be a valid precoding index for removing interference and uses some of or the entire BCPMI set as the precoder of co-schedule UE.

An advantage of an implicit PMI is that there is no additional feedback overhead because a desired PMI and a BCPMI set are mapped in a 1:1 way. However, a BCPM dependent on desired PM may have an error in the direction of an optimal interference removal beam due to the quantization error of the desired PM (i.e., a precoding matrix corresponding to a PMI). If a quantization error is not present, all 3 BCPMs represent interference beams (ideal interference beams) for perfectly removing interference. If a quantization error is present, however, there is a difference between the beam of each of the 3 BCPMs and an ideal interference beam.

Furthermore, a difference between the ideal interference beams of the BCPMs is the same in average, but may be different on a specific moment. For example, if a desired PMI=3, it may be effective to remove an interference signal in order of BCPMIs 0, 1, and 2. In this case, there is a possibility that an eNB unaware of a relative error between the BCPMIs 0, 1, and 2 may determine the BCPMI 2 having the greatest error with an ideal interference beam to be the beam of an interference signal and may perform communication in the state in which strong interference is present between co-scheduled UEs.

General (Device-to-Device) D2D Communication

In general, D2D communication is limitedly used as a term indicative of communication between things or thing intelligence communication. In an embodiment of the present invention, however, D2D communication may include all types of communication between a variety of types of devices having a communication function, such as smart phones and personal computers, in addition to simple devices having a communication function.

FIG. 18 is a diagram conceptually illustrating D2D communication in a wireless communication system to which an embodiment of the present invention may be applied.

FIG. 18a shows an existing communication method based on an eNB. UE1 may send data to an eNB in uplink, and the eNB may send data to UE2 in downlink. Such a communication method may be called an indirect communication method through an eNB. An Un link (i.e., a link between eNBs or a link between an eNB and a relay node, which may be called a backhaul link), that is, a link defined in an existing wireless communication system, and/or an Uu link (i.e., a link between an eNB and UE or a link between a relay node and UE, which may be called an access link) may be related to the indirect communication method.

FIG. 18b shows a UE-to-UE communication method, that is, an example of D2D communication. The exchange of data between UEs may be performed without the intervention of an eNB. Such a communication method may be called a direct communication method between devices. The D2D direct communication method has advantages of reduced latency and the use of lesser radio resources compared to the existing indirect communication method through an eNB.

FIG. 19 shows an example of various scenarios of D2D communication to which a method proposed in this specification may be applied.

A scenario for D2D communication may be basically divided into (1) an out-of-coverage network, (2) a partial-coverage network, and (3) an in-coverage network depending on where UE1 and UE2 are placed within cell coverage (i.e., in-coverage) and out of cell coverage (i.e. out-of-coverage).

The in-coverage network may be divided into an in-coverage-single-cell and an in-coverage-multi-cell depending on the number of cells corresponding to coverage of an eNB.

FIG. 19(a) shows an example of an out-of-coverage network scenario for D2D communication.

The out-of-coverage network scenario means that D2D communication is performed between D2D UEs without control of an eNB.

From FIG. 19(a), it may be seen that only UE1 and UE2 are present and the UE1 and the UE2 perform direct communication.

FIG. 19(b) shows an example of a partial-coverage network scenario for D2D communication.

The partial-coverage network scenario means that D2D communication is performed between D2D UE placed within network coverage and D2D UE placed out of the network coverage.

From FIG. 19(b), it may be seen that UE1 placed within network coverage and UE2 placed out of the network coverage perform communication.

FIG. 19(c) shows an example of an in-coverage-single-cell scenario, and FIG. 19(d) shows an example of an in-coverage-multi-cell scenario.

The in-coverage network scenario means that D2D UEs perform D2D communication through control of an eNB within network coverage.

In FIG. 19(c), UE1 and UE2 are placed within the same network coverage (or cell) and perform D2D communication under the control of an eNB.

In FIG. 19(d), UE1 and UE2 are placed within network coverage, but are placed within different network coverage. Furthermore, the UE1 and the UE2 perform D2D communication under the control of eNBs managing each of network coverage.

D2D communication is described in more detail below.

D2D communication may be performed in the scenarios of FIG. 19, but may be commonly performed within network coverage (in-coverage) and out of network coverage (out-of-coverage). A link used for D2D communication (i.e., direct communication between UEs) may be called a D2D link, a directlink, or a sidelink, but is hereinafter generally called a sidelink, for convenience of description.

Sidelink transmission may be performed in an uplink spectrum in the case of FDD and may be performed in an uplink (or downlink) subframe in the case of TDD. Time Division Multiplexing (TDM) may be used for the multiplexing of sidelink transmission and uplink transmission.

Sidelink transmission and uplink transmission are not occurred at the same time. Sidelink transmission is not occurred in a sidelink subframe which partially or generally overlaps an uplink subframe or UpPTS used for uplink transmission. Furthermore, the transmission and reception of a sidelink are also not occurred at the same time.

The structure of an uplink physical resource may be identically used as the structure of a physical resource used for sidelink transmission. However, the last symbol of a sidelink subframe includes a guard period and is not used for sidelink transmission.

A sidelink subframe may include an extended Cyclic Prefix (CP) or a normal CP.

D2D communication may be basically divided into discovery, direct communication, and synchronization.

1) Discovery

D2D discovery may be applied within network coverage (including an inter-cell and an intra-cell). In inter-cell discovery, both synchronous and asynchronous cell deployments may be taken into consideration. D2D discovery may be used for various commercial purposes, such as advertising, issuing coupons, and finding friends, to UE within a proximity region.

If UE 1 has a role of sending a discovery message, the UE 1 sends a discovery message, and UE 2 receives the discovery message. The transmission and reception roles of the UE 1 and the UE 2 may be changed. Transmission from the UE 1 may be received by one or more UE(s), such as the UE 2.

The discovery message may include a single MAC PDU. In this case, the single MAC PDU may include a UE ID and an application ID.

A physical sidelink discovery channel (PSDCH) may be defined as a channel for sending the discovery message. The structure of a PUSCH may be reused as the structure of the PSDCH.

Two types Type 1 and Type 2 may be used as a resource allocation method for D2D discovery.

In the case of Type 1, an eNB may allocate a resource for sending a discovery message in a non-UE-specific way.

To be specific, a radio resource pool comprising a plurality of subframe sets and a plurality of resource block sets for transmitting and receiving a discovery message within a specific period (in what follows, 'discovery period') is allocated, and a discovery transmitting UE selects a specific resource within the radio resource pool in an arbitrary manner and transmits a discovery message.

The periodic discovery resource pool can be allocated for transmission of a discovery signal in a semi-static manner. The configuration information of a discovery resource pool for discovery transmission includes a discovery period, a subframe set which can be used for transmission of a discovery signal within the discovery period, and information about a resource block set. The configuration information of the discovery resource pool can be transmitted to the UE through upper layer signaling. In the case of an in-coverage UE, the discovery resource pool for discovery transmission is set up by an eNB and can be informed to the UE through RRC signaling (for example, System Information Block (SIB)).

The discovery resource pool allocated for discovery within one discovery period can be multiplexed to a time-frequency resource block of the same size through TDM and/or FDM scheme, where the time-frequency resource block of the same size can be called a 'discovery resource'. A discovery resource can be set as one subframe unit and include two Physical Resource Blocks (PRBs) per slot in each subframe. One UE can use one discovery resource for transmission of a discovery MAC PDU.

Also, a UE can transmit a discovery signal repeatedly within a discovery period for transmission of one transport block. Transmission of a MAC PDU by one UE can be repeated (for example, four times) contiguously or noncontiguously within the discovery period (namely radio resource pool). The transmission times of a discovery signal for one transmission block can be transmitted to the UE through upper layer signaling.

UE may randomly select a first discovery resource in a discovery resource set which may be used for the repetitive transmission of an MAC PDU and may determine the remaining discovery resources in relation to the first discovery resource. For example, a specific pattern may be previously determined, and a next discovery resource may be determined according to the predetermined specific pattern depending on the position of a discovery resource first selected by UE. Alternatively, UE may randomly select each discovery resource within a discovery resource set which may be used for the repetitive transmission of an MAC PDU.

In the case of Type 2, a resource for discovery message transmission is allocated in a UE-specific way. Type 2 is subdivided into Type-2A and Type-2B. Type-2A is a method of allocating, by an eNB, a resource at the instance at which UE sends a discovery message within a discovery cycle, and Type-2B is a method of allocating resources semi-persistently.

In the case of Type-2B, RRC_CONNECTED UE requests an eNB to allocate a resource for the transmission of a D2D discovery message through RRC signaling. Furthermore, the eNB may allocate the resource through RRC signaling. When the UE transits to an RRC_IDLE state or when the eNB withdraws resource allocation through RRC signaling, the UE releases the most recently allocated transmission resource. As described above, in the case of Type-2B, a radio resource may be allocated through RRC signaling, and the activation/deactivation of an allocated radio resource may be determined by a PDCCH.

A radio resource pool for receiving a discovery message may be configured by an eNB, and UE may be notified of the configured radio resource pool through RRC signaling (e.g., a System Information Block (SIB)).

Discovery message reception UE monitors both the aforementioned discovery resource pools of Type 1 and Type 2 in order to receive a discovery message.

2) Direct Communication

The region to which D2D direct communication is applied includes a network coverage edge area (i.e., edge-of-coverage) in addition to inside and outside network coverage (i.e., in-coverage and out-of-coverage). D2D direct communication may be used for purposes, such as Public Safety (PS).

If UE 1 has a role of direct communication data transmission, the UE 1 sends direct communication data, and UE 2 receives the direct communication data. The transmission and reception roles of the UE 1 and the UE 2 may be changed. The direct communication transmission from the UE 1 may be received by one or more UE(s), such as the UE 2.

D2D discovery and D2D communication may be independently defined without being associated with each other. That is, in groupcast and broadcast direct communication, D2D discovery is not required. If D2D discovery and D2D direct communication are independently defined as described above, UEs do not need to perceive adjacent UE. In other words, in the case of groupcast and broadcast direct communication, all reception UEs within a group are not required to be adjacent to each other.

A physical sidelink shared channel (PSSCH) may be defined as a channel for sending D2D direct communication data. Furthermore, a physical sidelink control channel (PSCCH) may be defined as a channel for sending control information (e.g., Scheduling Assignment (SA), a transmission format for direct communication data transmission, etc) for D2D direct communication. The structure of a PUSCH may be reused as the structures of the PSSCH and the PSCCH.

Two types of mode 1 and mode 2 may be used as a resource allocation method for D2D direct communication.

Mode 1 refers to a method of scheduling, by an eNB, data for D2D direct communication by UE or a resource used for UE to send control information. Mode 1 is applied to in-coverage.

An eNB configures a resource pool for D2D direct communication. In this case, the resource pool for D2D communication may be divided into a control information pool and a D2D data pool. When an eNB schedules control information and a D2D data transmission resource within a pool configured for transmission D2D UE using a PDCCH or ePDCCH (enhanced PDCCH), the transmission D2D UE sends control information and D2D data using the allocated resource.

Transmission UE requests a transmission resource from an eNB. The eNB schedules a resource for sending control information and D2D direct communication data. That is, in the case of mode 1, the transmission UE needs to be in the RRC_CONNECTED state in order to perform D2D direct communication. The transmission UE sends a scheduling request to the eNB, and a Buffer Status Report (BSR) procedure is performed so that the eNB may determine the amount of resources requested by the transmission UE.

Reception UEs monitors a control information pool. When decoding control information related to reception UE, the reception UE may selectively decode D2D data transmission related to corresponding control information. The reception UE may not decode a D2D data pool based on a result of the decoding of the control information.

Mode 2 refers to a method of randomly selecting, by UE, a specific resource in a resource pool in order to send data or control information for D2D direct communication. Mode 2 is applied to out-of-coverage and/or edge-of-coverage.

In mode 2, a resource pool for sending control information and/or a resource pool for sending D2D direct communication data may be pre-configured or may be configured semi-statically. UE is supplied with a configured resource pool (time and frequency) and selects a resource for D2D communication transmission in the resource pool. That is, the UE may select a resource for control information transmission in a control information resource pool in order to send control information. Furthermore, the UE may select a resource in a data resource pool in order to send D2D direct communication data.

In D2D broadcast communication, control information is transmitted by broadcasting UE. Control information is explicitly and/or implicitly indicative of the position of a resource for data reception in relation to a physical channel (i.e., a PSSCH) on which D2D direct communication data is carried.

3) Synchronization

A D2D Synchronization Signal/sequence (D2DSS) can be used by a UE to obtain time-frequency synchronization. In particular, since the eNB is unable to control a UE located beyond network coverage, a new signal and procedure can be defined to establish synchronization among UEs. A D2D synchronization signal can be called a sidelink synchronization signal.

A UE transmitting a D2D synchronization signal periodically can be called a D2D synchronization source or a sidelink synchronization source. In case a D2D synchronization source is an eNB, the structure of a D2D synchronization signal being transmitted can be identical to that of PSS/SSS. In case the D2D synchronization source is not an eNB (for example, a UE or GNSS (Global Navigation Satellite System)), the structure of a D2D synchronization signal being transmitted can be newly defined.

The D2D synchronization signal is transmitted periodically with a period not shorter than 40 ms. Each UE can have a physical-layer D2D synchronization identity. The physical-layer D2D synchronization identifier may be called a physical-layer sidelink synchronization identity or simply a D2D synchronization identifier.

The D2D synchronization signal includes a D2D primary synchronization signal/sequence and a D2D secondary synchronization signal/sequence. These signals can be called a primary sidelink synchronization signal and a secondary sidelink synchronization signal, respectively.

Before transmitting a D2D synchronization signal, the UE may first search for a D2D synchronization source. If a D2D synchronization source is found, the UE can obtain time-frequency synchronization through a D2D synchronization signal received from the D2D synchronization source found. And the corresponding UE can transmit the D2D synchronization signal.

In D2D communication, direct communication between two devices is described below as an example, for clarity, but the scope of the present invention is not limited thereto. The same principle described in an embodiment of the present invention may be applied to D2D communication between a plurality of two or more devices.

Method for Transmitting a D2D Synchronization Signal and D2D Synchronization Channel The present invention provides a method for designing a synchronization channel or signal used for D2D communication.

To perform D2D communication, it is assumed that UEs are already synchronized with each other, and thus a synchronization signal is required to obtain synchronization. As described above, this signal may be called a D2D Synchronization Signal/sequence (D2DSS) or Sidelink Synchronization signal, but for the convenience of description, it is collectively called a D2D synchronization signal (D2DSS).

Also, along with synchronization, a channel may be needed, which is intended for delivering essential information used for D2D communication. This channel may be called a Physical D2D Synchronization Channel (PD2DSCH) or Physical Sidelink Broadcast Channel (PSBCH), but for the convenience of description, it is collectively called a physical D2D synchronization channel (PD2DSCH) (or simply a D2D synchronization channel).

A D2DSS can use Zadoff-Chu (ZC) sequence or M sequence used in the LTE/LTE-A system. However, the length and composition thereof can be different.

A D2D synchronization signal/D2D synchronization channel can be used to synchronize a D2D UE within coverage or out of coverage; or can be used for a D2D UE out of coverage to obtain synchronization for communication.

FIG. 20 illustrates a scenario used for a D2D synchronization signal and D2D synchronization channel according to one embodiment of the present invention.

With reference to FIG. 20, UE A delivers a D2D synchronization signal/D2D synchronization channel generated by UE A itself or received from the eNB to UE B and UE C. UE A is such a kind of UE relaying a D2D synchronization signal/D2D synchronization channel.

In this case, a D2D synchronization channel can include information such as a synchronization source, type, resource configuration, hop counter, TDD/FDD indicator, and power control. Synchronization source indicates from which a synchronization signal originates, type indicates whether a device which has generated a synchronization signal is a UE or eNB, and resource configuration represents resource allocation information indicating which resource should be used to perform communication.

Also, FIG. 20 illustrates an example where a D2D synchronization signal/D2D synchronization channel is delivered in case a D2D synchronization source is located out of coverage.

In this case, if it is assumed that a D2D synchronization source (for example, UE 1) is disconnected from the eNB, one UE out of coverage (for example, UE 1) performs broadcasting by generating a D2D synchronization signal/D2D synchronization channel. A signal or information that UE 1 broadcasts is delivered to all of UEs, such as UE 2 and UE 3, within a communication range. UE 2 and UE 3 analyze a received D2D synchronization signal/D2D synchronization channel and determine whether to synchronize with UE 1. If UE 2 and UE 3 determine not to synchronize with UE 1, UE 2 and UE 3 can search for a different D2D synchronization signal/D2D synchronization channel and again determine whether to synchronize therewith. Therefore, in the same way when a D2D signal disappears, UE 2 and UE3 search for a new D2D synchronization source.

FIG. 21 illustrate configuration of D2D synchronization signal resources according to one embodiment of the present invention.

FIG. 21 illustrates subcarriers used for transmission of a D2D synchronization signal and/or D2D synchronization channel or used for D2D synchronization signal sequence mapping, which include a DC carrier. FIG. 21 assumes that the structure of the D2D synchronization signal and/or D2D synchronization channel comprises 62 subcarriers.

As shown in FIG. 21, if a DC carrier exists in the center of a D2D synchronization signal, the D2D synchronization signal can prevent the DC carrier from being mapped by excluding the corresponding DC carrier from subcarrier indices. If the DC carrier is not excluded, a sequence symbol mapped to the corresponding subcarrier may be punctured or may not be demodulated in a receiving UE due to noise.

In other words, among a total of 73 subcarriers, the DC carrier is excluded, 5 subcarriers are not used for actual transmission of information for each of the both ends, and the D2D synchronization signal and/or D2D synchronization channel.

At this time, for a symbol to which a D2D synchronization signal and/or D2D synchronization channel is transmitted, the 5 subcarriers in each of the both ends can be padded with zeros or with predetermined values.

The zeros padded to the both ends in fact carry no information; to transmit additional information by using those bands, a predetermined bit/symbol pattern can be transmitted by mapping the bit/symbol pattern onto the 5 subcarriers in the both ends. One example of additional information can be a response signal (for example, HARQ/ARQ) in response to transmission. In addition to the example, additional information can be employed for various uses. For example, additional information may indicate type of the D2D synchronization signal; represent a unique identifier or identifier group; or supplement the representation. Also, the additional information can indicate whether a D2D synchronization signal should be used in an emergency or not. Also, the additional information may include resource allocation information or generate new information by being combined with the resource allocation information.

Different from an existing downlink PSS (Primary Synchronization Signal), the aforementioned region can be used additionally. This rule can be applied in the same way to D2D SSS and PD2D SCH. In other words, the extra resource region can be used to provide additional information.

Meanwhile, although FIG. 21 assumes that the DC carrier is located in the center of subcarriers, it can be located anywhere in the 73 subcarriers depending on situations. The position of the DC carrier can be varied according to the relationship between uplink subcarrier index and RB index; and a D2D synchronization signal mapping rule. For example, RB configuration may be performed without counting the DC carrier.

On the other hand, different from downlink, in the case of uplink transmission, a D2D UE or a resource region given to a UE group often encounters a situation which does not include a DC carrier. Therefore mapping according to a different scheme is also possible, which will be described with reference to drawings below.

FIG. 22 illustrate configuration of D2D synchronization signal resources according to one embodiment of the present invention.

FIG. 22 illustrates subcarriers used for transmission of a D2D synchronization signal and/or a D2D synchronization channel not taking into account a DC carrier or used for D2D synchronization signal sequence mapping. FIG. 22 assumes that the structure of a D2D synchronization signal and/or D2D synchronization channel comprises 62 subcarriers.

With reference to FIG. 22, since the DC carriers is not taken into account, a total of 72 subcarriers are actually used to occupy 6 Resource Blocks (RBs). In other words, 5 subcarriers at the both ends of the entire 72 subcarriers are not used for actual transmission of information, and the D2D synchronization signal and/or D2D synchronization channel are mapped to the remaining 62 subcarriers.

In this case, too, as described in the example of FIG. 21, the 5 subcarriers at the both ends of the symbol to which a D2D synchronization signal and/or D2D synchronization channel is transmitted can be padded with zeroes or filled with predetermined values. In other words, additional information can be transmitted to the 5 subcarrier regions at the both ends other than the 62 subcarriers through which D2D PSS, D2D SSS and/or PD2DSCH is transmitted. Examples of additional information are the same as described earlier, which will be omitted in what follows.

Meanwhile, although FIGS. 21 and 22 assume that the structure of a D2D synchronization signal and/or D2D synchronization channel comprises 62 subcarriers, the assumptions is only an example, and it should be noted that the present invention is not limited to the example.

In other words, a D2D synchronization signal can use a signal having a different length (for example, 4 RBs or 5 RBs) from that of the LTE/LTE-A PSS/SSS.

For example, in case 4 RBs are used, only 48 subcarriers are used, and ZC sequence of length 48 can be used. In this case, a sequence can be generated to fit the length of 48 by using a cyclic extension scheme.

In another method, a computer-generated sequence with a length of 1 RB or 2 RB generated by an uplink reference signal (for example, a demodulation reference signal) can be utilized. For example, a sequence with a length of 1 RB (12 subcarriers) can be used to form a D2D PSS (or D2D SSS) with a length of 4 RB, 5 RB, or 6 RB by repeating the sequence 4, 5, or 6 times. Also, a sequence with a length of 2 RB (24 subcarriers) may be used to form a D2D PSS (or D2D SSS) with a length of 2 RB, 4 RB, or 6 RB by repeating the sequence 1, 2, or 3 times.

At this time, 30 ZC sequences, each of which has a length of 1 RB or 2 RB, exist; all of the sequences may be used or part of them may be selected and used. Whether to use all or part of the sequences is closely related to how many types of unique identifiers (namely physical layer D2D synchronization identifier or physical layer sidelink synchronization identifier) are to be made by using D2D PSS and D2D SSS. For example, 600 unique identifiers can be generated by increasing the number of D2D PSSs to 30 and decreasing the number of D2D SSSs to 20.

In what follows, a structure of a D2D synchronization signal (D2D PSS and D2D SSS) and D2D synchronization channel will be described in more detail with reference to drawings.

FIG. 23 illustrates a structure of a D2D synchronization signal and D2D synchronization channel according to one embodiment of the present invention.

FIG. 23 illustrates the whole resource region used for a D2D synchronization signal and D2D synchronization channel. The whole resource region used for a D2D synchronization signal and D2D synchronization channel can comprise m RBs in the frequency domain (for example, 6 RBs) and n slots (or subframes) in the time domain (for example, one subframe).

As shown in FIG. 23, a D2D synchronization channel can be mapped to the same resource block to which a D2D synchronization signal is mapped. And the D2D synchronization signal and D2D synchronization channel can be transmitted through multiplexing.

To be more specific, Guard Periods (GPs) 2311, 2321, 2331 can be located at the first and the last time slot in the time domain. However, this location is only an example, and it should be noted that the GP 2311, 2321, 2331 may be located either at the first or at the last region in the time domain by using a symbol shift. For example, the length of the GP can be shorter than one symbol, equal to one symbol, or longer than one symbol.

And a D2D PSS 2312, 2322, 2332 can be mapped subsequent to the GP 2311 2321, 2331 in the time domain. A D2D PSS 2312, 2322, 2332 can be transmitted from one or more symbols within one subframe. In case the D2D PSS is transmitted from a plurality of symbols, it can be transmitted from contiguous symbols or from non-contiguous symbols.

And next to the D2D PSS 2312, 2322, 2332 in the time domain, PD2DSCH 2313, 2323, 2333 and D2D SSS 2314, 2324, 2334 can be mapped being interlaced. The D2D SSS 2314, 2324, 2334 also can be transmitted from one or more symbols within one subframe. In case the D2D SSS is transmitted from a plurality of symbols, it can be transmitted from contiguous or non-contiguous symbols.

Although the D2D PSS 2312, 2322, 2332 and D2D SSS 2314, 2324, 2334 are all used to obtain synchronization for D2D communication, they can be used as a Demodulation Reference signal (DM RS) of the PD2DSCH 2313, 2323, 2333. In particular, the D2D SSS 2314, 2324, 2334 is appropriate to be used as a DM RS in the proximity of the PD2DSCH 2313, 2323, 2333.

In what follows, a frequency band in which the D2D PSS, D2D SSS, and PD2DSCH are transmitted will be examined.

First of all, as shown in FIG. 23a, the bandwidth allocated for transmission of the D2D PSS 2312, D2D SSS 2314, and PD2DSCH 2313 can be the same to each other. At this time, the transmission bandwidth can differ from each other according to the sequence type and length used for the D2D PSS 2312 and/or D2D SSS 2314.

For example, the D2D PSS 2312 and D2D SSS 2314 can have the same sequence length as a downlink PSS/SSS defined in the LTE/LTE-A. In other words, the D2D PSS 2312 and D2D SSS 2314 can be transmitted being mapped to 62 subcarriers. Also, the PD2DSCH 2313 can also be mapped to the 62 subcarriers in the frequency domain. In this case, if the whole frequency band used for the D2D synchronization signal and the D2D synchronization channel comprises 6 RBs, the 5 subcarriers at the both ends are not used for transmission of D2D PSS 2312, D2D SSS 2314, and PD2DSCH 2313.

Also, the D2D PSS 2312, D2D SSS 2314, and PD2DSCH 2313 can be transmitted in units of RBs. In other words, the PD2DSCH 2313 is mapped to the physical resources in RB units: and the sequence length can be adjusted so that D2D PSS 2312 and D2D SSS 2314 can have the same length as the bandwidth. For example, if the whole frequency band used for the D2D synchronization signal and D2D synchronization channel comprises 6 RBs in the frequency domain, 4 RBs can be used to transmit the D2D SSS 2314 and PD2DSCH 2313, excluding 1 RB in each of the both ends of the band.

The unused part (for example, 5 subcarriers or 1 RB) of the both ends in the whole frequency band can be padded with zeroes or predetermined values to transmit D2D PSS 2322, D2D SSS 2324, and PD2DSCH 2323. At this time, part of subcarriers of the both ends may transmit additional information as described above: since examples of additional information are the same as described above, descriptions thereof will be omitted.

Next, with reference to FIG. 23b, it is highly probable that allocation of channel resources is performed by an integer multiple of an RB, the PD2DSCH 2323 can be mapped to the physical resources by an integer multiple of an RB.

However, the bandwidth for transmission of the D2D PSS 2322 and D2D SSS 2324 can differ from the transmission bandwidth for the PD2DSCH 2323. At this time, the transmission bandwidths of the D2D PSS 2322 and/or D2D SSS 2324 can differ from each other according to the type and length of a sequence used for the D2D PSS 2322 and/or D2D SSS 2324.

The D2D PSS 2322 and D2D SSS 2324 can have the same sequence length as the downlink PSS/SSS defined in the LTE/LTE-A. In other words, the D2D PSS and D2D SSS can be transmitted through 62 subcarriers. In this case, if the whole frequency band used for the D2D synchronization signal and D2D synchronization channel comprises 6 RBs, 5 subcarriers at the both ends of the band are not used for transmission of the D2D PSS 2322 and D2D SSS 2324.

And if the whole frequency band used for the D2D PSS 2322, D2D SSS 2324, and PD2DSCH 2323 comprises 6 RBs, part of the subcarriers at the both ends of the band (for example, 5 subcarriers) are not used for transmission of the D2D PSS 2322 and D2D SSS 2324, 4 RBs excluding the two RBs at both ends of the whole band can be allocated to transmission of the PD2DSCH 2323. In other words, in the case of D2D PSS 2322/D2D SSS 2324 which uses the whole band of N_rb RBs, the PD2DSCH 2323 can be mapped to (N_rb−2) RBs excluding the two RBs located at both ends of the whole frequency band.

Also, the number of subcarriers to which zero padding is applied can be varied according to bandwidth or length of the D2D synchronization signal. For example, if D2D PSS 2322/D2D SSS 2324 which uses the whole bandwidth of N_rb RBs includes subcarriers of two RBs padded with zeros at both ends, the PD2DSCH 2323 can be mapped to (N_rb−4) RBs excluding the two RBs at both ends. In this case, the D2D PSS 2322 and D2D SSS 2324 can be transmitted through a frequency band equal to or larger than 4 RBs.

The unused part (for example, 5 subcarriers or 1 RB) of the both ends in the whole frequency band can be padded with zeroes or predetermined values to transmit D2D PSS 2322, D2D SSS 2324, and PD2DSCH 2323. At this time, part of subcarriers of the both ends may transmit additional information as described above; since examples of additional information are the same as described above, descriptions thereof will be omitted.

Next, with reference to FIG. 23c, D2D SSS 2334 may be used for channel estimation and demodulation of the PD2DSCH 2333, sequence length of the D2D SSS 2334 can be adjusted so that bandwidth of the D2D SSS 2334 is the same as the bandwidth of the PD2DSCH 2333.

As described above, the D2D PSS 2332 can have the same sequence length as a downlink PSS/SSS defined in the LTE/LTE-A. In other words, the D2D PSS can be transmitted through 62 subcarriers. In this case, if the whole frequency band used for the D2D synchronization signal and D2D synchronization channel comprises 6 RBs, 5 subcarriers at the both ends of the band are not used for transmission of the D2D PSS 2322 and D2D SSS 2324.

And bandwidth calculated in units of RBs (for example, 4 RBs) is allocated to the PD2DSCH 2333, and the sequence length of the D2D SSS 2334 can be adjusted to fit the bandwidth. In this way, in case the sequence length of the D2D SSS 2334 is fitted to the bandwidth calculated in units of RBs, the 4 RB DM RS sequence of a previously defined PUSCH DM RS can be utilized in the same way. Since legacy technology can be reused, it is more advantageous to allocate the D2D SSS 2334 in RB units from a design point of view.

The unused part (for example, 5 subcarriers or 1 RB) of the both ends in the whole frequency band can be padded with zeroes or predetermined values to transmit D2D PSS 2332, D2D SSS 2334, and PD2DSCH 2333. At this time, part of subcarriers of the both ends may transmit additional information as described above; since examples of additional information are the same as described above, descriptions thereof will be omitted.

FIG. 24 illustrates a structure of a D2D synchronization signal and D2D synchronization channel according to one embodiment of the present invention.

FIG. 24 generalizes the case illustrated in FIG. 23. In other words, though FIG. 23 describes a case where a D2D SSS and a PD2DSCH are located being interlaced with each other, the description is only an example, and the present invention is not limited to the example above.

FIG. 24 illustrates the whole resource region used for a D2D synchronization signal and D2D synchronization channel. The whole resource region used for a D2D synchronization signal and D2D synchronization channel can comprise m RBs in the frequency domain (for example, 6 RBs) and n slots (or subframes) in the time domain (for example, one subframe).

As shown in FIG. 24, a D2D synchronization channel can be mapped to the same resource block to which a D2D synchronization signal is mapped. And the D2D synchronization signal and D2D synchronization channel can be transmitted through multiplexing.

To be more specific, Guard Periods (GPs) 2411, 2421, 2431 can be located at the first and the last time slot. However, this location is only an example, and it should be noted that the GP 2411, 2421, 2431 may be located either at the first or at the last region in the time domain. Also, length of the GP in the time domain can be set to have various values. For example, the length of the GP can be shorter than one symbol, equal to one symbol, or longer than one symbol.

And a D2D PSS 2412, 2422, 2432 can be mapped subsequent to the GP 2411 2421, 2431 in the time domain. A D2D PSS 2412, 2422, 2432 can be transmitted from one or more symbols within one subframe. In case the D2D PSS is transmitted from a plurality of symbols, it can be transmitted from contiguous symbols or from non-contiguous symbols.

And positions of the D2D SSS 2414, 2424, 2434 and PD2DSCH 2413, 2423, 2433 subsequent to the D2D PSS 2412, 2422, 2432 in the time domain can be different from the case of FIG. 23. For example, in one subframe in the time domain, the D2D PSS 2412, 2422, 2432 can be mapped from more than one symbol, the PD2DSCH 2413, 2423, 2433 can then be mapped from more than one symbol, and the D2D SSS 2414, 2424, 2434 can then be mapped from more than one symbol.

However, since the frequency bandwidth for the case of FIG. 24 through which the D2D PSS, D2D SSS, and PD2DSCH are transmitted is the same as in the description of FIG. 23, related descriptions will be omitted in what follows.

Meanwhile the D2D SSS or PD2DSCH may have such a structure utilizing the full band, which will be described with reference to related drawings.

FIG. 25 illustrates a structure of a D2D synchronization signal and D2D synchronization channel according to one embodiment of the present invention.

FIG. 25 illustrates the whole resource region used for a D2D synchronization signal and D2D synchronization channel. The whole resource region used for a D2D synchronization signal and D2D synchronization channel can comprise m RBs in the frequency domain (for example, 6 RBs) and n slots (or subframes) in the time domain (for example, one subframe).

As shown in FIG. 25, a D2D synchronization channel can be mapped to the same resource block to which a D2D synchronization signal is mapped. And the D2D synchronization signal and D2D synchronization channel can be transmitted through multiplexing.

To be more specific, Guard Periods (GPs) 2511 can be located at the first and the last time slot. However, this location is only an example, and it should be noted that the GP 2511 may be located either at the first or at the last region in the time domain by using symbol shift. Also, length of the GP in the time domain can be set to have various values. For example, the length of the GP can be shorter than one symbol, equal to one symbol, or longer than one symbol.

And a D2D PSS 2512 can be mapped subsequent to the GP 2511 in the time domain. A D2D PSS 2512 can be transmitted from one or more symbols within one subframe. In case the D2D PSS is transmitted from a plurality of symbols, it can be transmitted from contiguous symbols or from non-contiguous symbols.

And next to the D2D PSS 2512 in the time domain, the PD2DSCH 2513 and the D2D SSS 2514 can be mapped being interlaced with each other. The D2D SSS 2514 can also be transmitted from one or more symbols within one subframe. In case the D2D PSS is transmitted from a plurality of symbols, it can be transmitted from contiguous symbols or from non-contiguous symbols.

As described above, the D2D PSS 2512 and D2D SSS 2514 can be used as a DM RS of the PD2DSCH 2513. In particular, the D2D SSS 2514 is appropriate to be used as a DM RS in the proximity of the PD2DSCH 2513.

In what follows, a frequency band in which the D2D PSS, D2D SSS, and PD2DSCH are transmitted will be examined.

The D2D PSS 2512 can be transmitted through only part of the whole frequency band, but the D2D SSS 2514 and the PD2DSCH 2513 can be transmitted through the whole frequency band.

The D2D PSS 2512 can be transmitted through the whole frequency band except for part of the both ends (for example, 5 subcarriers or 1 RB) of the band.

For example, the D2D PSS 2512 can have the same sequence length as a downlink PSS/SSS defined in the LTE/LTE-A. In other words, the D2D PSS 2512 can be transmitted through 62 subcarriers. In this case, if the whole frequency band used for the D2D synchronization signal and the D2D synchronization channel comprises 6 RBs, the 5 subcarriers at the both ends are not used for transmission of D2D PSS 2512.

Also, the sequence length of the D2D PSS 2512 can be adjusted in RB units. For example, in case the whole frequency band used for the D2D synchronization signal and the D2D synchronization channel in the frequency domain comprises 6 RBs, 4 RBs can be used to transmit the D2D PSS 2512, excluding 1 RB in each of the both ends of the band.

The unused part (for example, 5 subcarriers or 1 RB) of the both ends in the whole frequency band can be padded with zeroes or predetermined values to transmit D2D PSS 2512. At this time, part of subcarriers of the both ends may transmit additional information as described above; since examples of additional information are the same as described above, descriptions thereof will be omitted.

And the D2D SSS 2514 and the PD2DSCH 2513 can be transmitted through the whole frequency band. For example, in case the whole frequency band used for the D2D PSS 2512, D2D SSS 2514, and PD2DSCH 2513 comprises 6 RBs, the D2D SSS 2514 and the PD2DSCH 2513 can be transmitted from the 6 RBs.

In case zero padding is not necessarily required, a zero-padding region at the both ends of the whole frequency band can be reduced as possibly as can be, but payload of transmission in the corresponding region can be additionally increased or additional coding information for reducing coding rate of the payload can be added. Also, by inserting reserved bits, an artificial CRC role for providing additional information to a decoding task may be performed.

In particular, taking into account the fact that the D2D SSS 2514 can be used as the DM RS of the PD2DSCh 2513, if the frequency band for the PD2DSCH 2513 is allocated as the whole band, transmitting the D2D SSS 2514 through the whole frequency band can increase the demodulation performance. In other words, this indicates that the same frequency band width is allocated to the PD2DSCH 2513 and the D2D SSS 2514.

FIG. 26 illustrates a structure of a D2D synchronization signal and D2D synchronization channel according to one embodiment of the present invention.

FIG. 26 generalizes the case illustrated in FIG. 25. In other words, though FIG. 25 describes a case where a D2D SSS and a PD2DSCH are disposed being interlaced with each other, the description is only an example, and the present invention is not limited to the example above.

FIG. 26 illustrates the whole resource region used for a D2D synchronization signal and D2D synchronization channel. The whole resource region used for a D2D synchronization signal and D2D synchronization channel can comprise m RBs in the frequency domain (for example, 6 RBs) and n slots (or subframes) in the time domain (for example, one subframe).

As shown in FIG. 26, a D2D synchronization channel can be mapped to the same resource block to which a D2D synchronization signal is mapped. And the D2D synchronization signal and D2D synchronization channel can be transmitted through multiplexing.

To be more specific, Guard Periods (GPs) 2611 can be located at the first and the last time slot. However, this location is only an example, and it should be noted that the GP 2611 may be located either at the first or at the last region in the time domain. Also, length of the GP in the time domain can be set to have various values. For example, the length of the GP can be shorter than one symbol, equal to one symbol, or longer than one symbol.

And a D2D PSS 2612 can be mapped subsequent to the GP 2611 in the time domain. A D2D PSS 2612 can be transmitted from one or more symbols within one subframe. In case the D2D PSS is transmitted from a plurality of symbols, it can be transmitted from contiguous symbols or from non-contiguous symbols.

And positions of the D2D SSS 2614 and PD2DSCH 2613 subsequent to the D2D PSS 2612 in the time domain can be different from the case of FIG. 25. For example, in one subframe in the time domain, the D2D PSS 2612 can be mapped from more than one symbol, the PD2DSCH 2613 can then be mapped from more than one symbol, and the D2D SSS 2614 can then be mapped from more than one symbol.

However, since the frequency bandwidth for the case of FIG. 26 through which the D2D PSS, D2D SSS, and PD2DSCH are transmitted is the same as in the description of FIG. 25, related descriptions will be omitted in what follows.

Meanwhile, although the D2D PSS and the D2D SSS use an existing sequence and mapping method, the PD2DSCH may have such a structure utilizing the full band, which will be described with reference to related drawings.

FIG. 27 illustrates a structure of a D2D synchronization signal and D2D synchronization channel according to one embodiment of the present invention.

FIG. 27 illustrates the whole resource region used for a D2D synchronization signal and D2D synchronization channel. The whole resource region used for a D2D synchronization signal and D2D synchronization channel can comprise m RBs in the frequency domain (for example, 6 RBs) and n slots (or subframes) in the time domain (for example, one subframe).

As shown in FIG. 27, a D2D synchronization channel can be mapped to the same resource block to which a D2D synchronization signal is mapped. And the D2D synchronization signal and D2D synchronization channel can be transmitted through multiplexing.

To be more specific, Guard Periods (GPs) 2711, 2712 can be located at the first and the last time slot. However, this location is only an example, and it should be noted that the GP 2711, 2712 may be located either at the first or at the last region in the time domain by using symbol shift. Also, length of the GP in the time domain can be set to have various values. For example, the length of the GP can be shorter than one symbol, equal to one symbol, or longer than one symbol.

And a D2D PSS 2712, 2722 can be mapped subsequent to the GP 2711, 2721 in the time domain. A D2D PSS 2712, 2722 can be transmitted from one or more symbols within one subframe. In case the D2D PSS is transmitted from a plurality of symbols, it can be transmitted from contiguous symbols or from non-contiguous symbols.

And in the time domain, next to the D2D PSS 2712, 2722, the PD2DSCH 2713, 2723 and the D2D SSS 2714, 2724 can be mapped being interlaced with each other. A D2D SSS 2714, 2724 can also be transmitted from one or more symbols within one subframe. In case the D2D SSS is transmitted from a plurality of symbols, it can be transmitted from contiguous symbols or from non-contiguous symbols.

As described above, the D2D PSS 2712, 2722 and D2D SSS 2714, 2724 can be used as a DM RS. In particular, the D2D SSS 2714, 2724 is appropriate to be used as a DM RS in the proximity of the PD2DSCH 2713, 2723.

In what follows, a frequency band in which the D2D PSS, D2D SSS, and PD2DSCH are transmitted will be examined.

First, as shown in FIG. 27a, the D2D PSS 2712 and the D2D SSS 2714 can be transmitted through only part of the whole frequency band, but the PD2DSCH 2713 can be transmitted through the whole frequency band.

The D2D PSS 2712 and the D2D SSS 2714 can be transmitted through the whole frequency band except for part of the both ends (for example, 5 subcarriers or 1 RB) of the band.

For example, the D2D PSS 2712 and the D2D SSS 2714 can have the same sequence length as a downlink PSS/SSS defined in the LTE/LTE-A. In other words, the D2D PSS 2712 and the D2D SSS 2714 can be transmitted through 62 subcarriers. In this case, if the whole frequency band used for the D2D synchronization signal and the D2D synchronization channel comprises 6 RBs, the 5 subcarriers at the both ends are not used for transmission of D2D PSS 2712 and the D2D SSS 2714.

Also, the sequence lengths of the D2D PSS 2712 and the D2D SSS 2714 can be adjusted in RB units. For example, in case the whole frequency band used for the D2D synchronization signal and the D2D synchronization channel in the frequency domain comprises 6 RBs, 4 RBs can be used to transmit the D2D PSS 2712 and the D2D SSS 2714, excluding 1 RB in each of the both ends of the band.

The unused part (for example, 5 subcarriers or 1 RB) of the both ends in the whole frequency band can be padded with zeroes or predetermined values to transmit D2D PSS 2712 and D2D SSS 2714. At this time, part of subcarriers of the both ends may transmit additional information as described above; since examples of additional information are the same as described above, descriptions thereof will be omitted.

And the PD2DSCH 2713 can be transmitted through the whole frequency band. In case the whole frequency band used for the D2D PSS 2712, D2D SSS 2714, and PD2DSCH 2713 comprises 6 RBs, the PD2DSCH 2713 can be transmitted from the 6 RBs.

Next, with reference to FIG. 27b, the D2D PSS 2722 and the D2D SSS 2724 are transmitted through only part of the whole frequency band, but the PD2DSCH 2723 can be transmitted through the whole frequency band.

Compared with the case of FIG. 27a, the example of FIG. 27b is the same as that of FIG. 27a except for the fact that the zero-padding region to which the D2D SSS 2724 is transmitted is allocated to the PD2DSCH 2723. In other words, the D2D PSS 2722 and the D2D SSS 2724 are transmitted through the same band, but a zero-padding region is defined for the symbol to which the D2D PSS 2722 is transmitted while resources for transmission of the PD2DSCH 2723 are allocated to the symbol to which the D2D SSS 2724 is transmitted.

Since the PD2DSCH 2713, 2723 is a channel for transmitting information, there is no need for the PD2DSCH necessarily to be transmitted through the same frequency band as the D2D PSS 2712, 2722 and/or D2D SSS 2714, 2724.

Therefore, as described in FIG. 27, wherever possible, using the whole frequency band allocated (for example, full bandwidth or 6 RBs) is helpful to reduce the coding rate.

FIG. 28 illustrates a structure of a D2D synchronization signal and D2D synchronization channel according to one embodiment of the present invention.

FIG. 28 generalizes the case illustrated in FIG. 27. In other words, though FIG. 27 describes a case where a D2D SSS and a PD2DSCH are located being interlaced with each other, the description is only an example, and the present invention is not limited to the example above.

FIG. 28 illustrates the whole resource region used for a D2D synchronization signal and D2D synchronization channel. The whole resource region used for a D2D synchronization signal and D2D synchronization channel can comprise m RBs in the frequency domain (for example, 6 RBs) and n slots (or subframes) in the time domain (for example, one subframe).

As shown in FIG. 28, a D2D synchronization channel can be mapped to the same resource block to which a D2D synchronization signal is mapped. And the D2D synchronization signal and D2D synchronization channel can be transmitted through multiplexing.

To be more specific, Guard Periods (GPs) 2811, 2821 can be located at the first and the last time slot. However, this location is only an example, and it should be noted that the GP 2811, 2821 may be located either at the first or at the last region in the time domain. Also, length of the GP in the time domain can be set to have various values. For example, the length of the GP can be shorter than one symbol, equal to one symbol, or longer than one symbol.

And a D2D PSS 2812, 2822 can be mapped subsequent to the GP 2811, 2821 in the time domain. A D2D PSS 2812, 2822 can be transmitted from one or more symbols within one subframe. In case the D2D PSS is transmitted from a plurality of symbols, it can be transmitted from contiguous symbols or from non-contiguous symbols.

And positions of the D2D SSS 2814, 2824 and PD2DSCH 2813, 2823 subsequent to the D2D PSS 2812, 2822 in the time domain can be different from the case of FIG. 27. For example, in one subframe in the time domain, the D2D PSS 2812, 2822 can be mapped from more than one symbol, the PD2DSCH 2813, 2823 can then be mapped from more than one symbol, and the D2D SSS 2814, 2824 can then be mapped from more than one symbol.

However, since the frequency bandwidth for the case of FIG. 28 through which the D2D PSS, D2D SSS, and PD2DSCH are transmitted is the same as in the description of FIG. 27, related descriptions will be omitted in what follows.

Meanwhile, the D2D PSS and the PD2DSCH are transmitted through only part of the whole frequency band, but the D2D SSS can be transmitted through the whole frequency band, which will be described with the related drawing.

FIG. 29 illustrates a structure of a D2D synchronization signal and D2D synchronization channel according to one embodiment of the present invention.

FIG. 29 illustrates the whole resource region used for a D2D synchronization signal and D2D synchronization channel. The whole resource region used for a D2D synchronization signal and D2D synchronization channel can comprise m RBs in the frequency domain (for example, 6 RBs) and n slots (or subframes) in the time domain (for example, one subframe).

As shown in FIG. 29, a D2D synchronization channel can be mapped to the same resource block to which a D2D synchronization signal is mapped. And the D2D synchronization signal and D2D synchronization channel can be transmitted through multiplexing.

To be more specific, Guard Periods (GPs) 2911, 2921 can be located at the first and the last time slot. However, this location is only an example, and it should be noted that the GP 2911, 2921 may be located either at the first or at the last region in the time domain by using symbol shift. Also, length of the GP in the time domain can be set to have various values. For example, the length of the GP can be shorter than one symbol, equal to one symbol, or longer than one symbol.

And a D2D PSS 2912, 2922 can be mapped subsequent to the GP 2911, 2921 in the time domain. A D2D PSS 2912, 2922 can be transmitted from one or more symbols within one subframe. In case the D2D PSS is transmitted from a plurality of symbols, it can be transmitted from contiguous symbols or from non-contiguous symbols.

And in the time domain, next to the D2D PSS 2912, 2922, the PD2DSCH 2913, 2923 and the D2D SSS 2914, 2924 can be mapped being interlaced with each other. A D2D SSS 2914, 2924 can also be transmitted from one or more symbols within one subframe. In case the D2D SSS is transmitted from a plurality of symbols, it can be transmitted from contiguous symbols or from non-contiguous symbols.

As described above, the D2D PSS 2912, 2922 and D2D SSS 2914, 2924 can be used as a DM RS. In particular, the D2D SSS 2914, 2924 is appropriate to be used as a DM RS in the proximity of the PD2DSCH 2913, 2923.

In what follows, a frequency band in which the D2D PSS, D2D SSS, and PD2DSCH are transmitted will be examined.

First, as shown in FIG. 29*a*, the D2D PSS 2912 and the PD2DSCH 2913 can be transmitted being mapped only to part of the whole frequency band and can have the same bandwidth. On the other hand, the D2D SSS 2914 can be transmitted through the whole frequency band.

In other words, the D2D PSS 2912 and the PD2DSCH 2913 can be transmitted through the whole frequency band except for part of the both ends (for example, 5 subcarriers or 1 RB) of the band.

For example, the D2D PSS 2912 can have the same sequence length as a downlink PSS/SSS defined in the LTE/LTE-A. In other words, the D2D PSS 2912 can be transmitted being mapped to 62 subcarriers. The PD2DSCH 2913 can also be mapped to the 62 subcarriers in the same frequency domain. In this case, if the whole frequency band used for the D2D synchronization signal and the D2D synchronization channel comprises 6 RBs, the 5 subcarriers at the both ends are not used for transmission of D2D PSS 2912 and the PD2DSCH 2913.

Also, bandwidth calculated in units of RBs (for example, 4 RBs) is mapped to the PD2DSCH 2913, and the sequence length of the D2D PSS 2912 can be adjusted to fit the bandwidth. In this way, in case the sequence length of the D2D PSS 2912 is fitted to the bandwidth calculated in units of RBs, the 4 RB DM RS sequence of a previously defined PUSCH DM RS can be utilized in the same way. For example, in case the overall frequency band used for a D2D synchronization signal and D2D synchronization channel in the frequency domain is 6 RB, 4 RBs can be utilized to transmit the D2D PSS 2912 and PD2DSCH 2913, excluding 1 RB at the both ends of the frequency band.

The unused part (for example, 5 subcarriers or 1 RB) of the both ends in the whole frequency band can be padded with zeroes or predetermined values to transmit D2D PSS 2912 and PD2DSCH 2913. At this time, part of subcarriers of the both ends may transmit additional information as described above; since examples of additional information are the same as described above, descriptions thereof will be omitted.

And throughout the whole frequency band, the sequence length of the D2D SSS 2914 can be adjusted to transmit the D2D SSS 2914. In case the whole frequency band used for the D2D PSS 2912, D2D SSS 2914, and PD2DSCH 2913 comprises 6 RBs, the D2D SSS 2914 can be transmitted from the 6 RBs.

Next, with reference to FIG. 29b, the bandwidth through which the PD2DSCH 2923 is transmitted can be allocated by an integer multiple of an RB. In other words, the bandwidth through which the D2D PSS 2922 and the D2D SSS 2924 are transmitted is the same as in the example of FIG. 29a, the bandwidth to which the PD2DSCH 2923 is mapped can be an integer multiple of an RB.

In case the whole frequency band used for the D2D PSS 2922, D2D SSS 2924, and PD2DSCH 2923 comprises 6 RBs, part of the subcarriers at the both ends of the band (for example, 5 subcarriers) are not used for transmission of the D2D PSS, 4 RBs excluding the two RBs at both ends of the whole band can be mapped to the PD2DSCH 2923. In other words, in the case of D2D PSS 2922/D2D SSS 2924 which uses the whole band of N_rb RBs, the PD2DSCH 2923 can be mapped to (N_rb−2) RBs excluding the two RBs located at both ends of the whole frequency band.

FIG. 30 illustrates a structure of a D2D synchronization signal and D2D synchronization channel according to one embodiment of the present invention.

FIG. 30 generalizes the case illustrated in FIG. 29. In other words, though FIG. 29 describes a case where a D2D SSS and a PD2DSCH are located being interlaced with each other, the description is only an example, and the present invention is not limited to the example above.

FIG. 30 illustrates the whole resource region used for a D2D synchronization signal and D2D synchronization channel. The whole resource region used for a D2D synchronization signal and D2D synchronization channel can comprise m RBs in the frequency domain (for example, 6 RBs) and n slots (or subframes) in the time domain (for example, one subframe).

As shown in FIG. 30, a D2D synchronization channel can be mapped to the same resource block to which a D2D synchronization signal is mapped. And the D2D synchronization signal and D2D synchronization channel can be transmitted through multiplexing.

To be more specific, Guard Periods (GPs) 3011, 3021 can be located at the first and the last time slot. However, this location is only an example, and it should be noted that the GP 3011, 3021 may be located either at the first or at the last region in the time domain. Also, length of the GP in the time domain can be set to have various values. For example, the length of the GP can be shorter than one symbol, equal to one symbol, or longer than one symbol.

And a D2D PSS 3012, 3022 can be mapped subsequent to the GP 3011, 3021 in the time domain. A D2D PSS 3012, 3022 can be transmitted from one or more symbols within one subframe. In case the D2D PSS is transmitted from a plurality of symbols, it can be transmitted from contiguous symbols or from non-contiguous symbols.

And positions of the D2D SSS 3014, 3024 and PD2DSCH 3013, 3023 subsequent to the D2D PSS 3012, 3022 in the time domain can be different from the case of FIG. 29. For example, in one subframe in the time domain, the D2D PSS 3012, 3022 can be mapped from more than one symbol, the PD2DSCH 3013, 3023 can then be mapped from more than one symbol, and the D2D SSS 3014, 3024 can then be mapped from more than one symbol.

However, since the frequency bandwidth for the case of FIG. 30 through which the D2D PSS, D2D SSS, and PD2DSCH are transmitted is the same as in the description of FIG. 29, related descriptions will be omitted in what follows.

FIG. 31 illustrates a method for mapping a D2D synchronization channel to a physical resource according to one embodiment of the present invention.

FIG. 31a illustrates a method for mapping of a D2D synchronization channel (PD2DSCH) to radio resources (namely RE mapping) by using the structure of a D2D synchronization signal and D2D synchronization channel as shown in FIG. 23a. FIG. 31b illustrates a method for mapping of a PD2DSCH to radio resources by using the structure of a D2D synchronization signal and D2D synchronization channel as shown in FIG. 23b.

However, it should be noted that the descriptions based on the aforementioned structures are only an example, and the method for mapping of a PD2DSCH to radio resources can still be applied in the same way for those cases where the D2D synchronization signal and D2D synchronization channel have a different structure. In what follows, descriptions about a D2D synchronization signal and D2D synchronization channel will be omitted.

With reference to FIG. 31, symbol-level repetition coding can be applied to the PD2DSCH along the time-axis. In other words, data to be transmitted on the PD2DSCH are repeated to generate a plurality of copy data which are the same as the corresponding data. For example, if the PD2DSCH is transmitted from n symbols in one subframe, a total of n repetition coding can be performed. In the example of FIG. 31 illustrates a case where the PD2DSCH is transmitted from a total of 5 symbols over the whole resource region to which the D2D PSS, D2D SSS, and PD2DSCH are transmitted and thus symbol-level repetition coding which is repeated 5 times along the time axis is performed.

Also, one or more symbols can be grouped, and repetition coding can be performed in symbol-group units. In this case, to keep the number of symbols per group at a constant, it is preferable that the total number of symbols used for transmission of the PD2DSCH is kept to be an even number or an integer multiple. For example, if one group consists of two symbols, a total of 6 symbols can be used for transmission of the PD2DSCH.

The number of symbols and positions thereof used for the PD2DSCH are only an example, and the symbol-level repetition coding along the time axis can be applied in the same way even when the number of symbols and their positions are determined differently from the example above.

In this way, as the PD2DSCH is transmitted after time-dependent repetition coding is applied, robustness to PD2DSCH transmission error is improved. In other words, information loss during transmission through the PD2DSCH can be minimized, and system transmission efficiency can be improved.

FIG. 32 illustrates a method for mapping a D2D synchronization channel to a physical resource according to one embodiment of the present invention.

FIG. 32a illustrates a method for mapping of a D2D synchronization channel (PD2DSCH) to radio resources (namely RE mapping) by using the structure of a D2D synchronization signal and D2D synchronization channel as shown in FIG. 23a. FIG. 32b illustrates a method for mapping of a PD2DSCH to radio resources by using the structure of a D2D synchronization signal and D2D synchronization channel as shown in FIG. 23b.

However, it should be noted that the descriptions based on the aforementioned structures are only an example, and the method for mapping of a PD2DSCH to radio resources can still be applied in the same way for those cases where the D2D synchronization signal and D2D synchronization channel have a different structure. In what follows, descriptions about a D2D synchronization signal and D2D synchronization channel will be omitted.

With reference to FIG. 32, the PD2DSCH is first mapped to radio resources according to a symbol order; if the end of the whole resource region to which the D2D PSS, D2D SSS, and PD2DSCH are transmitted is reached, coded bits are mapped again according to the symbol order in the second subcarrier of the first symbol to which the PD2DSCH is transmitted. And coded bits are mapped sequentially up to the last subcarrier by using the same scheme. In other words, time-first RE mapping is performed.

In the example of FIG. 32, it is assumed that the PD2DSCH is transmitted from a total of K symbols and N subcarriers. In this case, coded bits are mapped in the order of 1, 2, K, K+1, K+2, 2K, 2K, 2K+1, 2K+2, 3K . . . , (N−1)K+1, (N−1)K+2, . . . , NK.

At this time, a time constraint can correspond to one subframe or slot; also, in case the D2D PSS, D2D SSS, and PD2DSCH are transmitted across several subframes (for example, two subframes), time-first mapping may be performed across several subframes. In the frequency domain, time-first mapping may be performed on the basis of RB units.

Meanwhile, a PUSCH DM RS defined in the LTE/LTE-A may be used instead of the D2D SSS for demodulation of the PD2DSCH in the embodiments of FIGS. 23 to 32. In other words, although the D2D PSS uses a ZC sequence, the D2D SSS can use an N-RB DM RS sequence defined in the PUSCH DM RS. Also, the PUSCH DM RS can be used as a means to obtain synchronization together with the D2D PSS.

Also, the D2D SSS in the embodiments of FIGS. 23 to 32 may be mapped to the PD2DSCH after being punctured. In other words, the PD2DSCH can be mapped (for example, mapped across the whole frequency band) to the region excluding the D2D PSS, and the D2D SSS can be mapped to the aforementioned region after being punctured at predetermined symbol positions over the bandwidth fitted to the D2D PSS. In this case, if the D2D SSS is used as a DM RS for demodulation of the PD2DSCH, it is preferable to keep the bandwidth over which the D2D SSS is mapped to be the same as the bandwidth of the PD2DSCH.

Also, although not shown in FIG. 32, a frequency-first mapping method may be applied to map the PD2DSCH to the physical resources. More specifically, the PD2DSCH is mapped to radio resources in an ascending order of subcarrier indices at the first symbol which transmits the PD2DSCH; if the last subcarrier of the whole resource region to which the D2D PSS, D2D SSS, and PD2DSCH are transmitted is reached, coded bits are again mapped in an ascending order of subcarrier indices at the second symbol to which the PD2DSCH is transmitted. And coded bits are mapped sequentially up to the last symbol by using the same scheme.

In the example of FIG. 32, coded bits are mapped in the order of 1, K+1, 2K+1, (N−1)K+1, 2, K+2, 2K+2, (N−1)K+2, K, 2K, 3K, . . . , NK.

Meanwhile, although the embodiment above is based on the structure where the D2D PSS, D2D SSS, and PD2DSCH are mapped contiguously in the time domain, they may be transmitted being separated from each other in the time domain, which will be described with reference to the related drawing below.

FIG. 33 illustrates structures of a D2D synchronization signal and D2D synchronization channel according to one embodiment of the present invention.

With reference to FIG. 33, a D2D synchronization signal (namely D2D PSS 3301, D2D SSS 3302, and PD2DSCH 3303) are transmitted being separated with each other in the time domain.

The D2D synchronization signal (namely D2D PSS 3301 and D2D SSS 3302) and the PD2DSCH may overlap with each other as periods of the two are different, but the D2D synchronization signal and the PD2DSCH may be located in different subframes.

Therefore, in case the D2D synchronization signal (namely D2D PSS 3301 and D2D SSS 3302) and the PD2DSCH 3303 are transmitted from the same subframe, they can be transmitted being multiplexed as described in the embodiments of FIGS. 23 to 32.

However, in case the D2D synchronization signal and the PD2DSCH are transmitted separately from the respective subframes, the structure of FIG. 33 can be employed for the transmission. In this case, the D2D PSS 3301 and D2D SSS 3302 can be configured to have a bandwidth of 62 subcarriers by applying zero-padding to 5 subcarriers at each of the both ends of the frequency band or to have a bandwidth of 4 RBs by applying zero-padding to 1 RB at each of the both ends of the frequency band. And differently from the configuration above, the PD2DSCH can be configured so that the whole frequency band comprising all of the 6 RBs is used.

Also, as shown in the embodiment of FIG. 33, the PD2DSCH 3303 can be transmitted throughout one subframe in the time domain. However, the present invention is not limited to the aforementioned example, and the allocated region of the PD2DSCH 3303 in the time domain can differ from that of the example.

Also, as shown in the embodiment of FIG. 33, the D2D SSS 3302 can be transmitted through two contiguous symbols. However, the present invention is not limited to the aforementioned example, and the position of a symbol in the time domain to which the D2D SSS 3302 is transmitted can differ from that of the example.

FIG. 34 illustrates structures of a D2D synchronization signal and D2D synchronization channel according to one embodiment of the present invention.

With reference to FIG. 34, differently from the example of FIG. 33, in case periods of the D2D PSS 3401, D2D SSS 3403, and PD2DSCH 3402 are all different from one another or the period of the D2D PSS 3401 is different from the period for the D2D SSS 3403 and the PD2DSCH 3402, the D2D SSS 3403 can be transmitted being multiplexed with the PD2DSCH 3402 from the same subframe separately from the D2D PSS 3401.

In this case, the D2D PSS 3401 can be configured to have a bandwidth of 62 subcarriers by applying zero-padding to 5 subcarriers at each of the both ends of the frequency band or to have a bandwidth of 4 RBs by applying zero-padding to 1 RB to each of the both ends of the frequency band.

Meanwhile, since the D2D SSS 3403 can perform the role of a demodulation reference signal of the PD2DSCH 3402 as well as performing the function of D2D synchronization, the D2D SSS can be transmitted being mapped to the bandwidth of 6 RBs which form the same bandwidth for the PD2DSCH 3402.

Also, as shown in the example of FIG. 34, the PD2DSCH 3402 can be transmitted three times (with the same or different information) within one subframe, and the D2D SSS 3403 can be transmitted twice. However, the present invention is not limited to the example above, but the number of transmission times for the PD2DSCH and D2D SSS within one subframe can be different from those of the example above.

FIG. 35 illustrates structures of a D2D synchronization signal and D2D synchronization channel according to one embodiment of the present invention.

As shown in the example of FIG. 34, in case the D2D SSS is multiplexed with the PD2DSCH within the same subframe, the D2D SSS is mapped over the same bandwidth for the PD2DSCH; in case multiplexing of the D2D SSS with the PD2DSCH is not performed within the same subframe, the D2D SSS sequence needs to have two different lengths in order to be mapped over the same bandwidth for the D2D PSS.

Therefore, instead of designing the D2D SSS sequence to have two different lengths, the D2D SSS sequence can be configured to have the same length as that of the D2D PSS sequence so that it can be transmitted from the same subcarrier.

In this case, the D2D PSS 3501 can be configured so that it can have frequency bandwidth comprising 62 subcarriers by applying zero-padding to 5 subcarriers at each of the both ends of the frequency band or frequency bandwidth comprising 4 RBs by applying zero-padding to 1 RB at each of the both ends of the frequency band.

Also, even if the D2D SSS 3403 is transmitted being multiplexed with the PD2DSCH 3502 from the same subframe, the D2D SSS can be configured so that it can have frequency bandwidth comprising 62 subcarriers by applying zero-padding to 5 subcarriers at each of the both ends of the frequency band or frequency bandwidth comprising 4 RBs by applying zero-padding to 1 RB at each of the both ends of the frequency band in the same way as the D2D PSS 3501.

Also, as shown in the example of FIG. 35, the PD2DSCH 3502 can be transmitted three times (with the same or different information) within one subframe, and the D2D SSS 3503 can be transmitted twice. However, the present invention is not limited to the example above, but the number of transmission times for the PD2DSCH and D2D SSS within one subframe can be different from those of the example above.

FIG. 36 illustrates structures of a D2D synchronization signal and D2D synchronization channel according to one embodiment of the present invention.

With reference to FIG. 36, it is in fact more convenient for the PD2DSCH 3602 to employ resource allocation in RB units as in the PUSCH; therefore, it is preferable for the PD2DSCH 3602 to be configured to have bandwidth in an integer multiple of the RB unit, such as 4 RB, 5 RB, or 6 RB.

In this case, the D2D PSS 3601 can be configure to have bandwidth of 62 subcarriers by applying zero-padding to 5 subcarriers at each of the both ends of the frequency band or to have bandwidth of 4 RBs by applying zero-padding to 1 RB at each of the both ends of the frequency band.

On the other hand, in case the D2D SSS 3603 is transmitted being multiplexed with the PD2DSCH 3602 within the same subframe, it is preferable to have bandwidth the size of which is the same as that of the PD2DSCH 3602 by keeping the bandwidth of the D2D SSS to have the same size as that of the PD2DSCH 3602, namely to be an integer multiple of an RB.

Also, as shown in the example of FIG. 36, the PD2DSCH 3602 can be transmitted three times (with the same or different information) within one subframe, and the D2D SSS 3603 can be transmitted twice. However, the present invention is not limited to the example above, but the number of transmission times for the PD2DSCH and D2D SSS within one subframe can be different from those of the example above.

In what follows, described will be configuration of information transmitted through a D2D synchronization channel and operation between UEs according to the information. In what follows, the term of D2D synchronization channel is used collectively to represent not only the aforementioned PD2DSCH but also a transport channel mapped to the PD2DSCH or a logical channel.

FIG. 37 illustrates configuration of information transmitted to a D2D synchronization channel and D2D operation according to the information according to one embodiment of the present invention.

FIG. 37 provides more specifics to the example of FIG. 20. In other words, UE A delivers a D2D synchronization signal/D2D synchronization channel generated by UE A itself or received from the eNB to UE B and UE C. UE A is such a kind of UE relaying a D2D synchronization signal/D2D synchronization channel. And UE 1 generates a D2D synchronization signal/D2D synchronization channel by itself and transmits the D2D synchronization signal/D2D synchronization channel to UE 2 and UE 3.

The D2D synchronization channel can carry the following information.

Identifier of synchronization source
Type of synchronization source
Resource allocation for data and/or control signaling
Resource allocation or pool for scheduling assignment for data and/or control and/or discovery
Data
Other information In particular, in the case of a D2D UE (in the case of FIG. 37, UE B, UE C, UE 2, and UE 3) operating out of coverage, a predetermined resource region may be needed to perform initial communication.

At this time, the resource region comprises a data transmission resource, control information transmission resource, discovery transmission resource and/or scheduling assignment transmission resource. At this time, scheduling assignment refers to the channel or information carrying scheduling information; and includes information about allocated resources for data or control information.

Data, control information, discovery and/or SA transmission resources used for D2D UEs to perform initial communication may be fixed beforehand, but in this case, a more appropriate resource allocation method is required since resource utilization efficiency may be degraded such that collision among resources under particular circumstances can be highly probable.

As one example of resource allocation method, the UE may select one resource from among one or more fixed resources predetermined on the basis of the UE's identifier (for example, C-RNTI, International Mobile Subscriber Identity (IMSI), Globally Unique Temporary Identifier (GUTI), SAE Temporary Mobile Subscriber Identity (S-TMSI), or IP address (Packet Data Network (PDN) address). In the example of FIG. 37, UE A transmits a D2D synchronization channel through the resources selected on the basis of its own identifier, and UE 1 transmits a D2D synchronization channel through the resources selected on the basis of its own identifier.

In this way, the D2D synchronization channel can be distributed across various fixed resource regions according to the respective UEs or the respective types of information being transmitted (for example, data, control, discovery, or SA). At this time, the UE may select resources on the basis of a number generated in a random fashion instead of using its own identifier.

Also, an eNB, relaying UE (UE A in the case of FIG. 37), resources to be used for data, control, discovery and/or SA, cluster head, or synchronization head may allocate resources to be used for data, control, discovery and/or SA, which may be more stable than the method above.

In the example of FIG. 37, UE A informs UE B and UE C of resources available for data, control, discovery and/or SA. In the same way, UE 1 informs UE B and UE C of resources available for data, control, discovery and/or SA.

In this case, one or more predetermined resource regions (for example, a resource pool) can be configured, and a D2D synchronization channel can be used to specify one or more of the resource regions (namely select and specify data, control, discovery and/or SA transmission resources).

More specifically, resource configuration (RA) field of the D2D synchronization channel can be used. In other words, the resource configuration field indicates data, control, discovery, or SA transmission resources.

At this time, a rule can be defined beforehand so that the RA field can indicate a specific purpose for a particular bit stream. For example, a bit stream can be configured differently according to the purpose of the D2D synchronization channel, such as data resource configuration for bit stream 1 and control resource configuration for bit stream 2.

Also, the first 1 bit of the RA field can be used to inform of whether the RA field indicates dynamic resource configuration (namely resources indicated by the D2D synchronization channel are used) or preconfigured resources (namely a UE receiving the D2D synchronization channel selects transmission resources from a predetermined resource pool or uses a predetermined resource unit directly).

Also, the first 1 bit of the RA field may be used to indicate whether a UE receiving the D2D synchronization channel has to select data, control, discovery, or SA transmission resources; or whether a UE receiving the D2D synchronization channel has to directly use a specified resource region for actual transmission. Since an indicated target may be limited or a predefined resource region in the case of a pre-configured RA, all of the field may not be necessarily used. For example, if the very first bit is set to "1" so that pre-configured resources can be readily utilized in an urgent case, pre-configured resources can be used continuously afterwards independently of the contents of the RA bit stream, which requires simply only 1 bit information.

Also, the RA field, the bit width of which being extended, can be used to indicate particular transmission resources from among a pre-configured resource pool. As an example, urgent cases are further divided, indication states are extended by utilizing one or more bits, and thus pre-configured resource indication may be performed with more precise control. For example, urgent case 0, 1, 2, and 3 are defined by utilizing 2 bit information, and the RA field of the D2D synchronization channel is used to indicate that separate pre-configured resources can be used according to the respective cases.

As described above, in case only part of the RA field is used, the remaining bits of the field are left as reserved bits. Also, the remaining bits may be used to lower the coding rate by filling the remaining bits with known bits and using the bits as a virtual CRC. Also, by repeating pre-configuration indication bits into the remaining bit positions, the coding rate may be reduced.

At the receiver side, contents of the pre-configured bits may be read conveniently, but the bit information after the pre-configured bits may be discarded, ignored, or processed as don't care bits.

In the example of FIG. 37, UE A (or UE 1) can directly inform of the resources used by UE B and UE C (or UE 2 and UE 3) for data, control and/or discovery transmission. Also, UE A (or UE 1) can inform of scheduling request resources with which UE B and UE C (or UE 2 and UE 3) can perform resource request for data, control and/or discovery transmission. Also, UE A may inform of a (candidate) resource region to which scheduling assignment which indicates resources used for data, control and/or discovery transmission is transmitted.

In this case, the D2D synchronization channel can be used to indicate whether to use pre-configured resource or indicated/scheduled resources. At this time, the pre-configured resources or scheduled resources can indicate resources which transmit actual data; or a discovery or control channel. Also, the pre-configured resources or scheduled resource may indicate scheduling assignment resources which inform of from which the data, discovery and/or control information is transmitted.

In what follows, a coding method for payload of a D2D synchronization channel will be described.

The source bits of the D2D synchronization channel is not just a sequence but represents information to be transmitted, in particular, closely related to attributes of control information. In other words, as described above, the D2D synchronization channel delivers information such as a synchronization signal source ID, source type, and RA.

In the LTE/LTE-A system, Tail-Biting Convolution Coding (TBCC) is used for downlink/uplink control information. At this time, block coding such as Reed-Muller (RM) coding is used for CQI among the uplink control information.

In the case of PUCCH CQI, a block code (20, A) (here, 'A' represents the number of bits, where the maximum value is 13) is used if the PUCCH CQI is less than 11 bits (13 bits in case ACK/NACK is included) or less.

And in the case of PUSCH CQI, a block code (32, O) (here, 'O' represents the number of bits, where the maximum value is 11) if the PUSCH CQI is less than 11 bits while TBCC CQI coding is used if the PUSCH CQI is larger than 12 bits. In particular, if the PUSCH CQI is piggybacked on the PUSCH due to collision with the PUCCH, a block code (32, 11) is used together with circular buffer rate matching.

Therefore, in case the information transmitted through the D2D synchronization channel is less than K bits (for example, 11, 12, or 13 bits), block coding is used, while TBCC coding is used if the information is larger than K bits. In other words, a different coding method can be configured by separating the case where information transmitted through the D2D synchronization channel exceeds K bits from the case where the information does not exceed K bits.

On the other hand, the bits that have to be transmitted through the D2D synchronization channel can be configured in a very simple manner. For example, only very little bits can be delivered if the information about a source type and pre-configured resource use indication only is delivered for a particular situation. In this case, an existing RM coding method can be used.

FIG. 38 illustrates a method for transmitting a D2D synchronization signal and D2D synchronization channel according to one embodiment of the present invention.

With reference to FIG. 38, a first UE maps a D2D synchronization signal and

D2D synchronization channel to physical resources S3801.

The first UE maps the D2D synchronization signal and D2D synchronization channel to the physical resources according to the embodiments described with respect to FIGS. 21 to 36; and detailed descriptions of a method for mapping the D2D synchronization signal and D2D synchronization channel to physical resources will be omitted.

And the first UE transmits the D2D synchronization signal and D2D synchronization channel mapped to the physical resources to a second UE S3803.

General Wireless Communication Device to which an Embodiment of the Present Invention May be Applied FIG. 39 illustrates a block diagram of a wireless communication device according to an embodiment of the present invention.

Referring to FIG. 39, the wireless communication system includes an eNB 3910 and a plurality of UEs 3920 placed within the area of the eNB 3910.

The eNB 3910 includes a processor 3911, memory 3912, and a Radio Frequency (RF) unit 3913. The processor 3911 implements the functions, processes and/or methods proposed with reference to FIGS. 1 to 38. The layers of the radio interface protocol may be implemented by the processor 3911. The memory 3912 is connected to the processor 3911 and stores various types of information for driving the processor 3911. The RF unit 3913 is connected to the processor 3911 and sends and/or receives radio signals.

The UE 3920 includes a processor 3921, memory 3922, and an RF unit 3923. The processor 3921 implements the functions, processes and/or methods proposed with reference to FIGS. 1 to 38. The layers of the radio interface protocol may be implemented by the processor 3921. The memory 3922 is connected to the processor 3921 and stores various types of information for driving the processor 3921. The RF unit 3923 is connected to the processor 3921 and sends and/or receives radio signals.

The memory 3912, 3922 may be placed inside or outside the processor 3911, 3921 and may be connected to the processor 3911, 3921 by well-known various means. Furthermore, the eNB 3910 and/or the UE 3920 may have a single antenna or multiple antennas.

Hereinafter, detailed embodiments of the present invention are described in detail with reference to the accompanying drawings. Each of elements or characteristics may be considered to be optional unless otherwise described explicitly. Each element or characteristic may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

The method for transmitting D2D synchronization signal and D2D synchronization channel in a wireless communication system according to an embodiment of the present invention has been illustrated as being applied to 3GPP LTE/LTE-A systems, but may be applied to various wireless communication systems other than the 3GPP LTE/LTE-A systems.

What is claimed is:

1. A method of receiving a synchronization signal and a synchronization related channel by a user equipment (UE) in a wireless communication system, the method comprising:
   receiving a synchronization signal including a primary synchronization signal (PSS) and a secondary synchronization signal (SSS); and
   receiving the synchronization related channel,
   wherein the synchronization signal is mapped to fewer subcarriers than the synchronization related channel in a frequency domain,
   wherein the PSS transmission is followed by the SSS transmission in a time domain,
   wherein the PSS, the SSS and the synchronization related channel are all mapped within one slot in the time domain, and
   wherein the SSS is mapped to a plurality symbols in the one slot.

2. The method of claim 1, wherein the synchronization signal is mapped to same resource blocks as the synchronization related channel.

3. The method of claim 2, wherein one resource block comprises subcarriers in the frequency domain, and the synchronization signal is mapped to 62 subcarriers located in the center of 6 resource blocks.

4. The method of claim 3, wherein the synchronization related channel is mapped to the 6 resource blocks in the frequency domain.

5. The method of claim 3, wherein the synchronization related channel is mapped in units of resource blocks in the frequency domain.

6. The method of claim 3, wherein the synchronization related channel is mapped to 72 subcarriers in the frequency domain.

7. The method of claim 3, wherein, in a symbol to which the synchronization signal is mapped, 5 subcarriers at both ends of the symbol to which the synchronization signal is not mapped are padded with zeros.

8. The method of claim 1, wherein the synchronization related channel carries at least one of identifier of a device transmitting the synchronization signal, type of a device transmitting the synchronization signal, and resource allocation information for a data channel, a control channel, and a discovery channel.

9. The method of claim 1, wherein the synchronization related channel carries information for whether the UE receiving the synchronization related channel uses transmission resources from a pre-configured resource pool, whether the UE receiving the synchronization related channel uses resources provided by the synchronization related channel, or whether the UE receiving the synchronization related channel uses a predetermined resource unit.

10. The method of claim 1, wherein the synchronization related channel carries information about resources to which a scheduling assignment about a channel, a control channel, and a discovery channel is transmitted.

11. The method of claim 1, wherein the synchronization relayed channel includes information about resources used for transmitting a scheduling assignment for requesting resources for a data channel, a control channel, and a discovery channel.

12. A user equipment (UE) for receiving of a synchronization signal and a synchronization related channel in a wireless communication system, the UE comprising:
a Radio Frequency (RF) unit for transmitting and receiving radio signals; and
a processor configured to control the RF unit,
wherein the processor is configured:
receive a synchronization signal including a primary synchronization signal (PSS) and a secondary synchronization signal (SSS); and
receive the synchronization related channel,
wherein the synchronization signal is mapped to fewer subcarriers than synchronization related channel in a frequency domain,
wherein the PSS transmission is followed by the SSS transmission in a time domain,
wherein the PSS, the SSS and the synchronization related channel are all mapped within one slot in the time domain, and
wherein the SSS is mapped to a plurality of symbols in the one slot.

13. The UE of claim 12, wherein one resource block comprises 12 subcarriers in the frequency domain, and the synchronization signal is mapped to 62 subcarriers located in the center of 6 resource blocks.

* * * * *